United States Patent [19]

Frankenberg

[11] 4,028,675

[45] June 7, 1977

[54] METHOD AND APPARATUS FOR REFRESHING SEMICONDUCTOR MEMORIES IN MULTI-PORT AND MULTI-MODULE MEMORY SYSTEM

[75] Inventor: Robert J. Frankenberg, San Jose, Calif.

[73] Assignee: Hewlett-Packard Company, Palo Alto, Calif.

[22] Filed: May 14, 1973

[21] Appl. No.: 360,286

[52] U.S. Cl. .................. 340/172.5; 340/173 DR
[51] Int. Cl.² .................. G06F 9/18; G11C 7/00
[58] Field of Search .................. 340/172.5, 173 DR

[56] References Cited

UNITED STATES PATENTS

| | | | |
|---|---|---|---|
| 3,274,561 | 9/1966 | Hallman | 340/172.5 |
| 3,292,151 | 12/1966 | Barnes et al. | 340/172.5 |
| 3,416,139 | 12/1968 | Marx | 340/172.5 |
| 3,419,849 | 12/1968 | Anderson et al. | 340/172.5 |
| 3,568,160 | 3/1971 | Talarczyk | 340/172.5 |
| 3,597,744 | 8/1971 | Case et al. | 340/172.5 |
| 3,626,374 | 12/1971 | Chinlund | 340/172.5 |
| 3,680,058 | 7/1972 | De Santis et al. | 340/172.5 |
| 3,737,879 | 6/1973 | Greene et al. | 340/173 DR |
| 3,740,723 | 6/1973 | Beausoleil et al. | 340/172.5 |
| 3,745,533 | 7/1973 | Erwin et al. | 340/172.5 |
| 3,757,308 | 9/1973 | Fosdick | 340/172.5 |
| 3,760,379 | 9/1973 | Nibby, Jr. et al. | 340/173 DR |
| 3,790,961 | 2/1974 | Palfi et al. | 340/173 DR |
| 3,800,295 | 3/1974 | Anderson, Jr. et al. | 340/173 DR |
| 3,810,129 | 5/1974 | Behman et al. | 340/173 DR |
| 3,836,892 | 9/1974 | De Simone et al. | 340/173 DR |
| 3,858,184 | 12/1974 | De Vries | 340/173 DR |
| 3,879,712 | 4/1975 | Edge et al. | 340/172.5 |

OTHER PUBLICATIONS

IBM Technical Disclosure Bulletin, vol. 14, No. 10, Mar. 1972, pp. 3050–3052, "Device Coupler" by Kreighbaum.

*Primary Examiner*—Melvin B. Chapnick
*Attorney, Agent, or Firm*—A. C. Smith; David A. Boone

[57] ABSTRACT

A multi-module, multi-port memory system includes modules having semiconductor memory circuits which require periodic refreshing to retain the contents stored therein. Priority circuits resolve conflicts between the multi-port access of the memory modules and the refreshing requirements of semiconductor memory circuits within the modules. The modules of the preferred embodiment are arranged in a polymorphous array of selectably expendable rows and columns. Modules utilizing different memory technologies may be combined within the address space of the array without interfering with independent multi-port access by various computer processors and other memory using devices.

9 Claims, 49 Drawing Figures

| 13(a) | 13(b) | 13(c) |

Figure 13

| 14(a) | 14(b) | 14(c) |
|-------|-------|-------|
| 14(d) | 14(e) | 14(f) |

Figure 14

NOTES

R1 AND C1 ARE CHOSEN SO THAT $\Delta t$
IS LESS THAN 1.5 mct AND GREATER THAN 1 mct.

R2 AND R3 ARE CHOSEN FOR MINIMUM POWER DISSIPATION,
GIVEN OTHER CIRCUIT PARAMETERS ARE MET.

| | | | |
|---:|:---:|:---:|:---|
| MDS 0 | 1 | 2 | GND |
| MDS 1 | 3 | 4 | A0 |
| MDS 2 | 5 | 6 | A1 |
| MDS 3 | 7 | 8 | A2 |
| MDS 4 | 9 | 10 | A3 |
| MDS 5 | 11 | 12 | GND |
| MDS 6 | 13 | 14 | A4 |
| MDS 7 | 15 | 16 | A5 |
| MDS 8 | 17 | 18 | A6 |
| MDS 9 | 19 | 20 | A7 |
| MDS 10 | 21 | 22 | GND |
| MDS 11 | 23 | 24 | A8 |
| MDS 12 | 25 | 26 | A9 |
| MDS 13 | 27 | 28 | A10 |
| MDS 14 | 29 | 30 | A11 |
| MDS 15 | 31 | 32 | GND |
| MDS 16 | 33 | 34 | A12 |
| MREFRESH | 35 | 36 | A13 |
| NMAV | 37 | 38 | A14 |
| STROBE | 39 | 40 | SENSE |
| CE | 41 | 42 | R/W |
| CLK | 43 | 44 | GND |
| INBOUNDS | 45 | 46 | GND |
| RESET | 47 | 48 | GND |
| BANSSTR | 49 | 50 | GND |

FIG. 23

(a) LOGICAL BLOCK DIAGRAM (b) PHYSICAL REALIZATION

METHOD AND APPARATUS FOR REFRESHING SEMICONDUCTOR MEMORIES IN MULTI-PORT AND MULTI-MODULE MEMORY SYSTEM

BACKGROUND AND SUMMARY OF THE INVENTION

Recent commercial availability of large MOS memory chips has made possible substantial reduction in the price per bit of electronic memory devices. Also the rising costs of software development and the decreasing ratio of hardware cost to software cost, combined with new, lower-cost memory is creating a demand for larger memories in contemporary computer equipment. The ability to expand the memory capability of certain known computing equipment is severely limited, however, because inexpensive and efficient means of increasing the memory address space were not available during the design states of earlier equipment. Also, different memory technologies usually cannot be combined in a given computer. In addition, because multiple processors are unable to share a common memory and multiple-port, independent memory access is not possible. These disadvantages are overcome in accordance with the present invention by utilizing improved bank switching, multiple dedicated memory controllers, and independent multiple access ports for arrays of memory modules.

One known technique for extending the memory addressing range of a computer is bank switching, as illustrated in FIG. 1. One typical embodiment uses a many position switch in the memory control device 9 which activates one of the possible $n$ modules 12–15 of memory at any one time. The processor 17 of the computer system can execute an instruction that selects one out of the $n$ available modules to be active at any one time. This module will remain active until another bank switch instruction is executed, enabling another module of memory, and will react to all addresses of information and commands supplied to the processor 17. In FIG. 1 the switch is shown in position 1 which activates module 13 and no other module of memory. This prior art technique of extending memory has the disadvantage that all of the memory available to the processor 17 at any one time is switched out and replaced when a bank switch instruction occurs. This necessitates duplicating information which is desirable always to have present in memory in each of the banks and necessitates having a table present in each memory to designate where certain other information is stored. This wastes considerable memory space with concomitant increases in the cost of the system. It also necessitates executing many bank switch instructions, for example, to get to information shared by many programs throughout the memory with concomitant increases in execuation times in those routines. Also, prior art memory techniques can only be expanded by adding more modules which are accessible only by bank switch instruction execution.

In contrast, the present invention overcomes these problems by allowing any portion of memory (up to all of the memory) to be always present in the memory address space of a processor (or other memory-using devices commonly known as Random Access Channels (RAC), Direct Memory Access Channels (DMA), Intelligent Device Controllers (IDC), or the like) whether a bank switch occurs or not. The memory of the present invention is configurable in steps so that in the address space any quantum (where a quantum is the smallest switchable unit) of memory may remain present while any other quantum is switched in or out of the address space, thus allowing many switchable portions of memory within the address space of memory-using devices. This feature of the invention greatly enhances the flexibility of managing the memory resources of an operating system. Since any quantum of memory may remain present permanently or temporarily in the address space of the using devices information, programs or subprograms shared by various other programs may always be present within the address space of the using devices and thus do not have to be duplicated in each section of memory in order to be immediately available to those programs or processors. In addition, the present invention makes it possible to expand memory by either adding more quanta of memory within the address space of the using device or devices or by increasing the number of quanta which may take the place (by bank switching) of the quanta within the address space.

A conventional technique of sharing memory resource between several memory-using devices is illustrated in FIG. 2. This technique makes it possible for several devices to access a common memory and allows these devices to communicate with each other. However, since there is only one port to the memory an extremely fast memory is required to service all of the using devices (i.e. the throughput of the memory must be $n$ times the throughput of a single using device, (where all using devices are assumed to have the same throughputs) in order to be on a parity with the service supplied where each device has its own separate memory. It is usually not possible to have such a memory subsystem in conventional computer systems due to the tremendous operating speeds required. This usually necessitates either offering less capability than might otherwise be possible if each device had its own memory and the means for communicating therebetween, or of avoiding some operating objectives because sufficient throughput is not available or the memory cost would be prohibitively high.

These disadvantages are overcome in accordance with the present invention which provides the means for sharing memory between two or more memory-using devices. One device using the memory does not interfere with, or reduce the throughput available to, another memory-using device. This is accomplished in accordance with the present invention by allowing other devices (or sets or devices) to use the quanta of memory which are switched out of the address space of one memory-using device. Thus, N quanta of memory may be shared by two memory-using devices such as two central processors and, while one quantum is switched into the memory space of one such processor, the other processor may use one of the other N-1 quanta of memory not used by the one processor. This means that N quanta of memory may be shared between from two to N memory-using devices with each device having essentially its own separate memory and, therefore, sufficient throughput to accomplish its task without interfering with any of the other N number of memory-using devices. The present invention also resolves the problem that occurs when two or more memory-using devices try to access the same quantum of memory at the same time. In addition, the present invention is operable with the memory-using devices of many known computing systems and thus may be used in, or as replacements for, the memory in systems for which the software has already been written.

Certain known contemporary computing systems allow mixing of a few types of memory technologies within a single system, subject, however, to many restraints upon the types of memories which may be mixed. This mixing of different memory technologies within a single memory system is desirable in that the cost/performance ratios of the system can be optimized and selected memory technologies may be included in the memory system because of certain desirable features (PROMS, ROMS, processing memories, etc.) which they possess. Also, as memory technology advances, it is desirable to be able to incorporate such new technologies into compatible memory systems to upgrade and enhance their performance specifications.

The present invention allows many different types of memory to be mixed within a single system by the inclusion of a separate control-data bus which handles all data and control signals between memory controller and its array of memory units. This allows the memory controller to be an interface element between the memory technology and the technology of the memory-using device or devices. Thus, a controller may be constructed within the framework of the present invention for each of the many types of memory technologies available and allow mixing of these many types of memory technologies. Also, appropriate means are provided to accomodate refreshing and non-refreshing types of memory technologies, DRO (Destructive Read Out) and NDRO (Non-Destructive Read Out), random, sequential, and serial read/write or read-only types of memories, and memories which require different power supplies in operation. This is accomplished in accordance with the present invention using different controllers for different types of memory technology involved within a single memory system.

DESCRIPTION OF THE DRAWINGS

FIGS. 14a, 14b, 14c, 14d, 14e, and 14f taken together are

FIG. 23 is a graphical illustration of the connector assignment for the privileged communication bus in accordance with the preferred embodiments of the present invention;

DESCRIPTION OF THE PREFERRED EMBODIMENT

Figure 1:
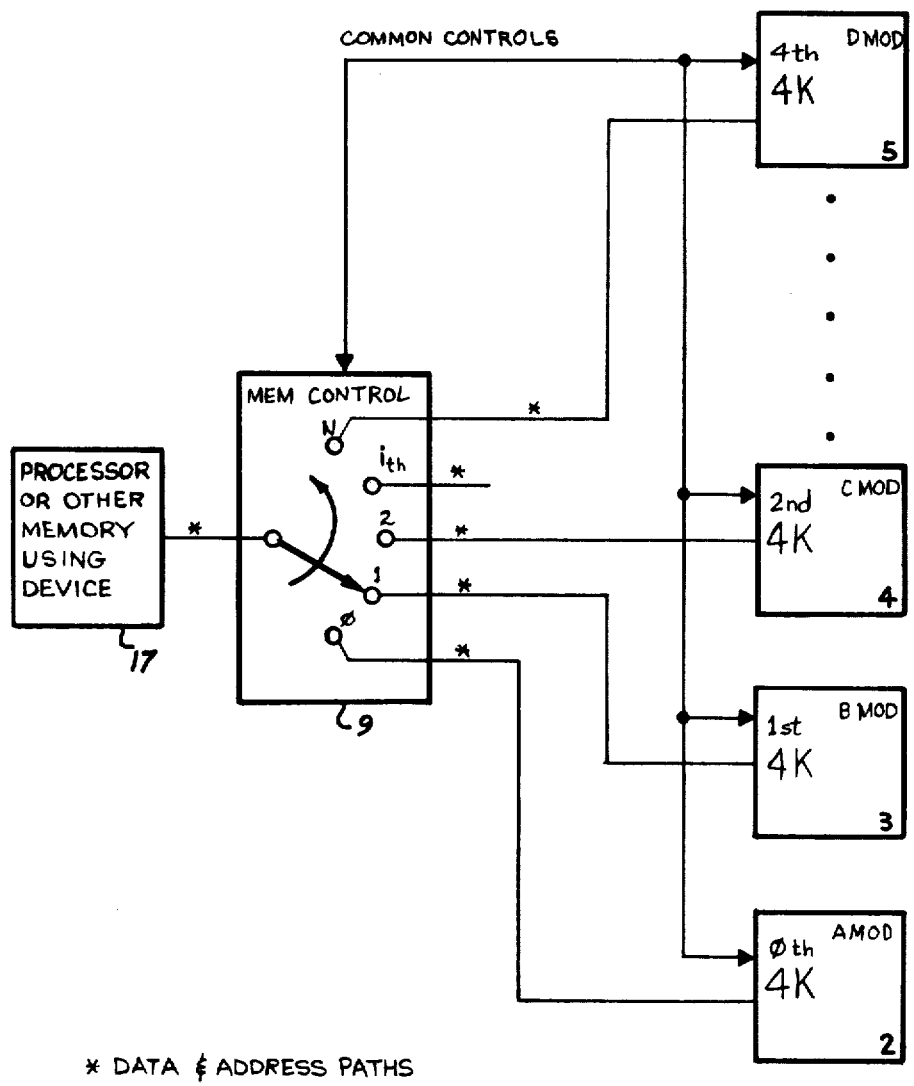
FIG. 1 is a schematic diagram of typical prior art memory bank switching.
Figure 2:
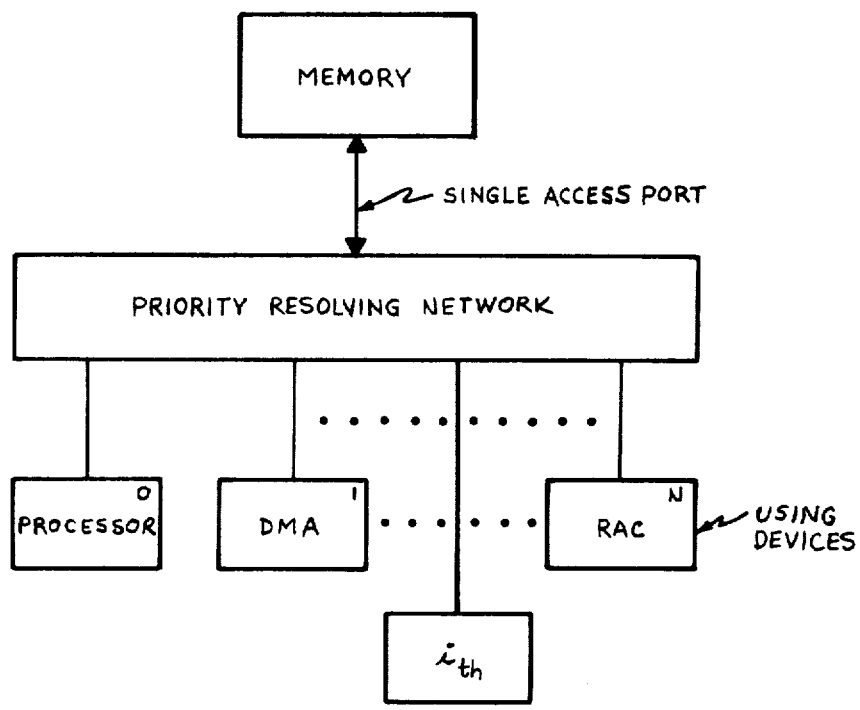
FIG. 2 is a schematic diagram of prior art memory sharing techniques.
Figure 3:
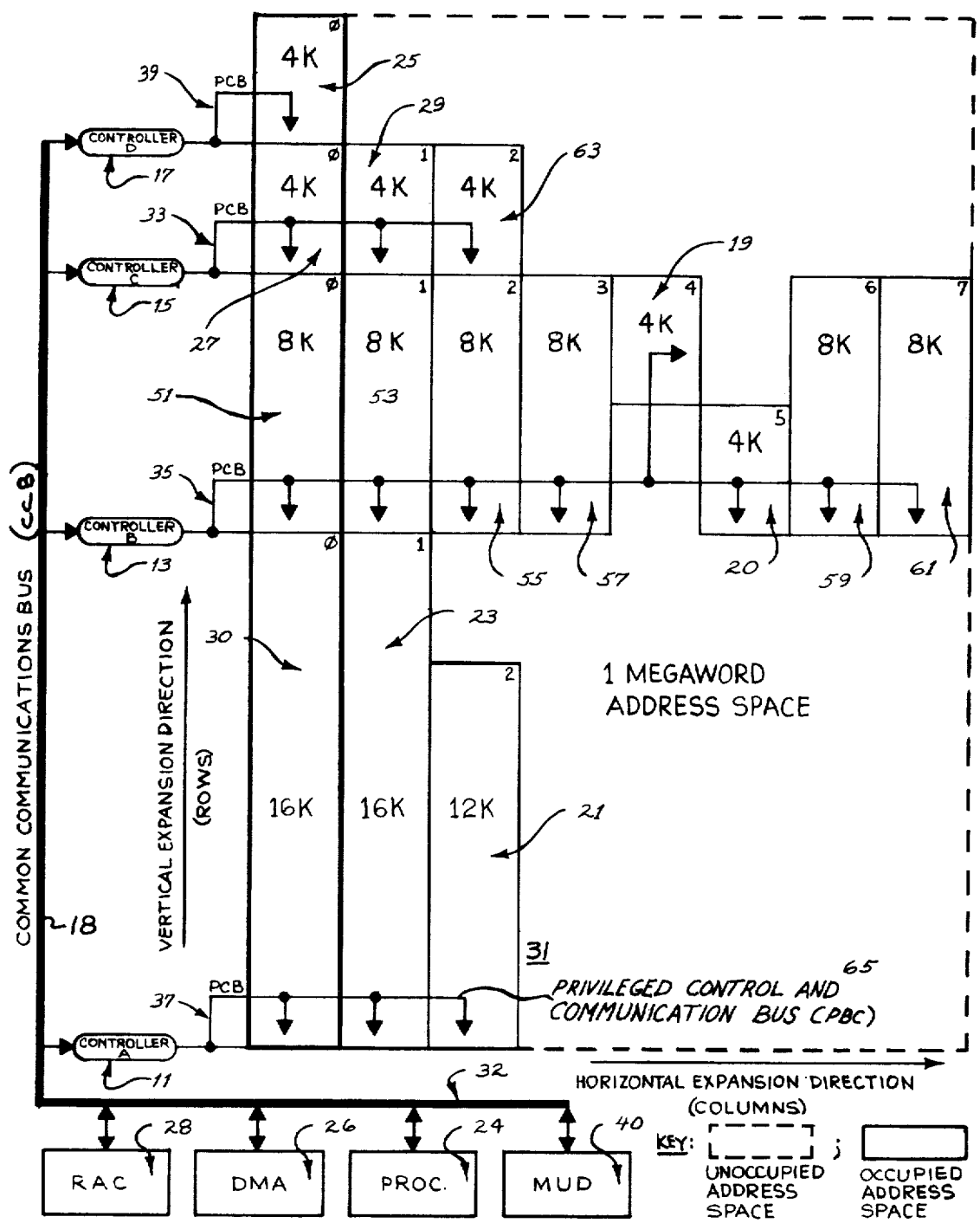
FIG. 3 is a schematic diagram of a bank switching circuit according to one embodiment of the present invention.
Figure 4:
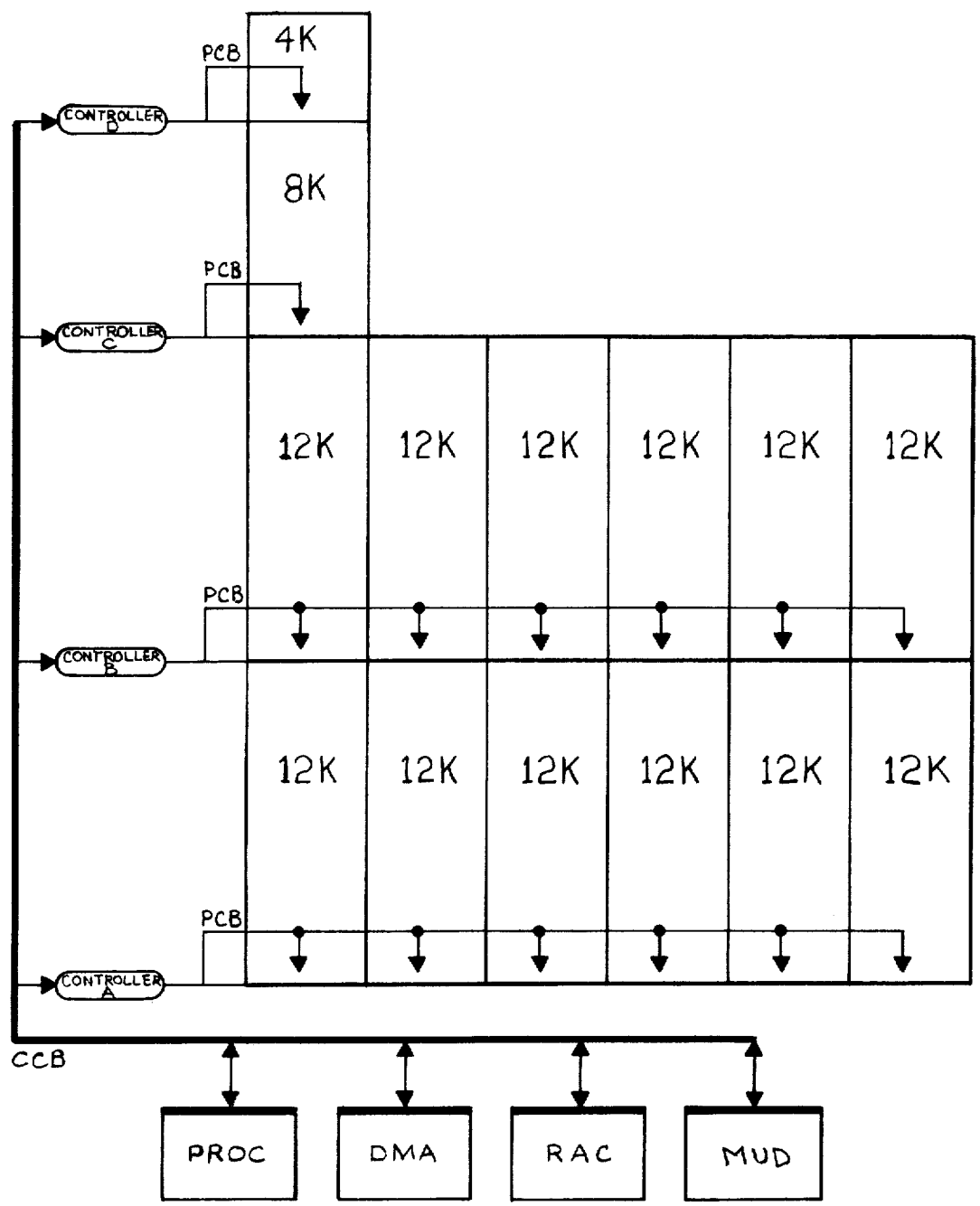
FIGS. 4–8 are schematic diagrams of embodiments of extended memories according to the present invention.
Figure 5:
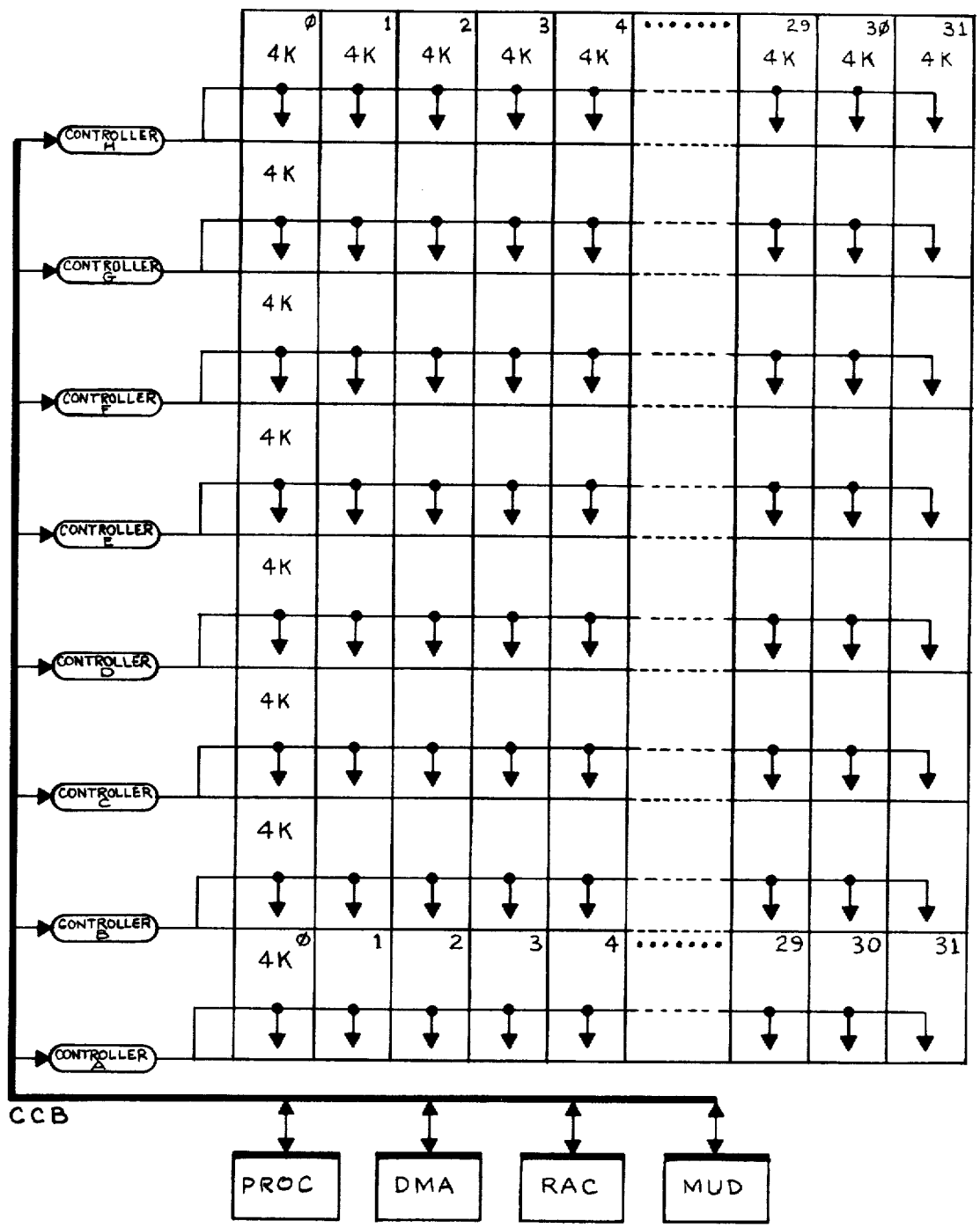
Figure 6:
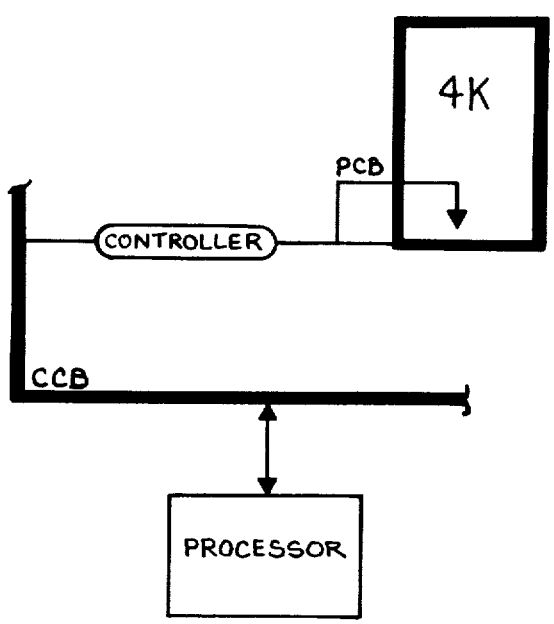
Figure 7:
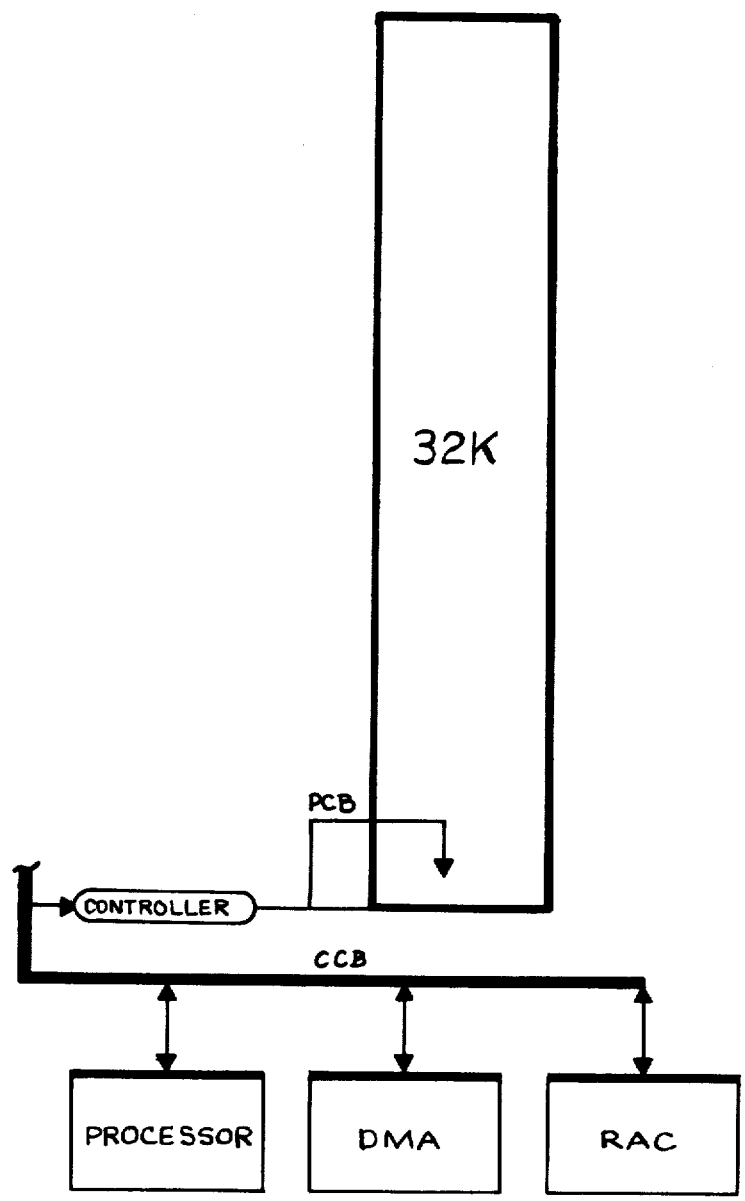
Figure 8:
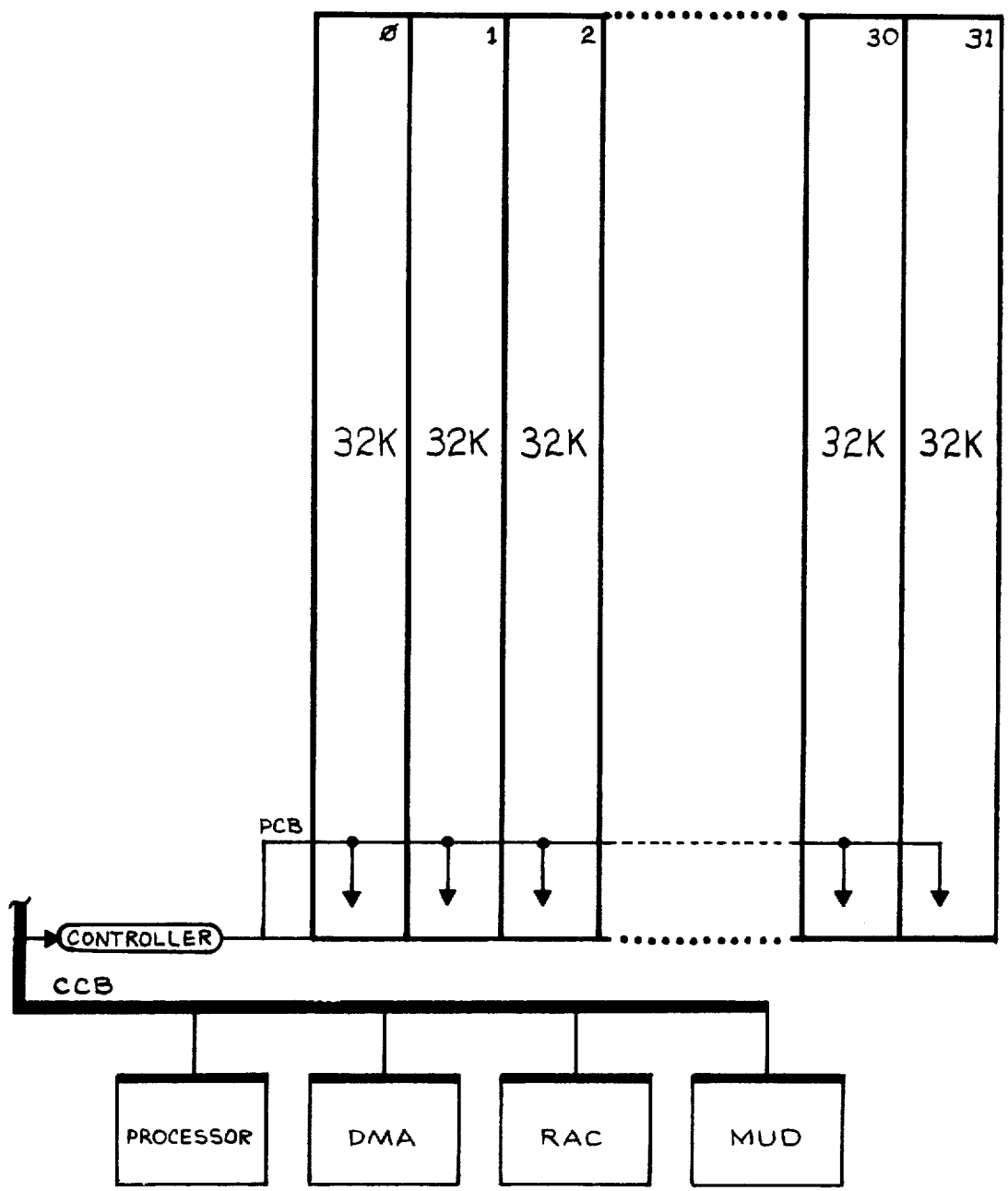

Referring now to FIG. 3, there is shown a pictorial diagram which illustrates the expansion of memory in accordance with the present invention in vertical or horizontal direction. Expansion in a vertical direction increases the amount of memory immediately available to the random access channel (RAC) 28, direct memory access channels (DMA) 26 and the processor 24, while horizontal expansion increases the amount of memory available to the using devices 24, 26, 28 after the processor 24 executes a Bank Switch (BKS). Bank switching causes a module (e.g. 23) or group or modules of memory to be brought into the logical address space of the using devices 24, 26, 28 while simultaneously causing the module 30 that occupied that portion of the address space to be excluded from the logical address space. The minimum size of these exchangeable modules (or quanta) is determined by the type of memory to be expanded. For example, a 1K bit semiconductor memory chip may be the smallest size of the type of memory being used, and therefore, determines that the smallest module is 1K bits. In the preferred embodiment a 4K-word module is illustrated. The maximum number of modules in a horizontal row is determined by such factors as the format of the bank switch instruction, which in the preferred embodiment allows up to 32 modules per horizontal row, the drive capability of the driving elements in the associated controller, and the size of the housing or memory chassis. The maximum number of modules which are grouped together and switched in and out of the address space 31 as a unit is determined by the amount of the logical address space 31 dedicated to the controller of the particular group, or set of groups, of modules, and the manner in which these groups are configured. Vertical expansion is limited by the size of the logical address space 31 (which, of course, may be extended by such well known means as base registers, or the like), and the smallest size of an increment used to increase this address space is again determined by the type of memory to be expanded. In the illustrated embodiment this increment size is 4K words, 8K words or larger.

As shown in FIG. 3 a separate controller is required for each group of modules of memory that is switchable. A controller 11, 13, 15, 17 is allotted a portion of the address space 31 which may be completely filled by the group of modules under its direction. For example, controller 11 is coupled to MOD 30 which is composed of four 4K modules, and to MOD 23 (also composed of four 4K modules) and to MOD 21 which is only partially filled with three 4K modules. Similarly, controller 13 is coupled to MOD 19 and MOD 20, each being only partially filled with one 4K module in an address space of 8K words.

Only one vertical column of memory per controller is present in a given address space 31 at any one time (in this mode of operation), and only the module which is present within the address space 31 will respond to commands or addresses supplied to it by the controller associated with that module. This is accomplished by separating the signals necessary to control the group of memory modules from the signals necessary to control and communicate with the memory subsystem in general. Thus, the memory-using devices 24, 26, 28 or any other memory-using device (MUD) 40 communicate with the controllers 11, 13, 15, 17. In the illustrated embodiment, up to 8 controllers are possible with each controller having a 4K section of the address space 31 and therefore a 4K module per group (vertical column) which communicates with memory-using devices 24, 26, 28, 40 via the Common Communications Bus 18. However, only the controllers 11, 13, 15, 17 are capable of communicating with and controlling the actual arrays of memory via the Privileged Communication and Control Buses 33, 35, 37, 39. These buses interconnect a given controller with its associated memory modules. Thus, in the illustrated embodiment, the Privileged Communication Bus (PCB) 37 of controller 11 goes to MOD 30 (2 modules of 8K words or 4 modules of 4words), to MOD 23 (2 modules of 8K words or 4 modules of 4K words), and to MOD 21 (1 moldule of 8K words and one module of 4K words, or 3 modules of 4K words), and to no other modules or groups. Bus 37 thus carries the addresses and commands and the timing and data signals necessary to operate the memory under the control of controller 11. In a like manner, controller 13 is coupled to the groups (i.e. columns) 51, 53, 55, 57, 19, 20, 59 and 61 via privileged control bus (PCB) 35. Similarly, controller 15 and groups 27, 29, 63 are interconnected by PBC 33, and controller 17 and the single module 25 of the group are interconnected by PCB 39.

As mentioned earlier, the address space 31 may be broken up into eight switchable sections, or rows of 4K each, each with its own controller and a number of single modules of 4K size (up to the maximum number of groups or columns earlier described). FIGS. 4, 5, 6, 7 and 8 show several examples of different possible expansion configurations. In general, expansion of the memory address space 31 is extremely flexible in that any section of the address space may be under the control of any controller, as long as each group of modules occupies a unique set of X-Y positions of the address space 31 and extended address space 65 and as long as the aforementioned basic restrictions are not exceeded. The maximum sum of the address space 31 and the extended address space 65 in the illustrated embodiment is 1024K words arranged in a 32K vertical direction and up to thirty-two columns of 32K each in the horizontal direction. This extended memory may be arranged in any manner within the bounds of this 1024K work space, leaving gaps wherever appropriate, and the groups of switchable modules may be arranged in any manner possible using 4K and 8K modules within the 32K of vertical address space, as illustrated.

The preferred embodiment uses a Metal Oxide Semiconductor (MOS) memory, for example, but any known memory technology (core, transistor, magnetic disc or drum or tape, magnetic bubbles, etc.) in any known memory configuration (e.g. ROMS, RAMS, shift registers, etc.) may be used in this structure. This is accomplished by providing a controller which generates the requisite operating signals essential for controlling the memory technology involved.

Figure 10:
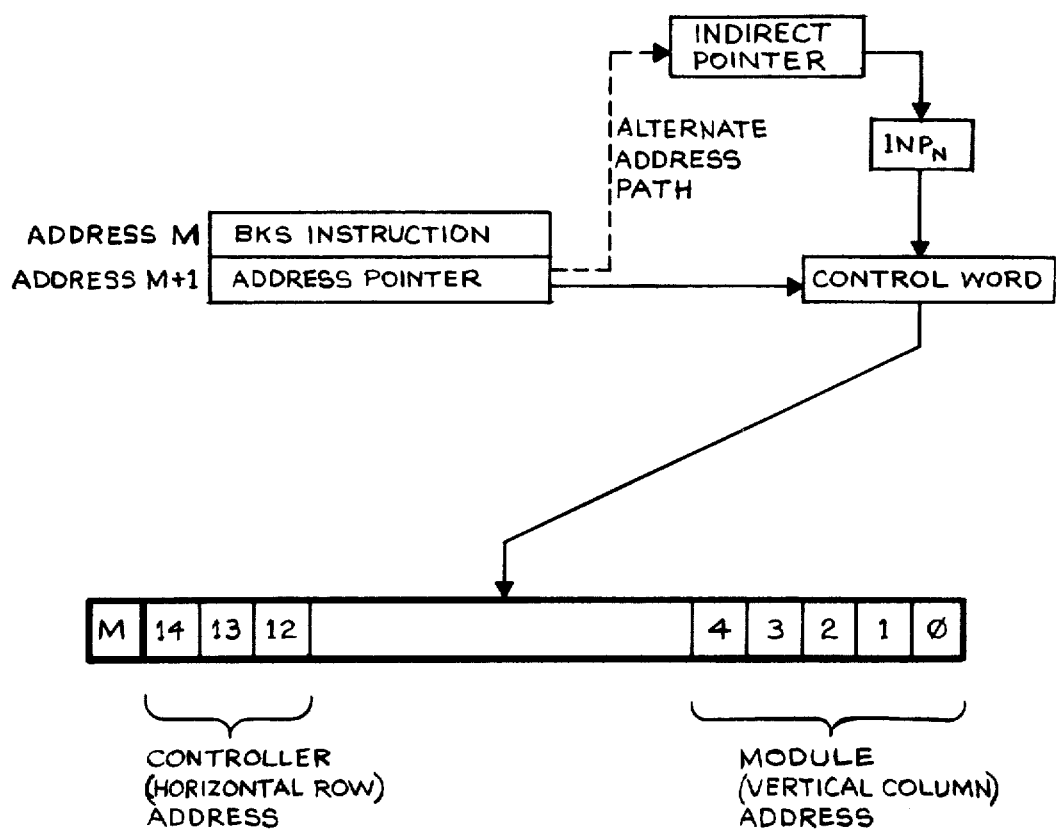
FIG. 10 is a graphical presentation of the control word format for bank switching (BKS)

The separation of the common control bus (CCB) and the privileged control buses (PCB) as previously described in connection with the illustrated embodiment facilitates the execution of a bank switch instruction (BKS), and the control mechanism within the memory controllers 11, 13, 15, 17 makes execution of such an instruction possible. Referring now to FIGS. 3 and 10, a bank switch (BKS) instruction proceeds in this manner: first a memory-using device (e.g. processor 24) fetches the instruction out of any memory location and decodes it. This decoding indicates to the processor that the fetched instruction is a BKS. The next logical location, as established by such well known means in the computer art as indexed or base or relative addressing, or the like, would be fetched. This location would either be the address of a location wherein a control word of the format similar to that shown in FIG. 10 would be obtained, or would represent a means of obtaining the address of the location wherein such a control word (FIG. 10) may be found (e.g. by indirect or base or relative or indexed addressing techniques well known in the computer art). The address thus obtained is used in the next step.

Using the address thus obtained, the control word whose format is shown in FIG. 10 is fetched. This control word is sent to the controllers 11, 13, 15, 17 and from there is every module of memory in the systems. The controller address portion (bits 12, 13, 14) is decoded by every memory module in the system. If the controller 11, 13, 15, 17 which controls the horizontal row of memory groups in which the appropriate module resides should respond then the one memory module sends a signal to the associated controller (over the PCB) to condition that controller to respond to signals which the processor 24 will soon generate.

While the controller address is being decoded, the column address is also being decoded by every module in the system. Every module which resides in the column specified by bits 0-4 of FIG. 10 will, at this time, apply an input to a flip flop (MEFF) as later described. All other columns will not assert this input. Either during the time, or prior to the time, that the row and column addresses are being decoded, the processor 24 checks to see that execution of a BKS instruction will not interfere with other elements of the system. If elements of the system would be adversely affected the processor 24 may now terminate execution of the rest of this instruction. If interference would not occur, then the next step of the bank switch instruction is executed.

The processor 24 provides a signal or signals that indicate a bank switch shall now occur. In the controller previously selected from the desired memory module, a clock is generated by combining the signal provided by the processor 24 with either an internally generated timing pulse or a timing pulse provided by the processor. This clock is applied to the clock inputs of all of the modules controlled by that controller along its horizontal row. This sets or asserts the MEFF on the coincidence of the row whose controller generated such clock and the column which was decoded, as previously described, and applied to the input of the MEFF. All other MEFF's on the selected row are reset (i.e. to a non-asserted state). This concludes execution of the bank switch instruction.

The MEFF controls whether or not a particular module responds to read or write requests from the controlled of that horizontal row. If the MEFF is asserted, that particular module will respond to memory operations requested by its controller. Since there is only one column of MEFF's in any given switchable row of memory asserted, only one of the possible N columns will respond to read or write requests from the associated controller. Note that setting of the MEFF in the selected row and column, as described above simultaneously selects the indicated column by asserting its MEFF and expells the previously selected column by forcing its MEFF to a non-asserted state. If the new and previous columns happen to be the same, then of course the same column remains in the address space. However, in some applications it is not desirable to allow certain modules to be bank switched, and in other applications no modules should be bank switchable at all. This is accomplished by always asserting the input to the MEFF on the modules which are not to be switched. Thus, even if a bank switch instruction were to be executed whose control word indicated that the switch should occur in such a module, the modules are so configured to remain in the address space 31 and not be switched out. This feature of the illustrated embodiment makes possible extended memory configurations of the type shown in FIGS. 3, 4, 5, 6, 7, 8.

Figure 11:
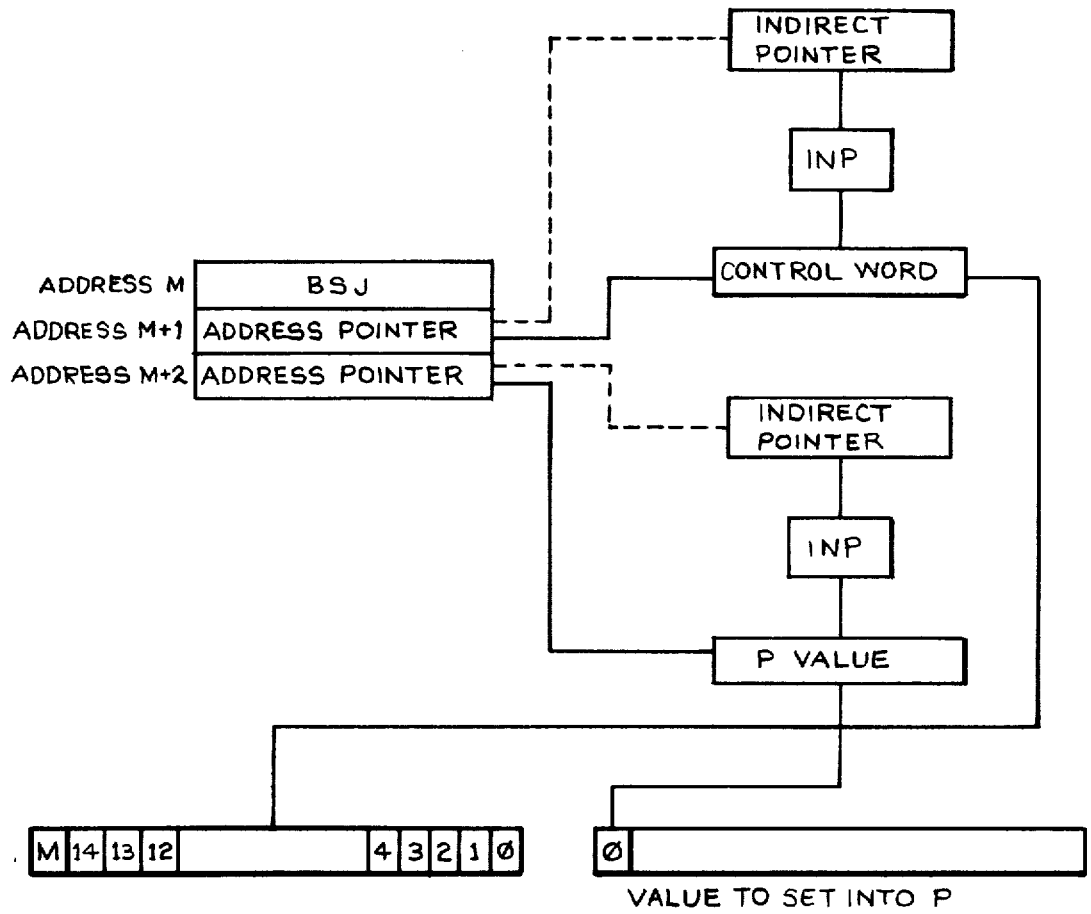
FIG. 11 is a graphical presentation of the control word format for bank switch and jump (BSJ)

Two other instructions are valuable in the practice of this invention, namely, Bank Switch and Set the program counter (BSJ), and Bank Sense (BSE). The Bank Switch and Set program counter instruction (or Bank Switch and JUMP) is illustrated in FIG. 11 and is used to switch to an indicated bank (as in BKS) and set the program counter of the processor 24 to an indicated value. This instruction makes it possible to indicate where the processor 24 will continue execution of the instruction stream after the bank switch takes place. This indicated value for the program counter may be stored anywhere within the address space 31, including within the group of modules of memory which was switched by this instruction. BSJ is executed in the same manner as BKS except that another pointer is fetched in a manner similar to the fetch from the next logical location, as previously described. This address pointer is then used to fetch another word that contains the value to which the program counter is to be set. The program counter is set immediately after obtaining this value and this assures that proper checks by the processor 24 have been made and that the program counter will not be disturbed until it is safe to do so.

Figure 12A:
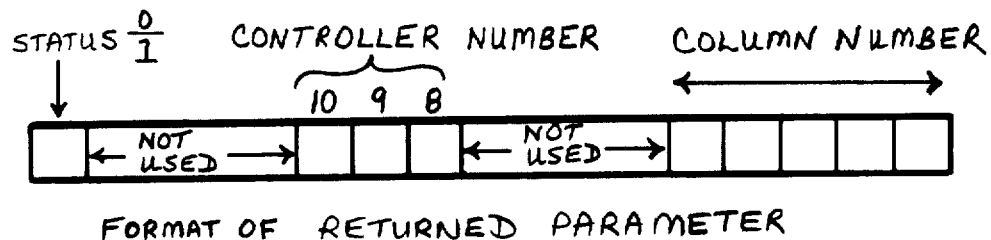
FIG. 12a is a graphical presentation of the control word format for bank sense (BSE)
Figure 12B:
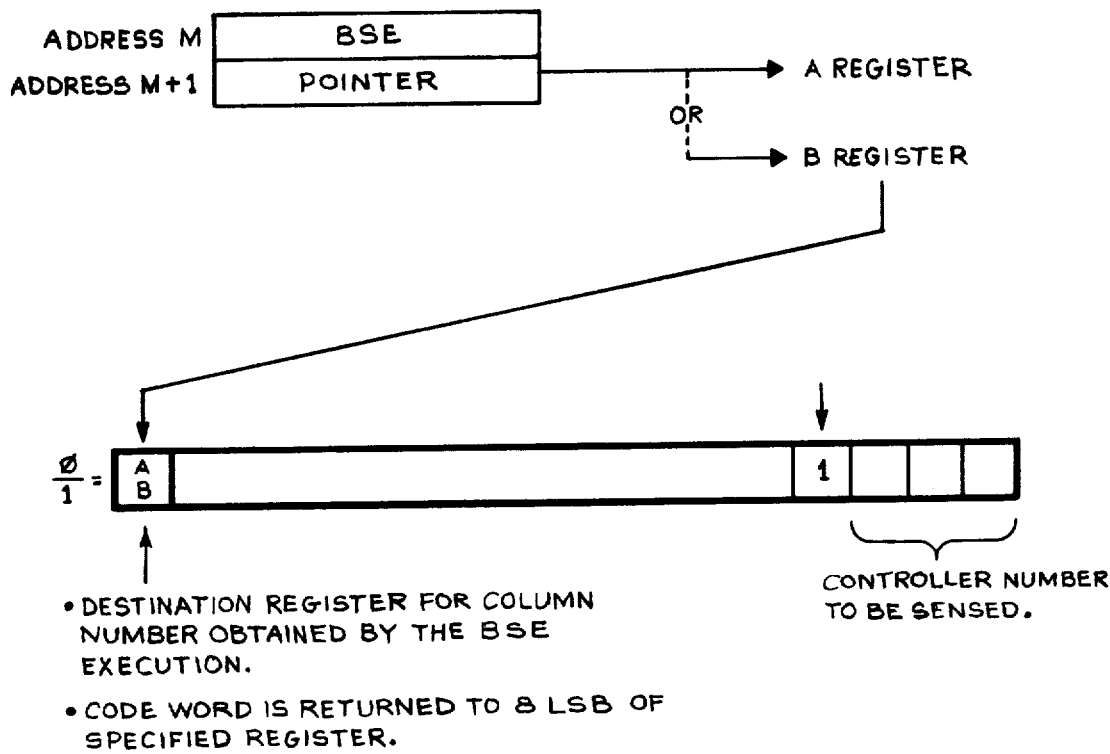

Referring now to FIG. 12b, the Bank Sense instruction (BSE) is used when a program (or programmer) has to find out which column (group) and number (of modules) are under the control of a given memory controller at a given time. The BSE instruction is executed when this instruction is fetched and decoded, at which time the processor 24 recognizes that a Bank Sense (BSE) is to be executed. The contents of a specified register (or memory location) are then read and both a destination register for this sensed value as well as a controller address are determined. The controller address is sent to the controllers via the common control bus (CCB) and from there to all modules of memory in the address space. The controller address is decoded and sent to (and only to) the controller of that horizontal row of memory. The processor 24 then asserts the Read command and a Bank command. This causes a read cycle to occur in memory without enabling any of the memory arrays. Instead, another signal called Sense is issued and this causes a value to be placed on the privileged control bus (PCB) by the module whose MEFF is asserted in the horizontal row of the controller previously addressed as described above. If no modules are active in the specified and decoded row (i.e. controller address), a default value of all "1's" is returned to the controller. Additional status information may also be passed. This value is entered into the data register of the controller in a conventional data-read-and-enter manner over the PCB at this time. The processor 24 obtains the data so stored in the same manner as it obtains normal data, and concludes execution of this instruction by storing such data into the destination register or memory location, as indicated by the control word fetched at the start of this instruction.

BSE saves memory space because tables don't have to be used to keep track of what is resident in the address space. BSE also makes it possible to easily determine which modules were resident in the address space 31 when a power failure occurs. This is accomplished by executing N bank sense instructions (BSE) (where n is equal to the size of the address space divided by the smallest module of memory) and by incrementing the controller address between each execution. The values thuse obtained are stored in a table for retrieval upon "power up" for the system. The Bank Sense (BSE) instruction format is particularly well suited to this mode of operation because of its format. As shown in FIG. 12b, the controller address is in the least significant bits of the control word thereby making it necessary to only increment the control word value to go to the next (BSE) execution for the next controller in the loop (as opposed to adding an unhandily long number to the control word). This saves both execution time and in the n constant values which would otherwise be needed to execute this instruction for each possible module of the address space 31.

When the system of the present invention is powered on, it must become operational in a well-defined manner without executing extraneous operations and without establishing illegal operating states. In order to prevent all the modules of memory from powering on with their MEFF's asserted (i.e. corresponding to the illegal condition of all modules present in the address space), each controller generates a Reset signal which is sent to every module of memory under its control. The reset pulse may be applied either to the asynchronous set or to the asynchronous clear of the MEFF's in each module. Only one MEFF in a given 4K horizontal row may be asynchronously set, while all other modules in that row are asynchronously cleared by the reset signal. Thus only one module (column) is present in the address space at initial "turn on" and remains in that state through the operation of the system until the execution of a BKS or BSJ for that module. If no MEFF's have a Reset applied to their asynchronous sets, then no modules are preset into the address space of that horizontal row and a Bank Switch (BKS) or Bank Switch and Jump (BSJ) must be executed to obtain memory for that portion of the address space 31.

Figure 35:
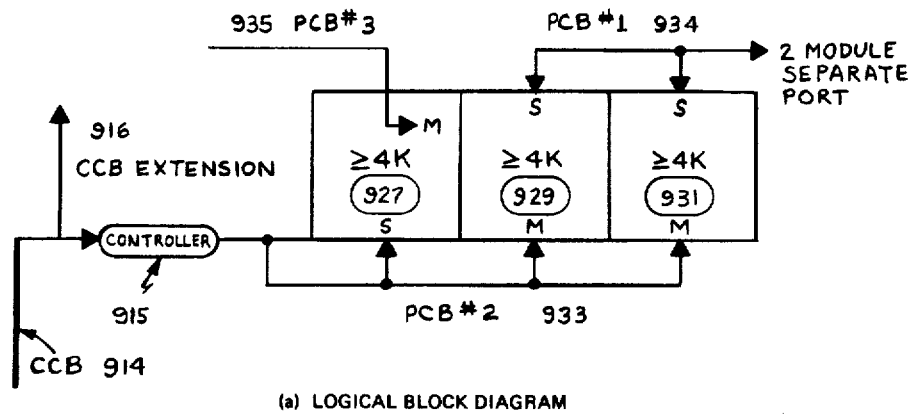
FIG. 35a and b are logical and physical diagrams, respectively, of multiple port modules according to the present invention.
Figure 35:
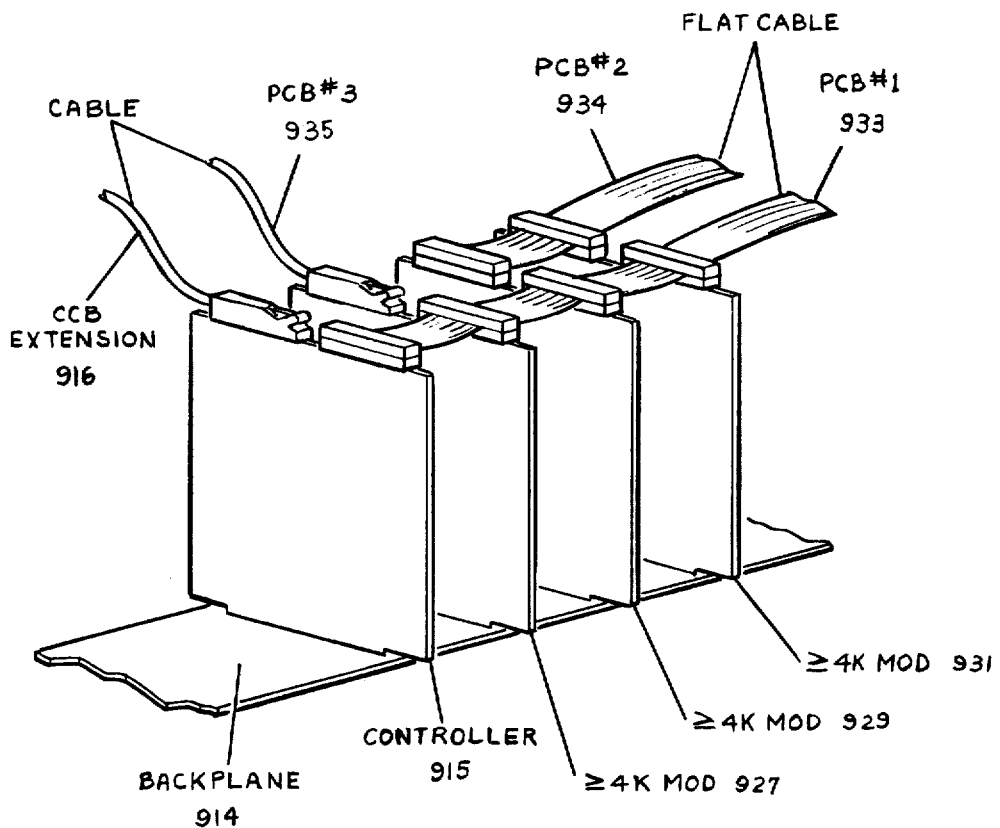

Certain types of memory require periodic refreshing or cycling in order to maintain the information stored in it. Some types of Metal-Oxide-Semiconductor (MOS) random access memories (RAM's) and shift registers are of this type. With such types of memories, the refreshing or cycling operations must be performed even if the modules are not within the address space 31 (i.e. they are in suspension). This is accomplished by providing a refresh address on the memory module and associated cabling, as shown in FIG. 35, and by providing the appropriate timing signals for a refresh (or cycling) to occur. Thus, a module which is in suspension may nevertheless react to Bank Switch instructions and to refresh or cycling commands.

Figure 24:
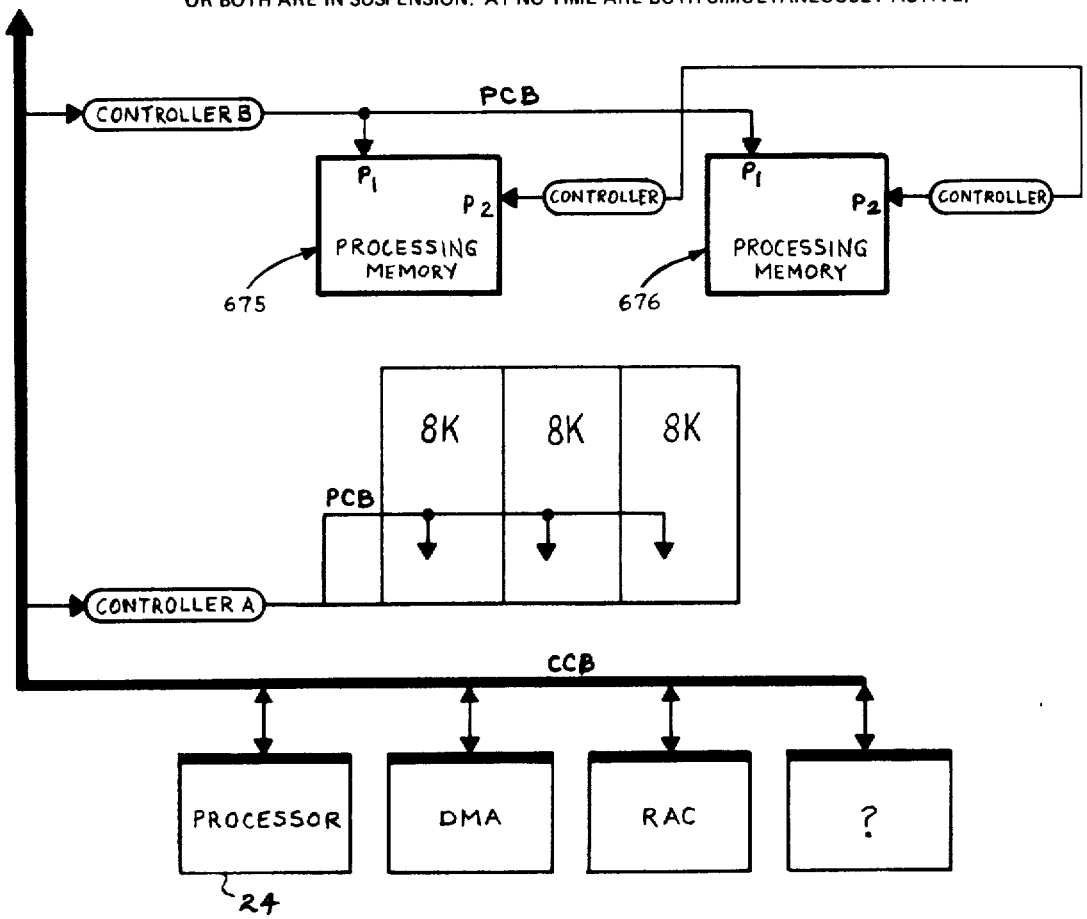
FIG. 24 is a schematic diagram of a processing memory system according to the present invention.

There are types of memory known in the art as processing memories. These memories as shown in FIG. 24 perform predetermined operations such as ordering their contents in a particular order, performing an inversion of their contents, and the like. One distinct disadvantage of this type of memory is that while it is executing its operation(s), that portion of the address space 31 which it occupies is not available for the use by the processor 24, or other memory-using devices 26, 28. The execution of a BSJ or BKS instruction within the present invention would set such a type of memory outside the address space 31. This would reset the MEFF of this particular module (quantum or group of quantums) of memory which would then indicate to this particular group of suspended memory that it should execute its assigned task. Thus a control structure exits in accordance with this invention that allows further extension of the role of memories in the present systems. It should be noted that not all of the bits in the control word format (FIG. 10) are used, but rather some bits are reserved for further extension of memory capability as memory technology advances. The most significant bit is reserved for a mode bit which changes the meaning of the remainder of the control word, thus allowing as-yet-undefined instructions to be passed to the memory subsystem. Other bits allow memory expansion to a theoretical limit of about 1 billion words. At present this limit is out of reach of economic development but the control structure is present to accommodate such an expansion or any other expansion in which the modules are either in the form of memory or of other devices which may be treated as memories.

Figure 13:
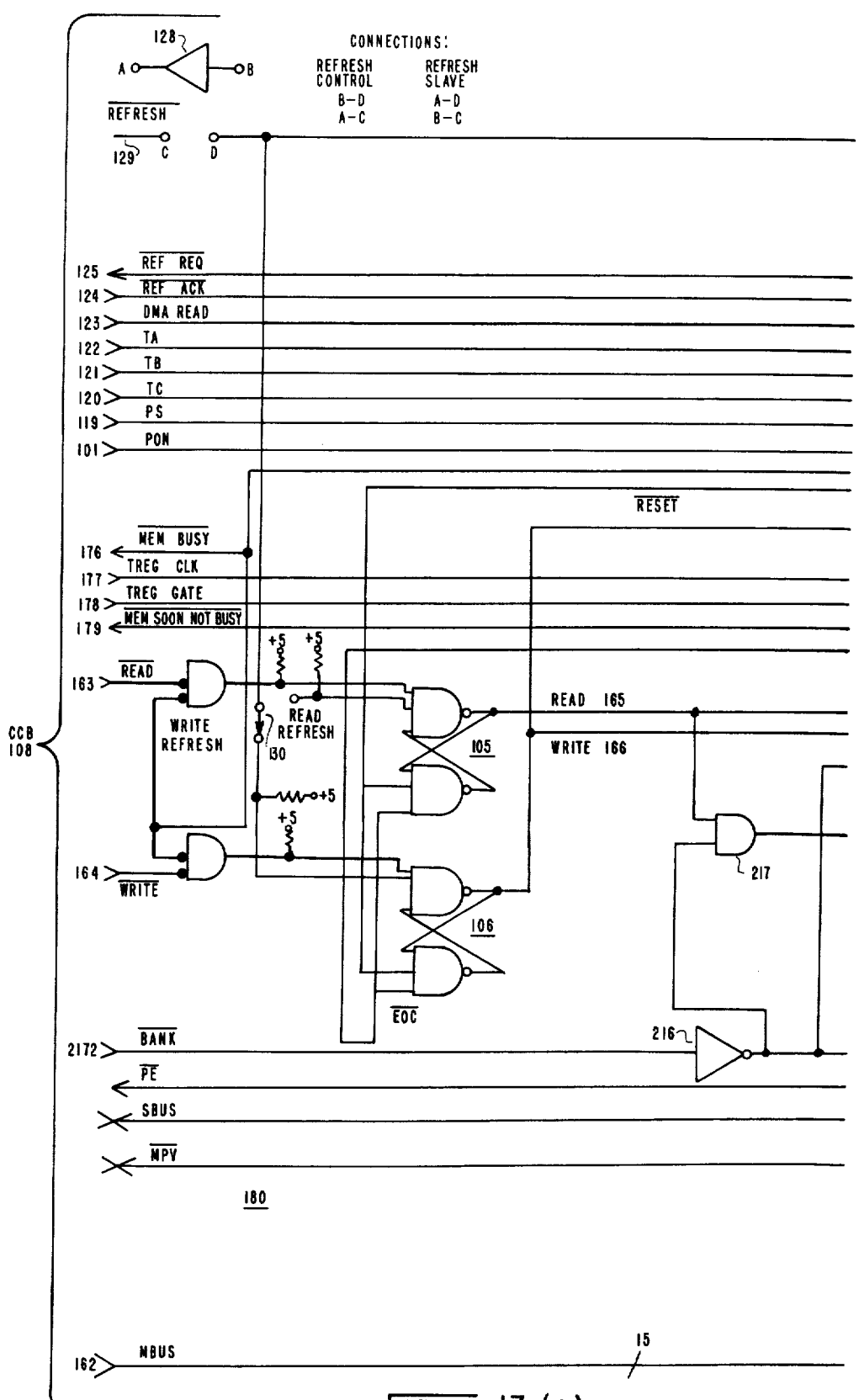
FIGS. 13a, 13b and 13c taken together are a schematic diagram of a memory controller according to the present invention.
Figure 13:
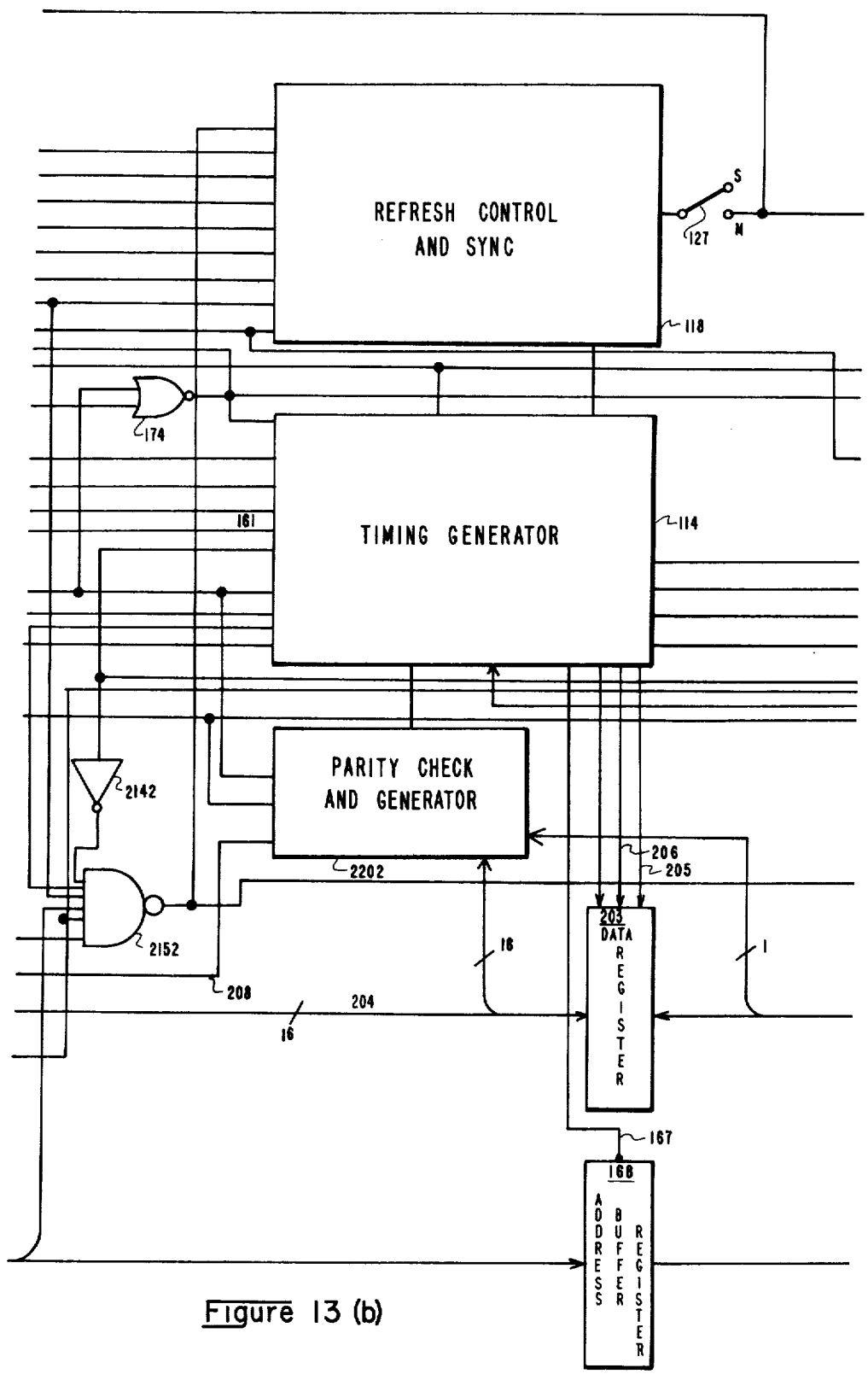
Figure 13C:
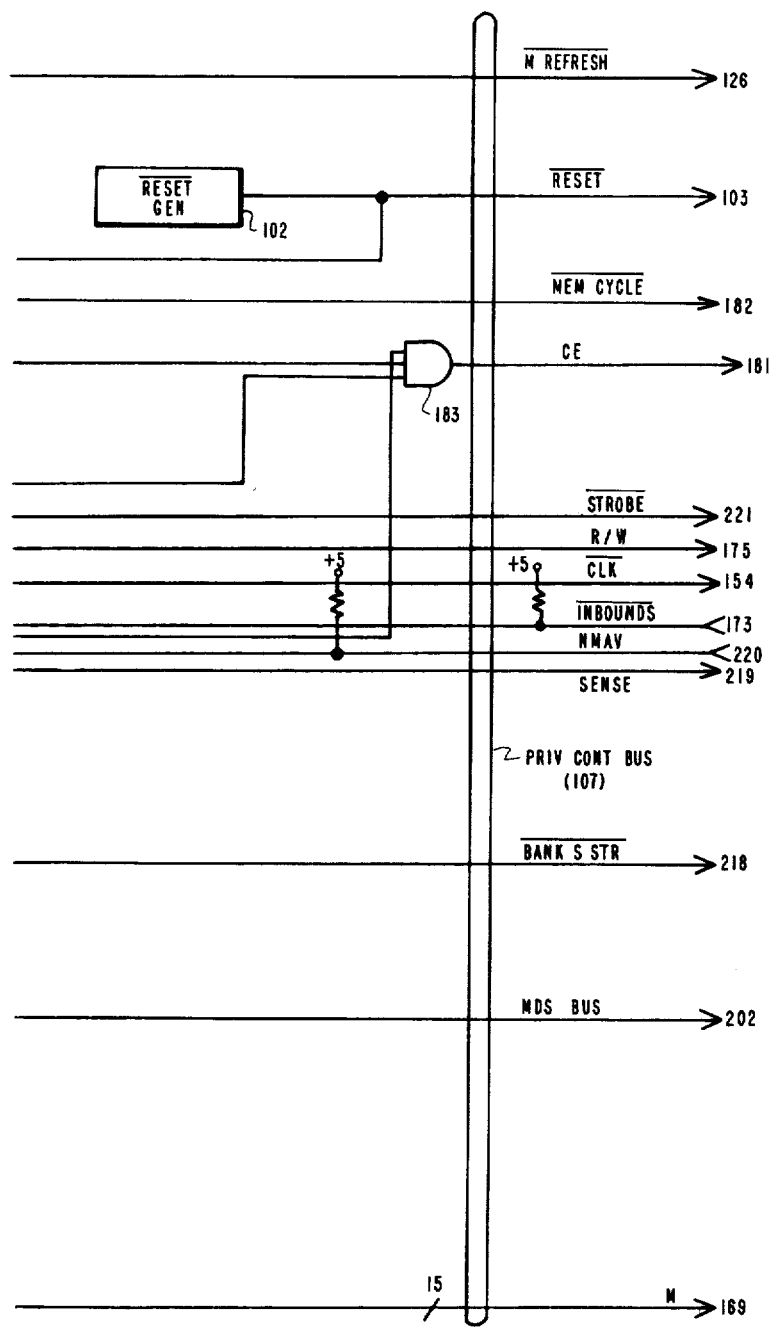

Referring now to the drawings, FIGS. 13a, 13b and 13c show the controller and FIGS. 14a, 14b, 14c, 14d, 14e and 14f show the Memory Module of the Polymorphic memory subsystem. In FIGS. 13a – 13c, conventional circuitry such as timing generator, data registor, parity checker generator, and address buffer register are shown in block diagram form to simplify the drawing. FIGS. 14a – 14f shows a full schematic of one type of memory module. This module uses thirty-four 4K-MOS Memory chips for a total of 8K words × 17 bits, thus forming an 8K switchable quantum of memory.

General Memory Operation

Referring now to FIGS. 13a, 13c and FIGS. 14a – 14f for a description of memory operation, it is assumed that power is initially off. The following described events occur to bring power on and insure that memory arrives at a known state before any operations occur.

Memory Refresh

Figure 39:
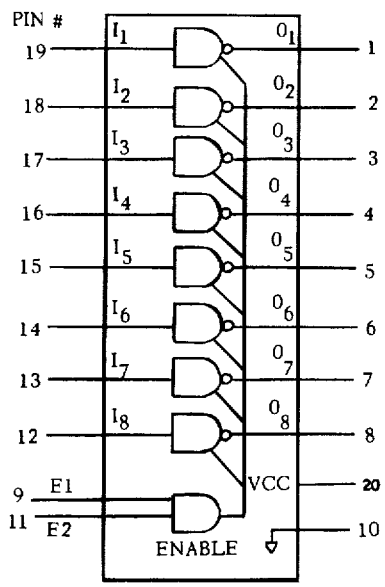
FIG. 39 is a schematic diagram of logic gates used in circuits of the present invention.

Power is turned on and, when the power supply has stabilized, PON 101 is asserted. Before PON 101 is asserted the reset generator 102 assets the Reset signal which is applied to the timing generator 114 to reset all Flip Flops used in generating the timing signals, including the Read FF 105 to reset it so a read operation will not occur without it being requested, and the Write FF 106 so that a write operation won't occur without it being requested. The Reset signal is sent to all Memory Module boards under the control of this controller via the Privileged Control Bus (PCB) 107. On the Memory Module Board (FIGS. 14a – 14f) the Reset 103 enters the board from the PCB 107 and is applied to the configuration switch 109. If this switch is in the IN position the Reset signal 103 is applied to the asynchronous clear of the MEFF 110. This action will cause the MEFF 110 to be reset, which is the state that designates that this particular module of memory is preset into the address space 31. If the configuration switch 109 is in the OUT position, the MEFF 110 is set in the state that designates that this particular module is preset outside the address space 31 and, therefore, won't respond to commands or addresses sent to it. Non-response to requested operations is the result of the output of gate 112 being not asserted which, in turn, is caused by gate 111 being asserted. Assertion of gate 111 is caused by the MEFF 110 being reset and a condition, later described herein, in the other port being met. Thus the MEFF 110 determines the output of the gate 112 which is applied via line 1142 to the address buffers 113 of the type, for example, shown in FIG. 39, the CE buffer 187, the NMAV 115 gate, the Clk buffer 196 (FIG. 14b), and the R/W gate 117. These functions are therefore, disabled if the MEFF 110 is not asserted and enabled if MEFF 110 is asserted. Therefore, a memory operation will occur if the MEFF 110 is asserted (reset) and will not occur if it is not asserted (set). In this manner, a module of memory is either preset into the address space 31 or preset out of the address space and the present invention attains a known state at power "turn on".

PON 1 is also applied to the Refresh Control and sync generator 118. This causes the generator 118 to return from its "power down" refresh mode and issue the MREFRESH signal in accordance with the requirements of the type of memory used in the system. The signals 119, 120, 121, 122, 123, 124 and 125 in conjunction with PON 1 are used to properly sync and generate MREFRESH 126. MREFRESH 126 causes either a Read cycle or a Write cycle to occur in accordance with the position of the switch 130. This capability accounts for the fact that some memory types must be read to be refreshed while other memory types must be written to be refreshed. In the illustrated embodiment a write cycle is used to refresh memory and a write cycle is initiated by MREFRESH 126. MREFRESH 126 is also sent to all the memory modules under the control of this controller via the Privileged Control Bus (PCB) 107 to gate 131 which buffers the signal and from there is applied to the gate 158 and switch 133(a). If the MEFF 110 is asserted, the other input to gate 158 will be asserted and thus the gate 132 will be asserted. The assertion of this gate output causes the output of the gate 133 to be not asserted. This state is applied to gates 134, 135, 136 and 137 thus preventing them from being asserted and this prevents CEU (145) and CEL (144) from being asserted. This satisfies the requirement of the type of memory 146, 147 used in the illustrated embodiment for a refresh to occur without disturbing the data in the memory 146, 147. The output of gate 132 being asserted also causes the output of the gate 198 to be asserted, thus causing the R/W line to assume a write (low) state, another necessary condition for the memory 146, 147 used in the illustrated embodiment to be refreshed. The assertion of the gate 132 is also applied to some of the address inputs 151 (highest 5 bits) of the memory chips 146, 147 to provide the address of memory to be refreshed. At the end of the refresh cycle, the removal of the assertion of this signal causes the counter 149, 150 to binary count by 1, thus preparing for the next memory refresh cycle. Now the memory refresh may be completed upon application of a clock (CLK) 51, 52 to the arrays 146 and 147. Since a write cycle was initiated by the MREFRESH 126 signal when it set the WRITE FF 106, the Clk 154 will be generated by the timing generator 114. Thus, a refresh cycle occurs when the memory module is present in the address space 31 and, when the memory module quantum is outside of the address space, refresh is accomplished in the same manner except that the output of the gate 132 is asserted by the gate 155 instead. Gate 155 is asserted (high) because gate 156 is asserted (low). The gate 156 is asserted when the memory module is not present in the address space 31 because the MEFF 110 is not asserted (set). Therefore, one input to the gate 156 is high (asserted), the switch 133(a) is in the P2 position and whenever MREFRESH 2 (126) is asserted, the gate 157 inverts it and, therefore, asserts the second input to the gate 156. The remaining input, later described herein, may be assumed to be asserted. Thus when the switch is in the P2 position and the memory module is out of the address space 31, the memory will be appropriately refreshed. It should be noted that this mechanism provides a means for the controller to communicate with all modules not present in the address space 31 and, therefore, provide for operations by and communication with modules in suspension. At the end of either type of refresh operation, the timing generator 114 issues the signal EOC 161 which resets the Read of Write FF 105, 106 (whichever was used), thereby ending the refresh cycle.

Read Cycle

Memory operations such as general Read Cycle, and a general write cycle will now be described. The specific Read and Write cycles which pertain to shared and mixed memories will be later described herein. A Read cycle is executed by a memory-using device (e.g. 24, 26, 28) presenting the desired address on the M bus 162, and asserting the READ 163 signal. This causes the READ FF 105 to be asserted and READ 165 is asserted (high) which causes the timing generator to start generating a sequence of timing signals. The first of these is to not assert (raise) the address transfer line of the address buffer register 168 which causes the address presented by the memory-using device to be clocked into the address Buffer register and held until the address transfer line is lowered (asserted). The Memory address Bus 169 has, in the intervening time sent the address to the memory module via the PCB 107 and applied it to the memory address buffers 113 as shown in FIG. 14d. If the MEFF 110 is asserted (reset), the address buffer will transfer the address to the address inputs of the memory array 146, 147. If MEFF 110 was not asserted (reset), this transfer will not occur and a cycle will not happen. Whether or not this portion of the address (bits A0 A12) is transferred to the memory array, bits 13 and 14 are sent to the gates 170 and 171. These gates in conjunction with switches 1420 and 1440 and resistors 1430, 1450 determine that if the 2 address bits match the input levels provided by the switches 1420, 1440 and the resistors 1430, 1450 (or the ground position of either or both of the switches 1420, 1440) the output of the two gates 170, 171 will be asserted (high). Assertion of this signal indicates that the address (vertical address of the module matrix illustrated in FIG. 3) i.e., is the address of the horizontal row of memory modules or groups of modules) controlled by this controller and, therefore that this controller should respond to this cycle request and take it to completion. The controller for that row is notified of this condition by the module board gate 1410 whose output is logic OR connected with all other gates 1410 on the horizontal row. The output of gate 179 is InBounds 1420 which is transferred via the PCB 107 to the controller that is thereby notified to continue the requested cycle to completion. If this signal is not received within a selected time period, the cycle requested is aborted and the controller is freed to accept the requests by the timing generator asserting the EOC 161 signal (as shown in FIGS. 13a and 13b). If we assume that the address matches at the configuration network and InBounds 173 is issued, then the Read cycle will continue. Mem Cycle is asserted on the controller by gate 174, a Clk 154 is asserted by the timing generator 114, and the R/W signal 175 is set to the R state (low) by the timing generator 114 (see FIGS. 13b and 13c). At the same time, the timing generator 114 informs the memory-using device that memory is busy (MEMBSY 176) and that the data isn't valid (Memory Soon Ready 179) by asserting and not asserting these signals respectively. The memory array responds to these signals if the MEFF 110 is asserted and a read cycle continues to be executed. During this operation, the processor 24 or other device, checks to see that the operation which started won't interfere with operations elsewhere in the system. If such interference is detected, the processor 24 (or other device) asserts the signal MPV 180 which causes the operation called for in memory to be aborted by not asserting the signal CE 181. This is because the gate 183 will not allow the signal CE 181 to pass through to the PCB 107 from the timing generator 114 where it was generated. The other input to the gate 183 is PON (Power ON) 101 which is not asserted (low) whenever the power to memory is insufficient. This prevents writing or reading under such conditions (and allows a refreshing mode to safely operate when the line voltage has been removed and the memory system is operating off batteries). If the processor 24 (or other device) does not assert MPV 180, the read cycle which was started will continue. The signals CE 181, R/W 175, and Clk 154 are transferred over the PCB 107 to the memory module and, if the MEFF 110 is asserted, the following will occur. The signal R/W 175 (low) is applied to buffer gate 185 causing its output to go low. This output is applied to the gate 186 making its input asserted, and is applied to gate 117, thus providing the R/W input to the memory arrays 146, 147 to produce a Read operation. Signal CE 181 is applied to the gate 187 and is transferred to the gates 134 and 135 on the memory module via the PCB 107. Address bit 12 by this time, has been either inverted or not inverted by the gate 188 and therefore that particular input to either gate 134 or 135 will be valid. Since this is not a Refresh cycle, the output of gate 133 will not be asserted and, therefore, will not prevent the gate 134 or gate 135 from being asserted, depending on the state of address bit 12. If gate 134 is asserted, the upper 4K section of memory 146 is enabled, if gate 136 is asserted, the lower 4K section of memory is enabled. A decision has thus been made as to which half of the memory the information is stored in and the input (CE) required by the memory has been provided.

Figure 36:
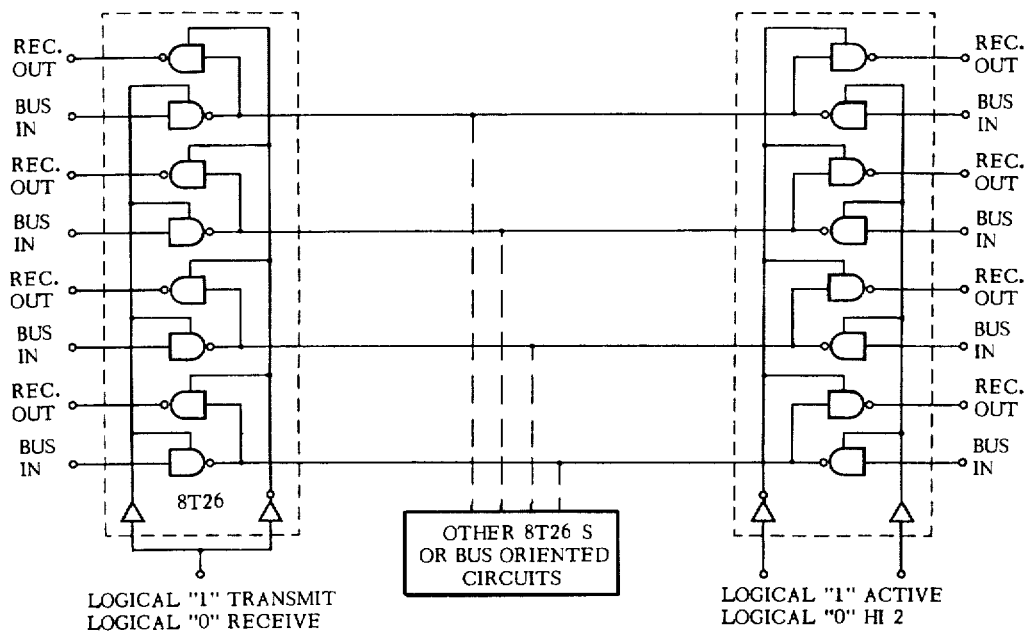
FIG. 36 is a schematic diagram of a commercially available bidirectional data bus gate.

The signal Clk 154 is generated by the timing generator 114 and is sent to the selected memory module via the PCB 107 to gate 189. Since the gate is enabled (i.e. MEFF 110 asserted), the signal Clk is transferred through gate 189 to gate 190, this input to gate 190 asserts the output (high) and enables one of the four inputs to gate 140 and 141. One of the other inputs to gates 140 and 141 is formed by the output and input of gate 188. Another input to each gate is provided by the output of gate 192 which indicates that the MEFF 110 is asserted. Another input to gates 140 and 141 is formed by gate 191 which indicates that the memory operation request is within the bounds of the module (INBOUNDS) which was decoded by the module decode section (170, 171, 173, 1440, 1430, 1450) and gate 193. Therefore all of the inputs to either gate 140 or gate 141 are present and the output of gate 140 or gate 141 is asserted. This, in turn, asserts the input to either driver 142 or driver 143 (depending on the state of address bit 12) and the memory module begins to fetch the information in the specified address. After an access time, the data from the memory appears on the DO Bus 194 which is sent to the memory data Bus Mux Set 197, 198, 199, 200 and 201 (of conventional design, e.g. Signetics type 8T26 or similar, as shown in FIG. 36).

One of the inputs on gate 186 was asserted from the beginning of the Read cycle and the other input is now asserted by the signal STROBE 221 which is generated by the timing generator 114 and transmitted over the PCB 107 to gate 196. This gate (196) then transfers this STROBE signal to the input of gate 186. The output of gate 186 is thus asserted and the Bus Mux Set 197–201 are enabled to pass data via the MDS Bus 202 to the Memory controller. This data is then strobed into the data register 203 by the clock signal 205 which is generated by the timing generator 114 and is also transferred into a flip flop in the parity checker 2202 which analyzes the contents of the data register 203 to determine that proper parity is present. If proper parity is present, the line PE 208 is not asserted and the data is considered valid. The processor 24 or other memory-using device at some point in time (either before or after now in the sequence of events thus described) either has or will assert the signal T REG GATE 178 which causes the timing generator 114 to assert the gate signal 206 to transfer the contents of the Register 203 to the SBUS 204 on which it goes to the device that made the original request for the Read cycle. At the end of this cycle the timing generator resets the Read FF 105 by issuing the signal EOC 161. The data may or may not be sent to the S Bus 204 by this time but it doesn't matter because the timing generator 114 will read to T Reg Gate signal 178 whether or not the cycle has been completed. When the timing generator 114 receives indication that the data is good, it asserts Memory Soon Not Busy 179 to notify the using device that the data is ready for its use and that other devices are to get ready to use memory again, thus freeing them to get started on the next operation in memory, if necessary. When the cycle is complete the timing generator 114 makes MEM BSY 176 not asserted and thus ends the Read Cycle.

Write Cycle

Figure 14:
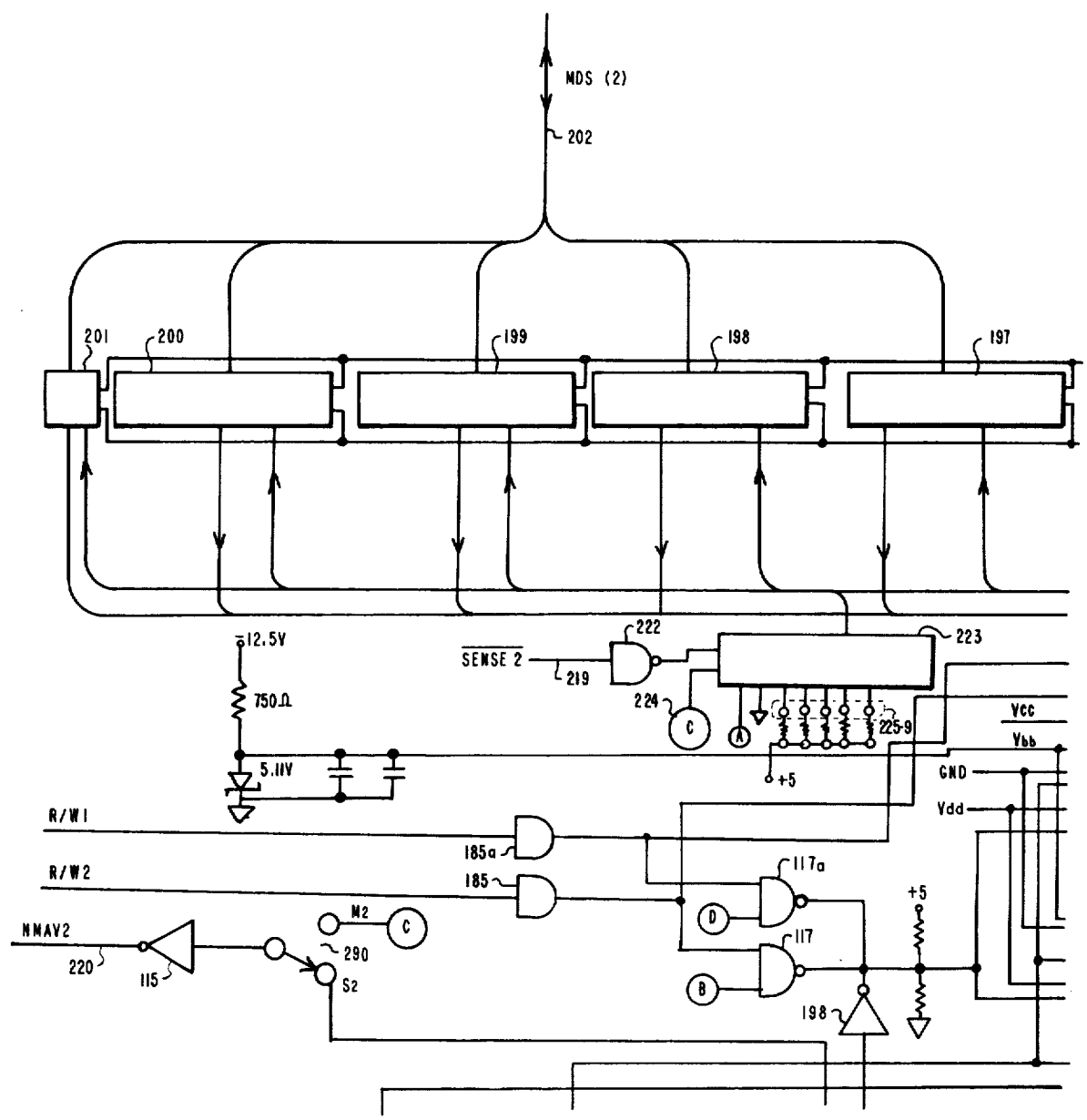
FIG. 14 illustrates the relationship of FIGS. 14a, 14b, 14c, 14d 14e, and 14f a schematic diagram of a memory controller according to the present invention.
Figure 14B:
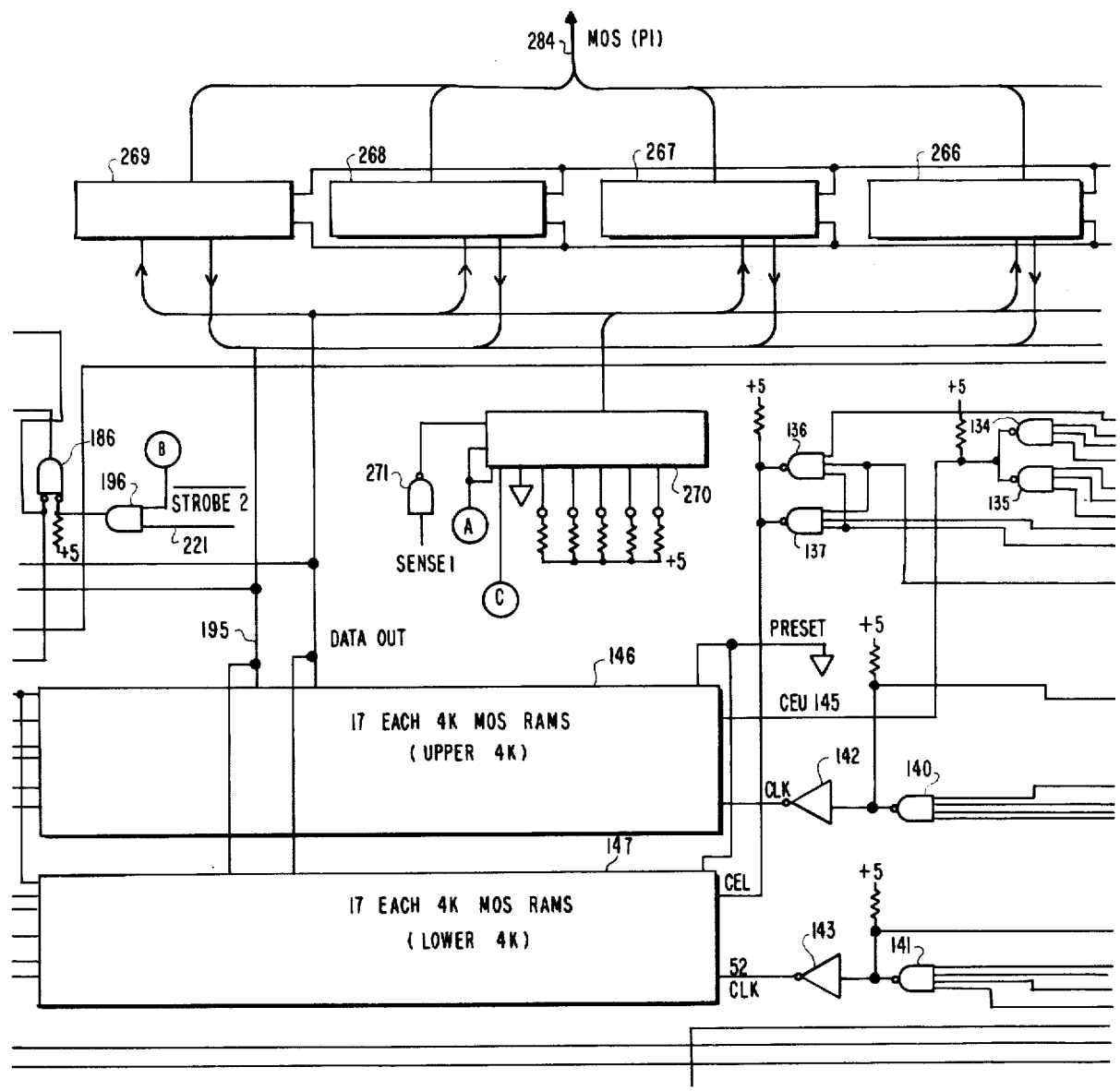
Figure 14:
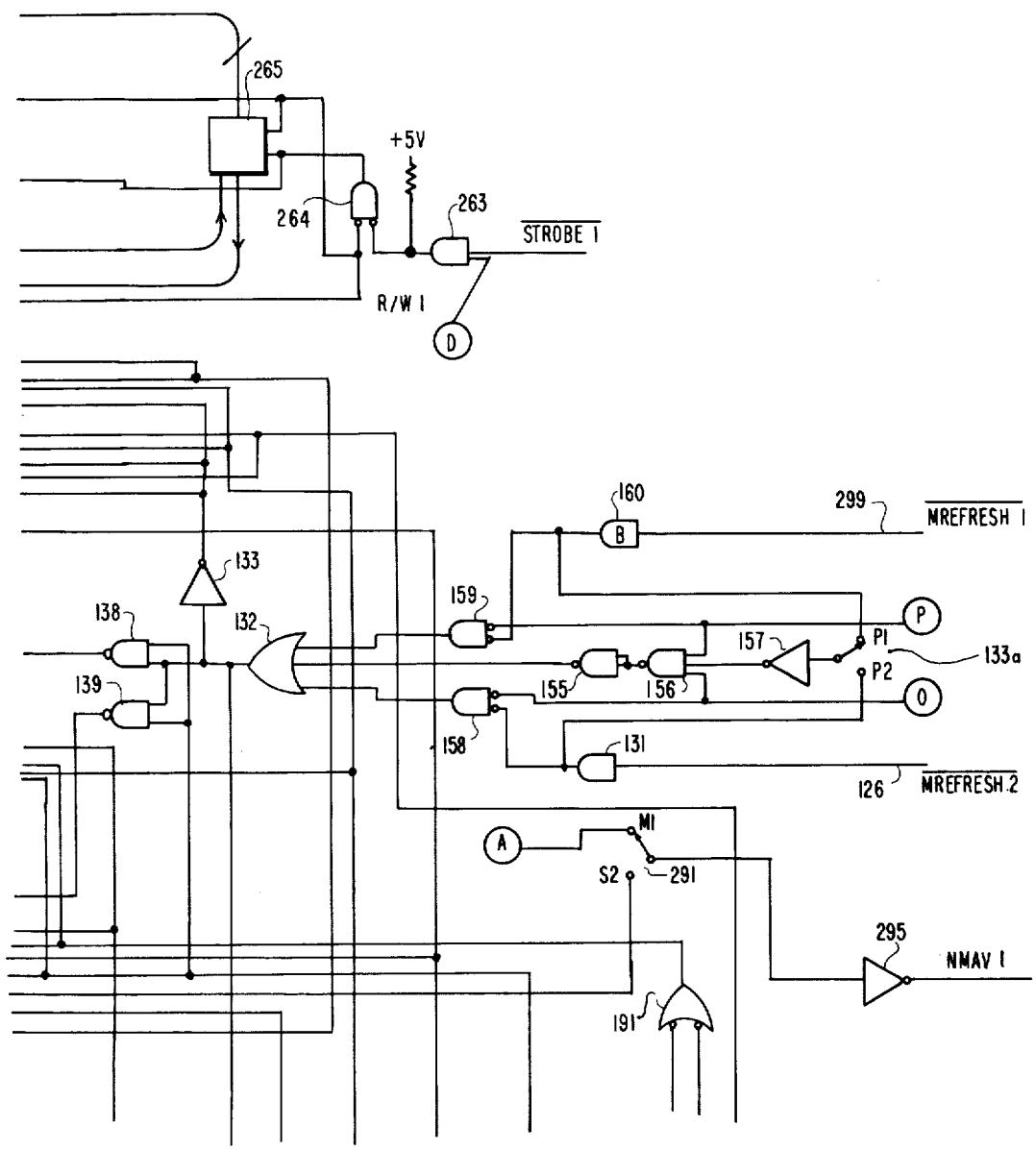
Figure 14:
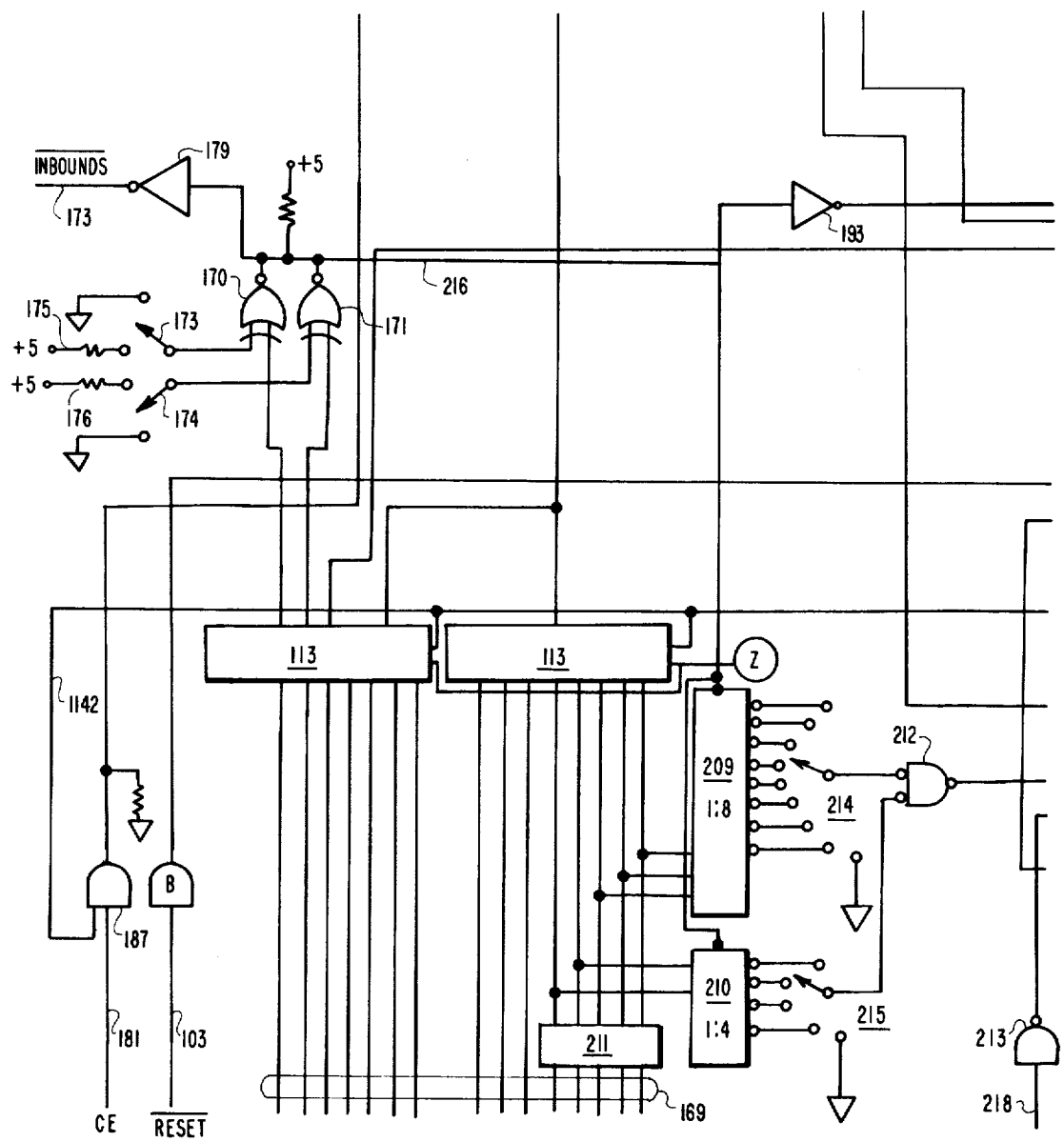
Figure 14:
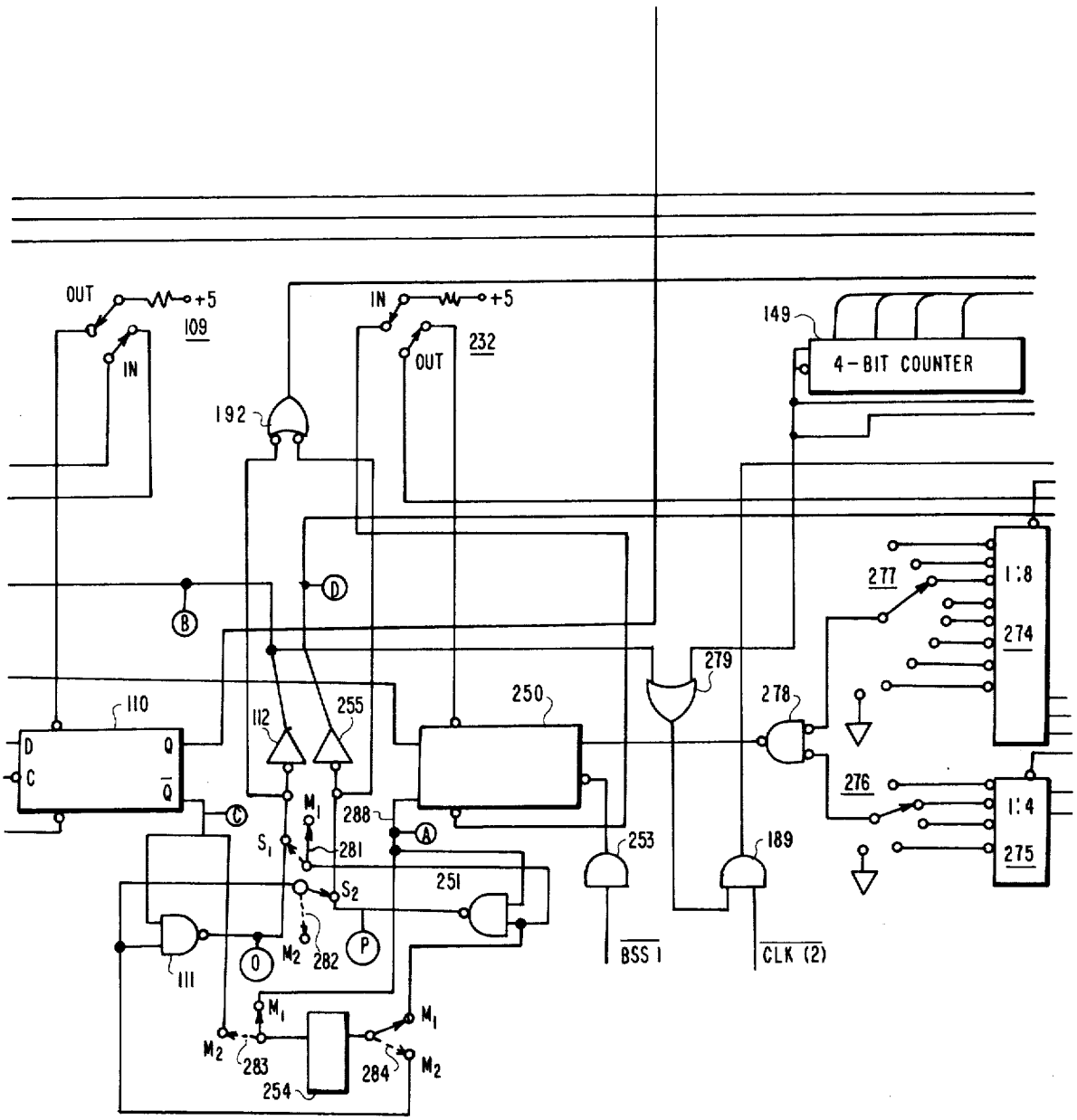
Figure 14F:
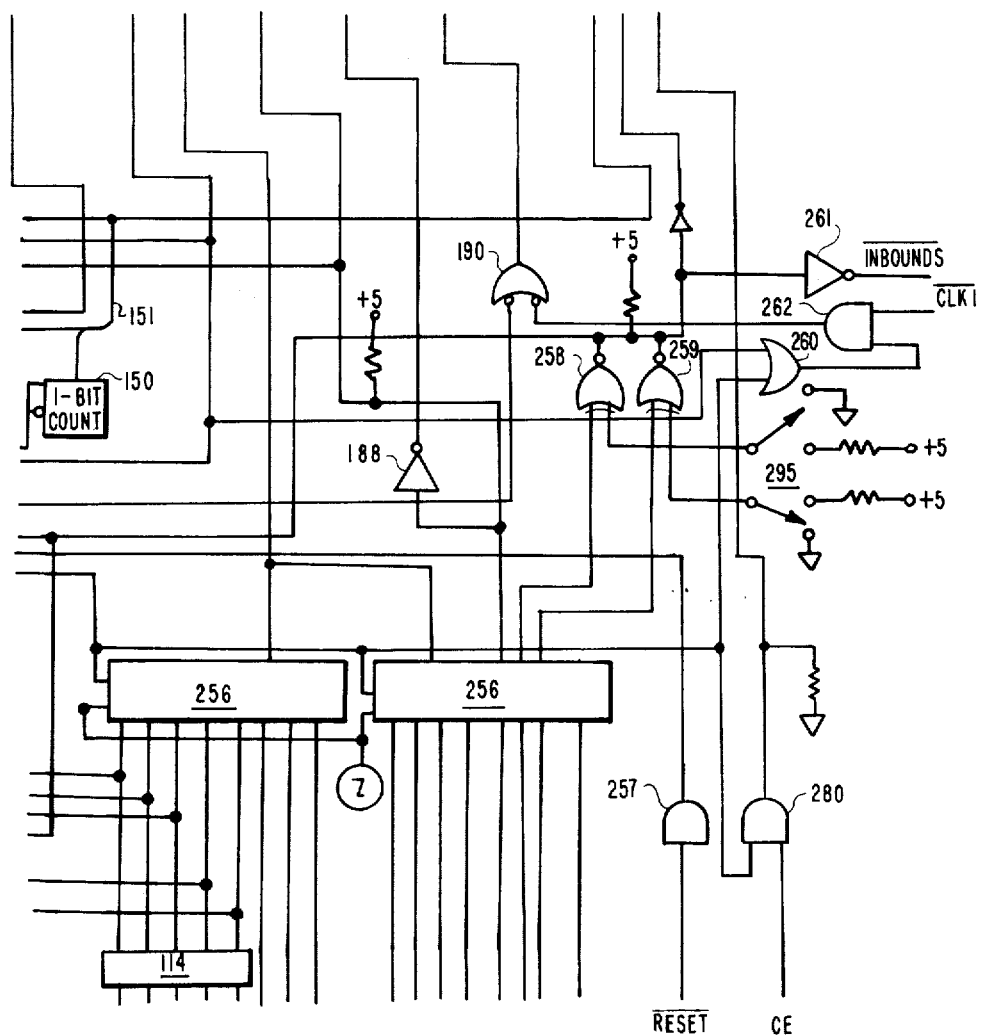

A write cycle is very similar to a read cycle with few exceptions. First, the write FF 106 is set by WRITE 164. This causes the generation of CE in exactly the same manner as in a Read Operation. Mem Cycle is generated by gate 174 in the same manner except by the opposite input and the Clk generation sequence is exactly the same. The address is decoded in the same manner and held in the same manner as in a read cycle. R/W is changed from a low level to a high level and, therefore, the same change occurs on the input. The major difference in a WRITE cycle, is the fact that the memory-using device (e.g. 24) provides the data to be written in addition to the address wherein this data is to be written. This data must be clocked into the data register 203 at the appropriate time by the timing generator 114 in response to the signal T Reg Clk 177. This is accomplished by the clock signal 205 in conjunction with the transfer forward signal 207 which gates the data register 203 contents onto the MDS Bus 202 which transfers the data via the PCB 107 to the Bus Mux Set 197-201 on the memory module. Since a write cycle is in progress, the input of gate 186 from gate 185 is high and gate 186 is inhibited. This causes the MUX set 197-201 to be enabled to transfer information present on the MDS bus to the DI Bus 195 and therefore to the inputs of the Memory Chips 146 and 147 (FIG. 14b). Now, since CEb 144 or CEU 145 is asserted and the Clk 51 or 52 is generated and the proper address is present at the inputs of decoder 209, and R/W is in the Write state, the memory modules will write the data thus provided into the indicated address in a prescribed period of time. Shortly before this time has elapsed, the timing generator 114 notifies the memory-using devices via MEM SOON NOT BUSY 179 that memory will soon not be busy, and then at the end of the cycle notifies the memory-using devices via MEM BSY 176 that memory is no longer busy. At the end of the write operation, the timing generator 114 asserts EOC 161 and thereby resets the Wrtie FF 106 thus ending the write cycle.

Bank Switching

Execution of a Bank Switch (BKS) instruction begins as previously described. The instruction is fetched and decoded by the processor 24 or some other device. Upon recognition of a BKS instruction, the processor or other device fetches the next logical location, uses it as an address pointer to either directly or indirectly (or by any other addressing mechanism) obtain the control word. The processor 24 (or other device) sends this control word to the memory subsystem of the preferred embodiment over the M bus 162 or, in general, over either a separate bus or any existing bus to memory. This control word is sent to all of the memory arrays in the system by the associated controllers via the PCB 107. Bits 14, 13 and 12 in a 4K quantum or bits 14 and 13 in an 8K quantum are decoded by the configuration network 1430, 1420, 1440, 1450, 170 and 171 in the same manner as an address was decoded in the Read or Write operation. This asserts the IN BOUNDS signal 216 which asserts the enable inputs on 1-out-of-8 decoder gate 209 and on 1-out-of-4 decoder gate 210. Enabling these decoders causes the lowest 5 bits of the control word present on the address bus 169 to be decoded by the decoder 209 and by the decoder 210 to produce the signal INBOUNDS 173 that is returned to the controller via the PCB 107. The output of the two decoders 209 and 210 is applied to the configuration switches 214 and 215. If switch (or jumper) 214 is in the position which corresponds to the binary code presented on the input to the decoder 209, the upper input to gate 212 will be asserted (low). If the switch (or jumper) is in any of the other 7 possible positions, the upper input to gate 212 will not be asserted (low), thus preventing the output from being asserted. If the switch (or jumper) 215 is in the position corresponding to the binary input presented by the control word bits 3 and 4, then the lower input to gate 212 will be asserted (low). If the switch (or jumper) 215 is in any other position than the one corresponding to the code presented to the input of the decoder by the control word bits 3 and 4, then the lower input to gate 212 will not be asserted (low), thus preventing the output of gate 212 from being asserted. Thus, if both inputs to gate 212 are asserted the code present in the lower 5 bits of the control word bits (0-4) matches the column address of this module of memory which is the selected module to be switched in by this BKS or BSJ instruction. This condition (i.e. gate 212 asserted) will exist on every memory module of the column whose address (214 and 215 switch positions) corresponds to that presented by the control word. Thus up to the whole column of modules may be switched into the address space 31 of the memory-using devices (e.g. 24) if BSS 2 (218) to the MEFF 110 is supplied to all modules in the column. On the other hand, only some modules which receive the clock signal 218 will be switched into the address space 31 and all modules which don't receive the clock remain unaffected. The Inbounds signal 173 returned to the controller of the particular horizontal set of modules (referenced in the address bits 14 and 13 or in bits 14, 13 and 12, or in more bits, depending upon module size) via the PCB 107 is the signal that determines which module (or modules) of the selected column receive the clock 218. This function and several others are accomplished by gate 2152 on the controller board. The signal Inbounds 173 is received by gate 2142 and is inverted to form Inbounds which asserts one input of gate 2152. If the mode bit (bit 15) of the control word (on the M Bus 162) is asserted (high), another input to gate 2152 is asserted. Now the processor 24 (or some other device) has long since decoded the BKS instruction which makes the processor 24 (or other device) supply the remaining inputs to gate 2152. If MPV 180 is not asserted, the processor 24 checks for interference to indicate that the switch should be allowed to occur. If MPV 180 is asserted, the gate 2152 will not be asserted and BANK S STR 218 which serves as the clock for the MEFF 110 will not be generated, thus preventing a switch from occurring. Another input supplied by the processor 24 is Bank 2172. If this input is asserted, gate 216 inverts its sense to assert the input to gate 2152. The Bank 2172 is thus asserted by the processor 24 in a bank switch (BKS), in a bank sense (BSE) and in a Bank Switch and Jump (BSJ) instruction according to the illustrated embodiment, although it should be understood that in another embodiment, some other device could perform this function. The last remaining input to gate 2152 is a timing pulse which is generated by the processor 24 once every execution cycle. This signal is not necessary since the timing generator 114 could generate it, but is convenient to use to determine the amount of time the MEFF 110 clock (i.e. BANK S STR 218) remains asserted.

With all these inputs to gate 2152 provided, the Bank S STR 218 is asserted and is sent via the PCB 107 to the gate 213 which buffers it and whose output is applied to the clock input of the MEFF 110 on the memory modules connected to the associated selected controller. If the output of gate 212 is asserted (low) the MEFF 110 will reset, thereby activating (or inserting) in the address space 31 that particular module (or group of modules). If, on the other hand, the output of gate 212 on any module controlled by the selected controller is not asserted (high), then the MEFF 110 on the associated module(s) will be set (i.e. not asserted) and those modules will be excluded from the address space 31. A refresh cycle is now executed by the memory controller to assure no loss of data in the event that many Bank Switches occur close together. At this point the execution of the BKS instruction is complete and the system is free to execute other instructions as directed. A BSJ (Bank Switch and Jump) is executed in the same manner as a BKS instruction, except that an additional address pointer is fetched and the contents of the address indicated is placed in the program counter of the processor 24 (or other device) and, after completion of the BSJ instruction, the processor 24 or other device will continue its program execution at the location indicated by the BSJ rather than at the location indicated by the previous contents of the program counter.

Bank Sense (BSE) is executed in a manner which is similar to a Read operation. A BKS or BSJ instruction controller receives a control word which was obtained in a manner similar to that for BKS. This control word is decoded in the same way as BKS except a BANKSSTR 218 is not generated. The processor 24 asserts BANK 2172 and Read 163 which causes a special read operation to occur. The timing generator 114 does not assert CE 181 or CLK 154 or Mem CYC 182, but does set R/W into the Read (low assertion) state. The BANK 2172 which is the inverted output of gate 216 is applied to the input of gate 217 and, since the read FF 105 is set at this time, the lower input to gate 217 is asserted and this asserts the output of gate 217. This output 219 is sent (via the PCB 107) to all the memory modules controlled by this controller and is received by gate 222 of each module. This gate 222 buffers the signal and applies it to one of the enable inputs of transfer gate 223. If the MEFF 110 of the module is asserted, the other input will be asserted on the transfer gate 223. The code which is determined by resistors 225-229 and the MEFF's (providing module number and memory module status) is transferred to the input of the Bus Mux Set 197-201. This code selected by the resistors represents the number of the column associated with that particular module or group of modules under the control of the associated controller which is selected, as in the BKS instruction, by the Inbounds 173 signal returned when the control word was sent to the memory modules. A Strobe 221 is issued by the timing generator 114 to cause the code to be transferred through to the MDS Bus 202 by asserting the other input to gate 186 with the remaining input asserted by the R/W signal. One of the inputs of the code is always a zero, thus making it possible to determine if no memory is controlled by a controller. At the instant of time the BSE is executed, the code returned will be "all ones" which is a reserved code to indicate this particular condition exists. If a module of memory is controlled by the controller at that period of time, the code (column number) is returned via the MDS Bus 202 to the data register 203 on the memory controller. The data register clock 205 is generated by the timing generator clocking the column number as a binary code into the data register, thus completing the memory subsystem portion of the execution of the BSE instruction. The processor 24 can then obtain this control word by asserting T REG GATE 178 signal and strobing the column number off the S Bus 204. The controller, it should be noted, can add information to this code to inform the memory-using devices about its status. In the illustrated embodiment, the processor 24 deposits this control word in a register specified by the control word fetched at the beginning of the cycle, as illustrated in FIG. 12b. By returning this control word to the specified register, the information is accessible for more effective management of the available memory resources.

Direct Memory Access

Direct Memory Access (DMA) is a technique by which input-output (I/O) devices such as magnetic disks, drums, and tapes, and other peripheral units may obtain direct access to the memory without intervening operations by the processor 24 beyond setting up the initial conditions. DMA memory usage is, therefore, dependent on the rate at which these units transfer information (data or programs) to or from memory, and this, in turn, depends upon the type of unit involved. Some units require use of memory upon demand because the information they transfer to or require from memory occurs in real-time. For example, a number of words in a sequence may be transferred to and stored in a register temporarily while being stored into a memory. This must be completed before the next sequence is transferred into the register because if the first sequence is not stored into memory before the next sequence is transferred into the register, the first sequence is lost. Thus, it is common practice to set up DMA transfers between memory and a disc (or other like device) and to allow completion of such transfers as a specified condition in the setup of a DMA "channel". The present invention makes it necessary to "set up" a DMA transfer and to "monitor its progress" in consideration of any BKS or BSJ instruction that is scheduled to be executed. Thus, it is essential to check whether the area in which the Bank Switch is to occur is not currently being used as the area of memory being used for a DMA operation. These checks must be made to avoid losing data that is being transferred via DMA and to avoid writing data via DMA into the wrong groups of memory modules.

Memory Protect

If a write operation into the operating system area of memory is attempted, a memory protect feature prevents this from occurring and interrupts the sequence of events in progress in the system to indicate to the operating system that such an attempt is being made. Since BKS or BSJ could conceivably interfere with or even switch out the operating area of memory, the illustrated embodiment makes provision for checking whether the BSJ or BKS which is about to be executed interferes with the operation. If memory protect is present and enabled, an attempted BKS or BSJ instruction is interrupted and the BKS or BSJ instruction is aborted (via the MPV signal 180 previously described in the connection with the BANK SWITCH operation). This interrupt is brought to the attention of the operating system by the normal interrupt system of the computer which can choose to ignore it or treat it as a bank switch request and do further checks to assure that it is safe to execute the instruction before executing it, or the like. If memory protect is not present in the system, or if it is not enabled, the BKS or BSJ instruction is executed in the normal fashion with no interference by the signal MPV 180.

Module Controllers

Figure 16:
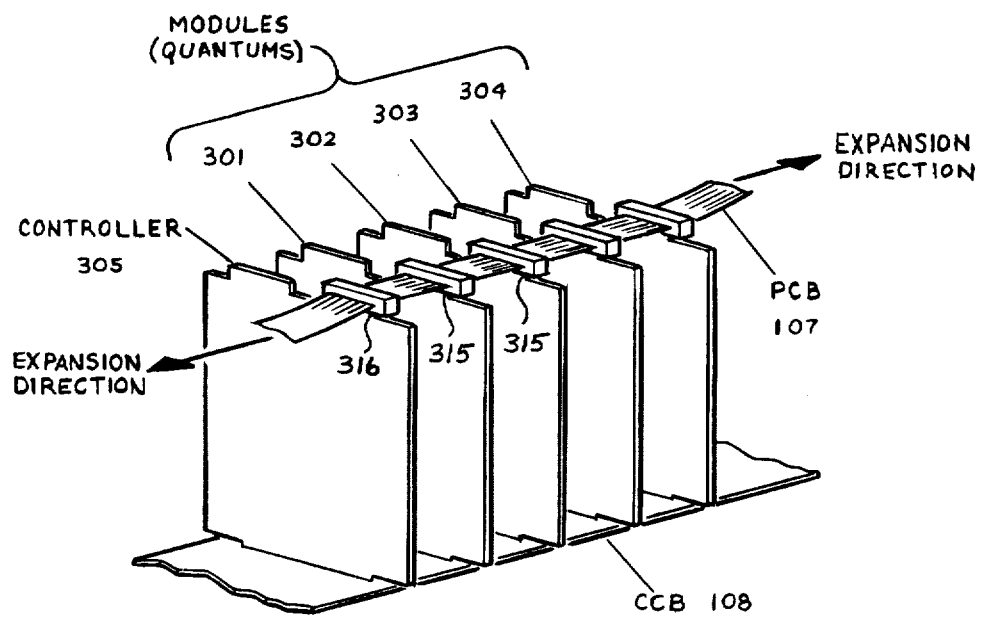
FIG. 16 is a pictorial diagram illustrating one physical embodiment of the memory modules and associated controller in accordance with the present invention.
Figure 17:
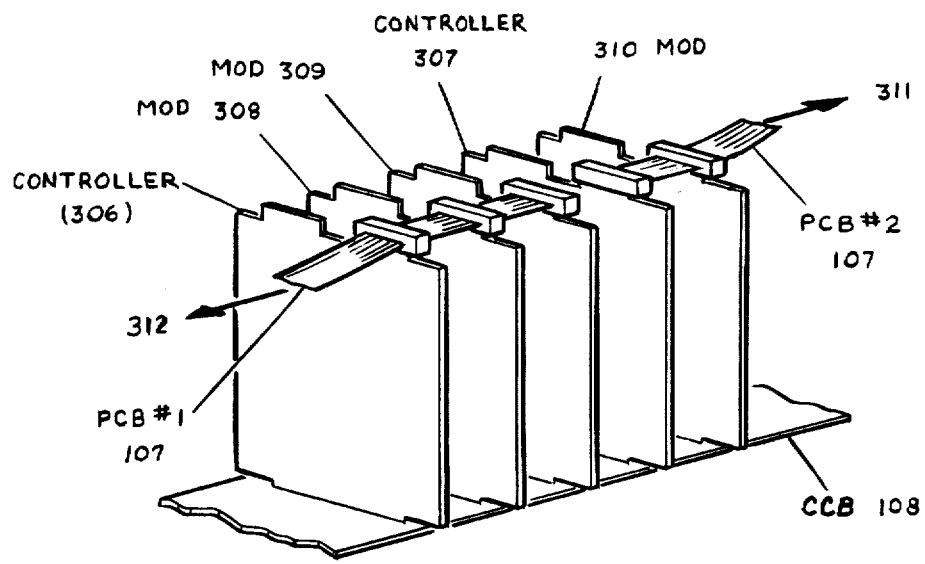
FIG. 17 is a pictorial diagram illustrating another physical embodiment of the memory modules with multiple controllers according to the present invention.

Referring now to FIG. 16 there is shown a physical realization of the means for interconnecting the controllers 305 and the modules 301-304 it controls. In the preferred embodiment, controllers and modules may be intermixed in any manner so long as there is only one controller connected to a given PCB 107. The modules 301, 302, 303 and 304 need only acquire operating power (and the status of Power-On) from the Common Communications bus (CCB) 108 on the common connections board so that in an extended system the bottom connection need only supply power (and the status of Power-On) for the modules while the PCB 107 supplies control and operating signals. In the preferred embodiment, the CCB 108 is, however, prearranged at each of the module bottom connections so that either a controller 305 or memory module 301-304 can fit into a given slot of the CCB 108. FIG. 17 shows an arrangement of multiple controllers 306, 307 within which expansion is possible for each controller in the directions 311 and 312, as shown.

The PCB 107 may include flexible, flat cables with line connectors appropriately placed in parallel circuit therealong to attach to the auxiliary ports 315, 316 of controllers 305 and modules 301-304, etc. included in the configuration. Alternatively, multi-layer printed circuits with connectors attached thereto may be used in combination with, or in lieu of, flexible, flat cable connectors, or conventional wire cables.

Multiport Accessible Memory

Figure 9:
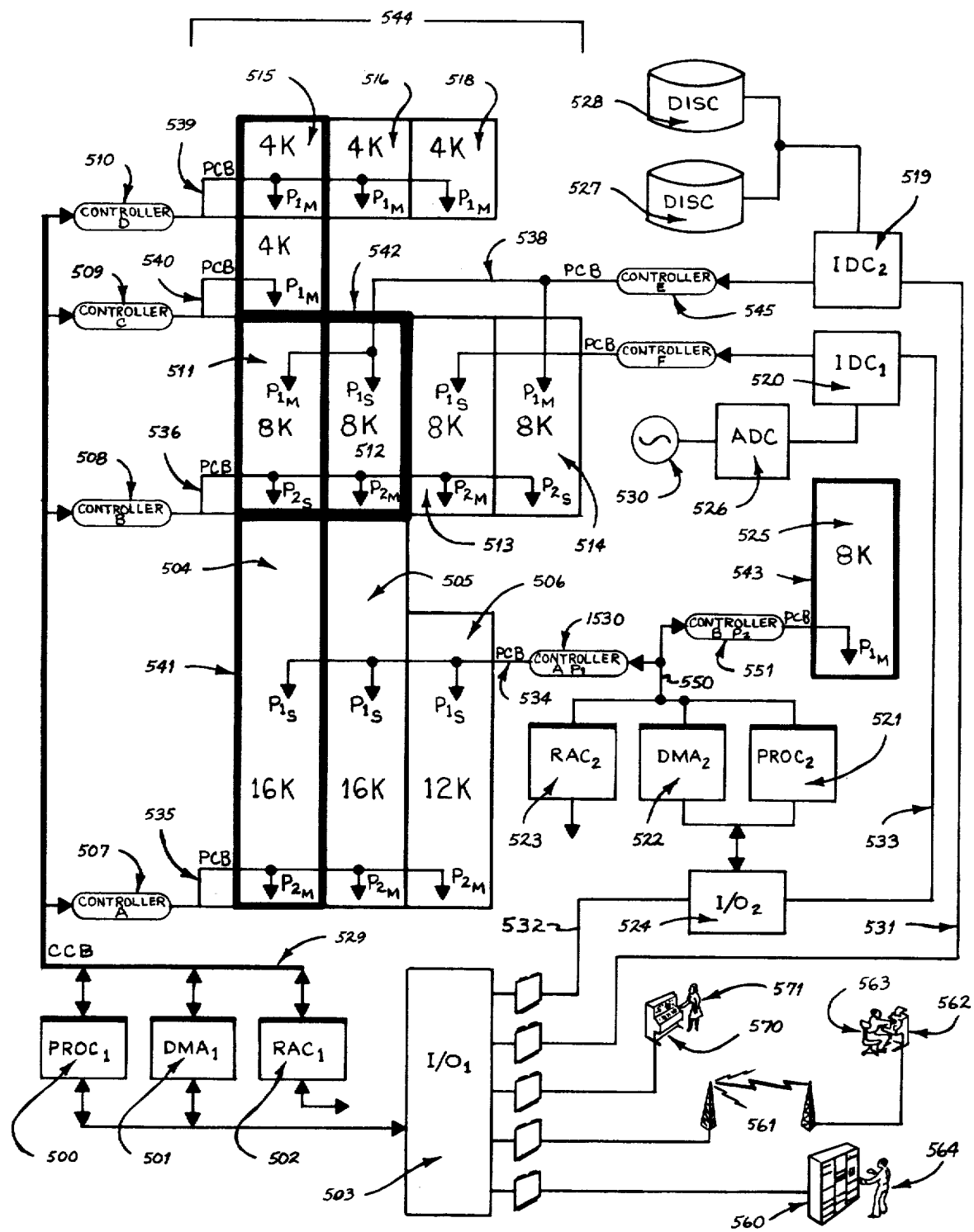
FIG. 9 is a schematic diagram of a multiple port memory system according to the present invention.
Figure 18:
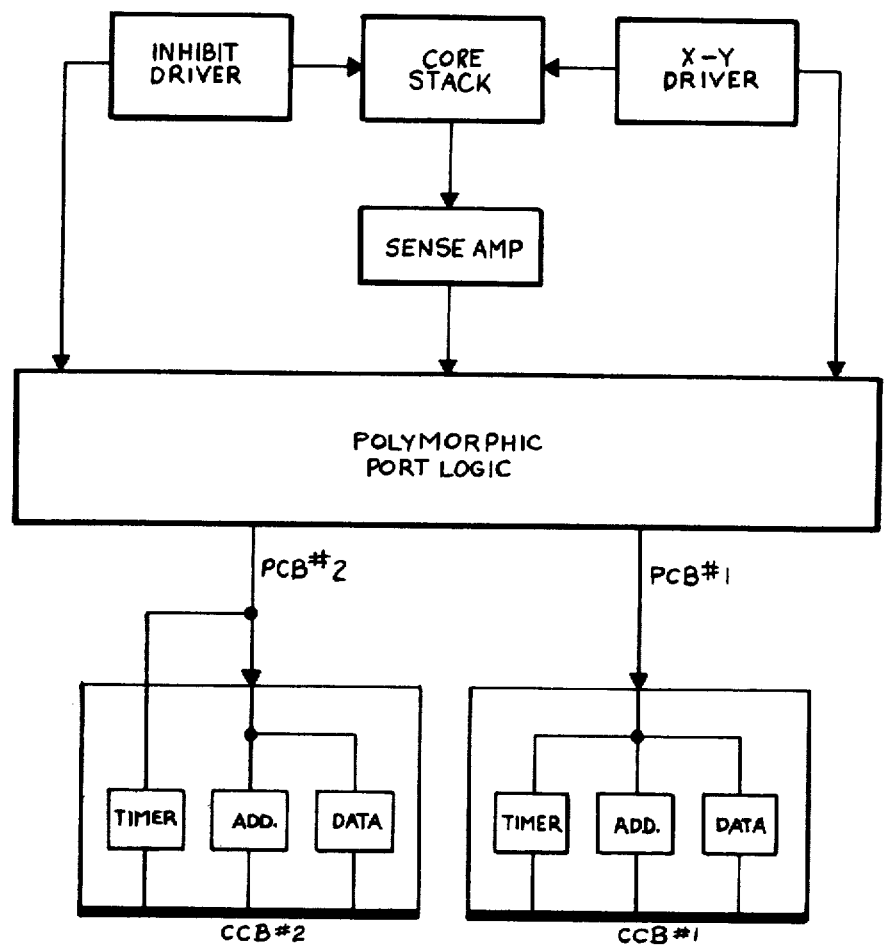
FIG. 18 is a schematic diagram illustrating the operation of a core memory module according to the present invention.
Figure 19:
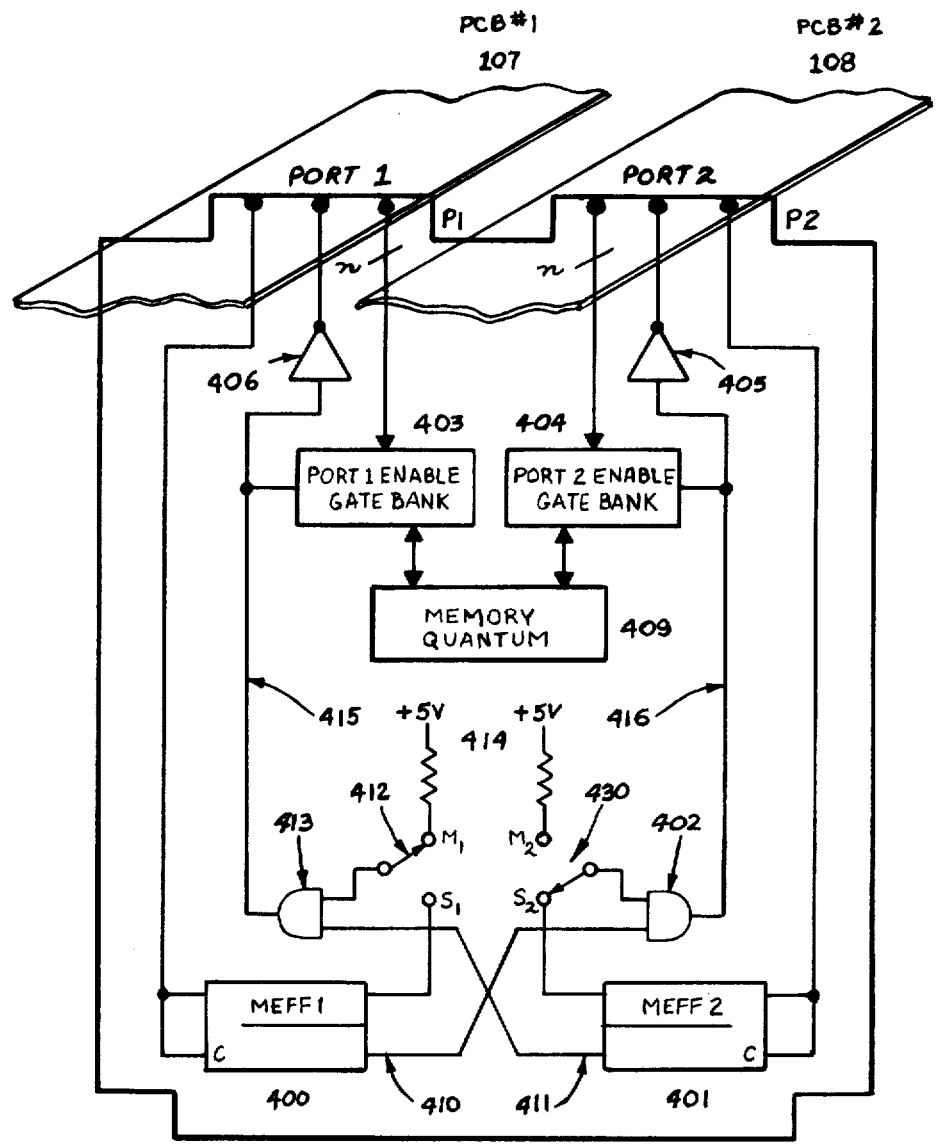
FIG. 19 is a simplified schematic diagram of the dual port logic circuitry of a memory module according to the present invention.
Figure 22:
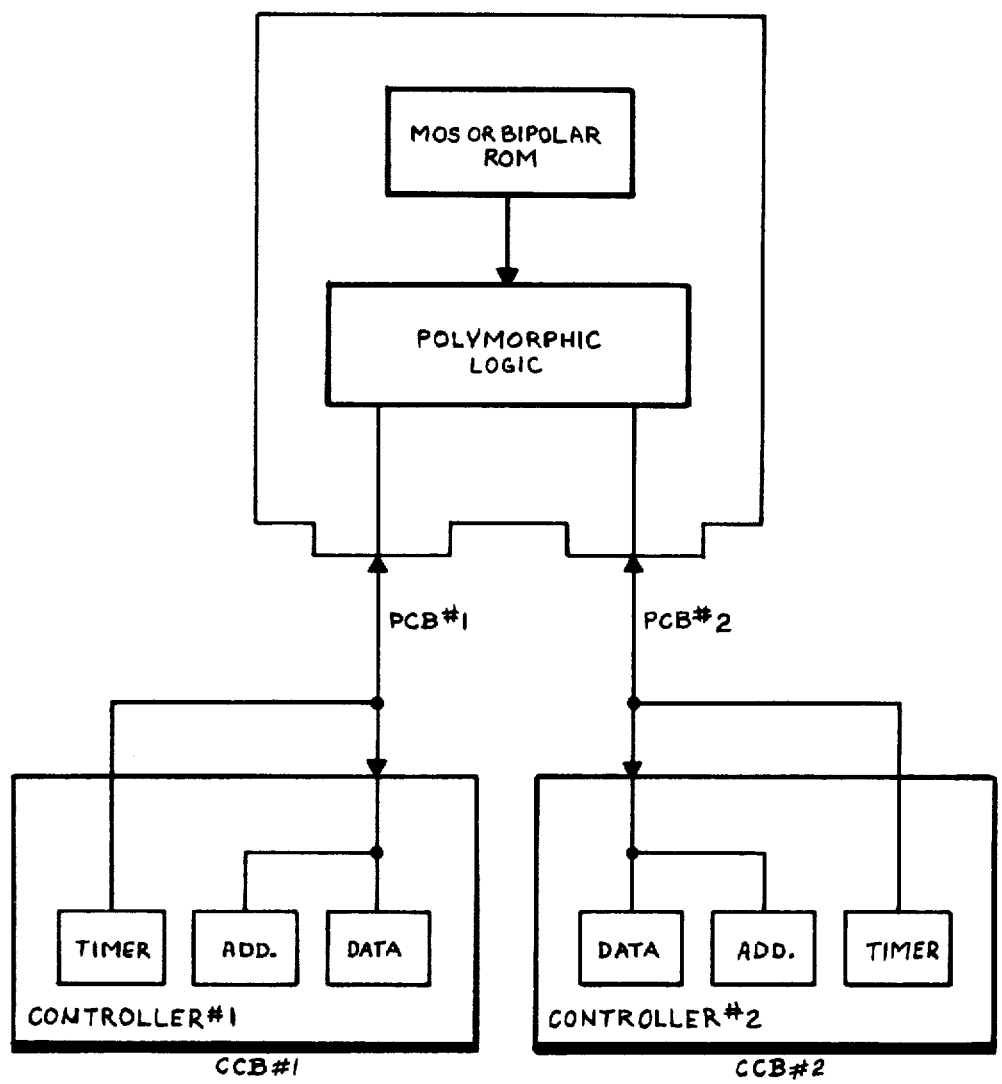
FIG. 22 is a schematic diagram illustrating operation of a read-only memory (ROM) in accordance with the present invention.

One important asepct of the present invention is that memory modules which are not present in the logical address space 31 of one memory-using device may be activated and used or shared by other memory-using devices, as shown in FIGS. 9, 18, and 22. The memory modules may include core stack memory, as shown in FIG. 18, or read-only memory (ROM), as shown in FIG. 22, and these other devices may be processors, 500, or direct memory access devices (DMA) 501, 522, or random access channels (RAC) 502, 523, or intelligent device controllers (IDC) 519, 520, or the like. FIGS. 9 and 19 show simplified schematic and physical diagrams of the means for activation of memory modules not in the address space 31 of a given device.

Referring now to FIG. 19, if port 1 is not active, its MEFF 400 is not asserted and the input 410 to gate 402 is asserted (high). The input 416 thus enables the bank of gates 404 for port 2 to allow control and use of the memory quantum 409. Input 415 is not asserted because the input 411 to gate 413 is not asserted. The output of gate 406 is not asserted and is therefore indicating to the associated controller attached to port 1 that this module or quantum is not available for use. Some other module associated with the same controller may be enabled however, and may assert an output of its gate 406 (as a logic-OR output). With respect to gate 413, note that if the other input is asserted (i.e. if the MEFF 401 for port 2 is not asserted), the output 415 will enable the port 1 gate bank 403 and assert (lower) the output of gate 406, thereby informing the associated controller that a memory module (or a group of modules) is available for use by the devices that request service from the controller attached to port 1.

Switches 412 and 430 define the operational roles of the ports. Switch 412 is shown set in the M1 position and switch 430 is shown set in the S2 position. This defines that port 1 in this switch position is the master of the module of memory shown and, as such, has unrestricted access to it while port 2 is the "slave" port through which the module of memory can be used only when the master port (port 1) is not using it. If the two switches 412, 430 are put to opposite positions from the positions shown, the user priorities of the two ports are reversed. Since the PCB 107 for port 1 is the same as the PCB 108 for port 2, the switches 412, 430 can be set manually or automatically (under program control) to either position A (S1, M2) or B (S2, M1) as and where system operation requires. These switches may, of course, be flip-flops to provide programmable access and manipulation of their states, thereby providing dynamic role allocation.

Figure 21:
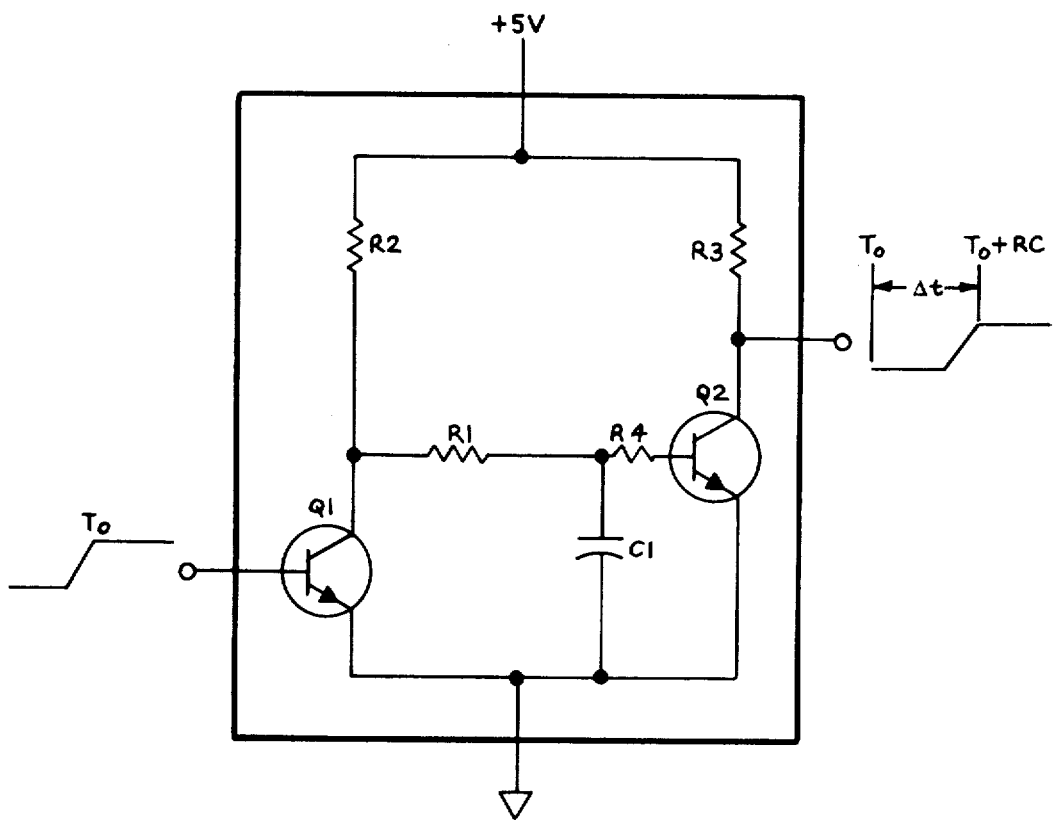
FIG. 21 is a schematic diagram of one embodiment of a timer for use in connection with the circuitry of FIG. 14.

In operation, a dualport memory module may have port 1 connected as a master user and port 2 connected as a slave or lower priority user, or vice versa, as will now be described in connection with FIGS. 13a through 13c and FIGS. 14a through 14f. A controller of the type described in connection with FIGS. 13a – 13c may be coupled to port 1 and the same type of controller (attached to separate memory-using devices) may be coupled to port 2. Switches 281 and 282 are illustrated in the M1 and S2 positions and switches 283 and 284 are both illustrated in the M1 position. Assume that the power-on sequence has been completed and the MEFF 110 for port 2 has been preset into the address space of the memory-using devices associated with port 2, and that MEFF 250 for port 2 has been preset outside of the address space of the memory-using devices associated with its controller. Since the MEFF 250 for port 1 is not asserted, its output which is not asserted is applied to the delay network 254 that is illustrated in FIG. 21. Therefore, the output of delay network 254 will not be asserted, and will not prevent the assertion (via switch 282) of gate 111. The other input of gate 111 from MEFF 110 is asserted because this module was preset into the address space of its memory-using device. Since the master port 2 has not prevented the assertion of the output of gate 111, the input of gate 112 is asserted, thus asserting its output. The output of gate 111 also asserts the input to gate 192, thereby asserting its output which enables the operation of the clock logic that is composed of gates 140 and 141 and drivers 142 and 143. The output of gate 112 enabled the address buffer gate set 113 and the input of gate 279 whose output enables gate 189 to transmit the Clk signal 504 to gate 190. The output of gate 112 also enables gate 196, thus allowing it to pass the Strobe 221 to the port 2 Bus Mux Set 197, 198, 199, 200 and 201. This strobes the data out into the MDS Bus 202 for port 2 during a read operation when requested by the controller. The output of gate 112 also enables one of the inputs to gate 117, thus permitting the passage of the R/W signal from port 2 to the memory arrays 146 and 147 as required. Gate 187 is also enabled by the asserted output of gate 112, thus allowing the controller for port 2 to issue CE command 181 and have it transferred to the CE logic which comprises gates 134 and 136 for port 1. These gates, under proper conditions, transfer the CE command to the arrays 146 and 147. Memory operations can, therefore, proceed as described earlier and port 2 has unrestricted access to this memory module. Note that the NMAV signal for this module is asserted (high) because output 288 of MEFF 250 is not asserted and therefore, the input to the gate 295 (via switch 291) is not asserted. Another module on the PCB associated with port 2 may, however, be asserting NMAV 220, as this is a logical-OR output.

In the sequence of operations which occur when the master port 1 takes control over the memory away from the slave port 2, a BKS or BSJ instruction is first executed, in the same manner as described earlier, by the memory-using devices and associated controller coupled to port 1. This asserts the output 288 of the MEFF 250 and starts the delay timer 254 which delays by an interval t the input signal 288 applied to it (where: 1 memory cycle  $t$  1.5 memory cycles). The other output of the MEFF 250 has become non-asserted causing the input to the gate 115 via switch 290 to be non-asserted. This causes NMAV to the controller coupled to port 2 (via PCB 107) to be asserted. The assertion of this signal on the controller (FIGS. 13a – 13c) causes the timing generator 114 to change modes. When NMAV is presented to the timing generator 114, it allows the current memory operation to be completed (if one is in progress), and causes the next memory operation to be held (unless it is a BSJ, BKS, or BSE). This is accomplished by clocking the address into the address register 168, by clocking the data into the data register 203, by asserting MEM BSY 176, by not asserting Mem Soon Not BSY 179, and by keeping the READ FF 105 or Write FF 106 set. This state is held until the master processor relinquishes the memory module which was requested. The timing generator 114 is notified by the assertion of NMAV that this has occurred. Meanwhile on the memory module, the delay timer 254 which allowed the completion of the memory cycle that was in progress completes the delay time and asserts the input to the gate 251 which thus forms the input to inverter gate 255 and gate 192. The outputs of these two gates are applied to gates symmetrical to those used to enable port 1. Port 1 is disabled at this time because the output of the gate 251 is applied to the input of gate 111 through switch 282. This causes the output of gate 111 to be not asserted (high) and the output of gate 112 to be not asserted (low), thereby disabling port 1 (except for BSE, BKS and BSJ capability). Port 2, on the other hand, just acquired the use of this module. The first act (as part of the BSJ or BKS instruction) is to do a refresh cycle on the newly acquired module of memory (as required by this type of memory). The timing generator 114 was informed (by the output of gate 216 as shown in FIG. 13a) that a BKS or BSJ instruction was executed and immediately establishes two memory cycle periods and then issues the refresh sequence, as previously described. This refresh operation is required (for refreshing memories) in order to assure that a module passed back and forth between two controllers does not lose its information for lack of adequate refreshing operation. Since refreshing is under the direction of controller which has control of the memory module, the memory refresh control must be passed from one port to the other. This is provided by gates 160, 159, 132, 158, 131, 155, 156, and switch 133a. If, as was originally the case in this example, port 2 had control of the memory module, input P to gate 159 is not asserted, gate 159 is thus not asserted. Input 0 to gate 158 is asserted, thus allowing M refresh 2 126 to assert the output of gate 158 and the output of gate 132, thereby controlling the refresh under direction of the controller. If port 2 now takes control of the module, input P becomes asserted and 0 becomes not asserted. Thus, gate 158 is disabled and the gate 159 is enabled to follow the output of gate 160 (M Refresh 2), thereby controlling the refresh under the direction of the other controller.

There is a possible condition of suspension wherein both ports 1 and 2 are disabled. In this case, refreshing must still be maintained and gates 155, 156, 157 and switch 133a make this possible. If both inputs O and P are not asserted (high), two inputs to gate 156 are asserted. If the switch 133a is in the P2 position whenever port 1 refreshes, gate 157 will be asserted, thereby asserting its output. This causes inverter 155 to assert its output which is applied to gate 132, thus causing port 1 to refresh this module even though it is not enabled. Switch 133a permits selection of either port 1 or port 2 to be the "default" refresher of this memory module.

As illustrated in the preceding description, the present invention allows the passing of control over a memory module from one port to another and the sharing of the module in a master-slave relationship. The roles of port 1 and port 2 may be changed by changing switches 281, 282, 283, 284, 290 and 291 to the opposite positions. These switches are a 2-position, 5-pole switch. Port 2 instead of port 1 can be made the "default" refresher by changing the position of switch 133a. It should also be noted that because of the separate configuration sets for one port (170, 171, 1420, 1440, 1450 and 1430) and the other port (258, 259, 1495), the two ports for this or any module of memory may have either the same of different addresses (i.e. controller addresses).

Figure 15:
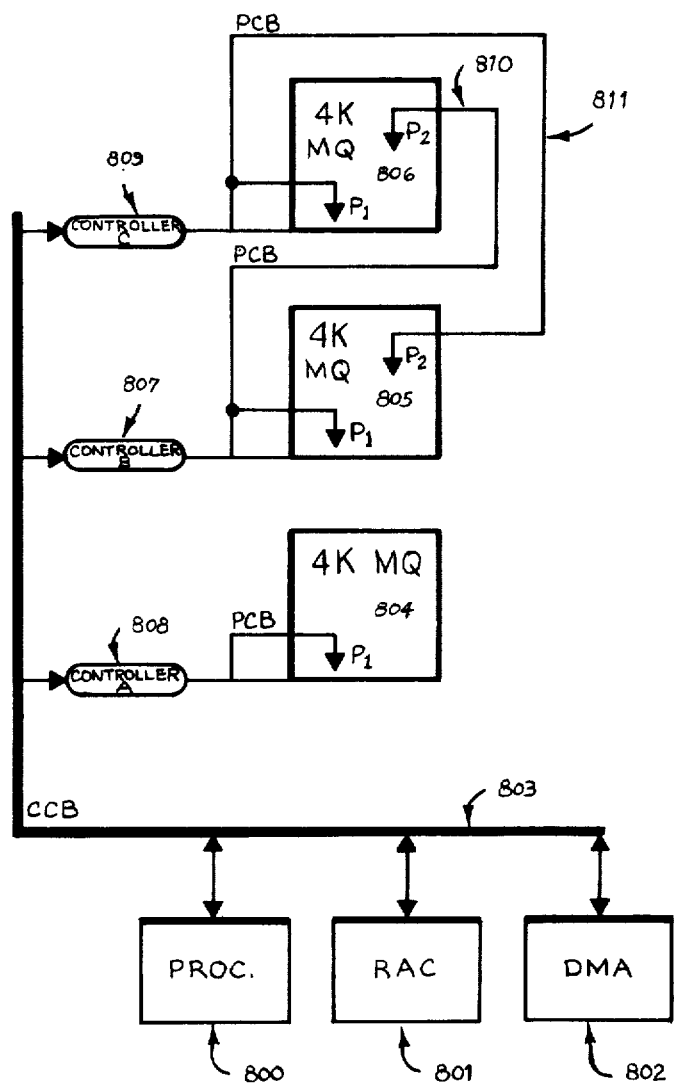
FIG. 15 is a schematic diagram illustrating logical relocation of memory modules by changing addresses in accordance with the present invention.

The fact that different addresses can be assigned for the same module of memory makes possible another application of the present invention as illustrated in FIG. 15. In the system illustrated, it is useful to be able to exchange the addresses of information easily and quickly. This process is called relocation. Relocation occurs in this system by bank switching the entire module to another location i.e. if the information in module 805 is to be used in the location of 806 then a BKS instruction is executed by controller 809 to bring module 805 into the address space occupied by controller 809, then a bank switch is executed by controller 807 to bring the module 806 into the memory space occupied by controller 807. Thus, the two modules exchange places in the address space and the information they contain changes places in the address space as well. This exchange of locations of modules in the available memory space may also be achieved using modules of different size and memory technology. By replacing the switches 1420, 1440, 1495 with flip-flops that can be set under program control, dynamic allocation of the address represented by bits 13 and 14 of the module may be effected.

A physical realization of a section of shared memory is pictorially illustrated in FIG. 35. Controller 915 is master controller to modules 929 and 931 and is slave controller to module 927. A memory-using device attached to module 927 via PCB 935 is master and the memory-using device attached to modules 929 and 931 via PCB 934 is slave. The physical realization illustrates the simplicity of interconnection of three memory-sharing devices and the three modules which they share.

In this invention the control of memory modules is separated from the control of the system memory in general and this is accomplished by separating the associated control buses into two separate categories, as previously described. The CCB couples the controllers and the memory-using devices and carries memory subsystem control information and also allows the passage of data from the memory subsystem to and from the memory-using devices. The PCB, on the other hand, is separate logically and physically from the CCB and functions as a control and data bus between the memory modules and their associated controllers.

Because these buses are separate, they allow the interfacing of different memory technologies to the already defined memory control interface. Core memory modules, as shown in FIG. 18 for instance, may be substituted for the MOS modules referred to in FIG. 14 by changing a few of the signals entering the module and by providing well known interfacing means. Well known level translators, current drivers, and sensing techniques may be employed with a timing generator 114 which is modified to provide timing appropriate for core memory and to remove the refresh control and sync functions 118 not needed for core memory. The R/W MOS memory may be replaced by, or mixed with, a Read Only Memory (ROM) as shown in FIG. 22 simply be removing all write circuitry and refreshing circuitry. Thus, it is emphasized that because of the separate CCB and PCB, it is possible to interface almost all known types of memory within the memory space provided in accordance with the present invention. Several different types of refreshing memories may even be accommodated within one system. As shown in FIG. 13, Refresh 129 may either be generated on the controller as shown, thereby to drive the CCB (if gate 128 is in the Refresh control state) and cause all memories in the system to refresh at the same time, or it may be generated under the direction of some other controller (if it is in the refresh slave position). Since each controller has control of the MEMBSY 176 and MEMSOON RDY 179, the memory that is slowest to accomplish its refresh will be the last to release the logic OR-tied lines and will, therefore, determine the time it takes to accomplish a refresh. Thus, the memory type which requires refreshing most often would be put into the control refresh position and the type which took the longest to accomplish its refresh would determine the length of time memory remained busy. And hence processors designed for operation in the present invention "hang up" (i.e. go pending) and wait for the Memory Soon Rdy 179 signal to return whereupon priority determination begins for the next cycle. Any type of memory no matter how slow or fast, whether serial-by-bit, serial-by-block, DRO or NDRO, rotating, or whatever, may be used in conjunction with the CCB and PCB designed to take care of the particular requirements of such type of memory. The problem of various types of memory requiring various power supply voltages can be easily overcome by separately packaging the memory and its power supply and by connecting the ground of such packaged module to the common ground of the system. The universality of the separate CCB and PCB for memory operation and control therefore permits substantial flexibility in memory operation, mixing of different types of memory technologies, and sharing common modules of memory among multiple memory-using devices.

It should also be noted that the operations in suspension (e.g. processing memories) mentioned in the discussion of Bank Switching still apply in the shared memory environment, except that now two ports must be inactive as opposed to one for the operation to commence or, the module can be commanded via the control structure already described to commence its operation and back out both ports until completion. The discussions concerning redefinition of the control mechanism in connection with the Bank Switching previously described also apply with respect to shared multiple port memories thus, for example, allowing direct communication between sharing devices by this control mechanism. This structure allows progress reports from the slave processor or updates of the programs of the master processor by the slave processor, or vice versa. This control mechanism may also be used to create a lockout condition to prevent the master processor from taking the memory module away from the slave processor under prescribed conditions.

It should also be noted that more than two ports on a given memory module are possible in accordance with the present invention. Although the illustrated embodiment shows only two ports, the circuitry of each port may be duplicated as desired for very little more cost to provide three, four or more ports on each memory module.

Another useful application of the dual port memory provided by this invention is that one port can be coupled to a device such as a digital cassette recorder, or the like which records the contents of the memory module to which it is attached when appropriately activated (e.g. by PON 101 as an indication of a power failure). This makes it possible to reduce auxiliary power requirements to only a few minutes of stand-by power available for volatile memories (i.e. those which are incapable of retaining their information without power applied). Such a recorder may also be used as a mass storage device, and as the device which initially loads the memory with information upon turn-on of the system.

Referring now to FIG. 9, there are illustrated several aspects of independent multiple port master-slave operations of the present invention. Additional embodiments of multiple-port operations of the present invention are illustrated in FIGS. 25 through 35. A processor 500 and a DMA 501 and a RAC 502 comprise one group of memory-using devices having an immediate address space which comprises 16K word segment 504 controlled by the controller 507 and the 8K word segment 511 controlled by the controller 508 (when IDC 519 isn't using it) and the 4K segment 540 controlled by controller 509, and the 4K segment 515 controlled by controller 510. The area of memory 541 represents the modules which are active (present) within the address space of the memory-using devices 500, 501 and 502. The modules which are mastered by these memory-using devices 500, 501 and 502 are indicated with a subscript M on the PCB 535, 536, 540 and 539 associated with the controllers 507, 508, 509 and 510 which are connected to these memory-using devices 500, 501 and 502 via the CCB 529. It should be noted that this set of memory-using devices is master of all modules in its address space 541 and in its extended address space 544, with the exception of modules 511 and 512 to which this set is slave. This means that memory-using devices 500, 501, and 502 have unrestricted access to all available memory except modules 511 and 512. Modules 511 and 512 are mastered by controller 545 and by the IDC 519 connected thereto over PCB 538. The IDC 519 controls two discs 527 and 528 and is able to receive commands from the I/O 503 of the set of memory-using devices 500, 501 and 502. The IDC 520 is slave to modules 513 and 514 which are mastered by controller 508 of the memory-using devices 500, 501 and 502. The IDC 519 receives commands from I/O 503. The memory modules 504, 505 and 506 are slaves under control of controller 530 which is connected over CCB 550 to the memory-using devices 521, 522 and 523. Note that the memory-using devices 521, 522 and 523 have an additional controller 551 and an associated 8K module of memory 525 which it masters. Note also that I/O 524 has a communication link 532 to pass information to and from I/O 503, thus allowing the memory-using devices 500, 501 and 502 to communicate with the memory-using devices 521, 522, and 523 via I/O transfers between the processors 500 and 521. This link is a necessary condition for the processors to be benevolent (i.e. not interfere).

In FIG. 9, it may be assumed that the program of the master system resides in modules 910, 515, 516 and 518. The routines in module 910 are to remain immediately available to the system, so it is configured to remain in the address space 541 at all times. The routines in modules 515, 516 and 518 may be more transitory in nature than those in module 910 but must always be available within a few instruction execution times. Thus, they are put under the control of one controller 910 and can be located in the address space 541 within one BKS or BSJ instruction execution time. The information in modules 511 and 512 originates from the discs 528, 527 or is staged here as a buffer area for transfer to the Discs 527, 528 or IDC 519. The information contained in modules 513 and 514 originates from the Analog to Digital Converter (ADC) 526 via IDC 520 or may be staged here for transfer to IDC 520. These modules 513, 514 thus form a buffer area wherein information obtained by the conversion of analog information to digital information by the ADC 526 is stored into the modules 512, 513, i.e. staged there for passage to the memory-using devices 500, 501 and 502 for appropriate processing.

This staging is commonly referred to as data pipelining. If several processors or IDC's were coupled to modules 513 and 514, each with a separate job to do on the measurement set, then the information could be gathered at one end of the pipeline and stored into mass memory at the other end in final processed form, as more clearly illustrated in FIG. 27. The ADC 612 converts the analog information obtained from a source 611 and deposits the digital equivalent into memory module 614. When memory module 614 is full, IDC 613 transfers the incoming information into the memory module 615 and indicates to the processor 622 via the common link 624 and the I/O 623 that a job is present and available in module 614, whereupon Processor 619 and processor 622 (by way of the RAC 621) begin processing the information in module 614 with a program stored in module 626 without interference with the memory requirements of the IDC 613. If properly programmed, the job in module 614 is completed before the filling of module 615 is finished and, when the job is completed, it is stored on disc 625 for future reference. Now the filling of module 615 is completed and the process repeats itself with module 616 and module 615 respectively, with the result that the processors 619 and 622 may operate continuously to process the incoming data.

Referring again to FIG. 9, memory modules 504, 505 and 506 are shared between memory-using devices 500, 501 and 502 and memory-using devices 521, 522 and 523 and may contain information (programs and data) which is obtained by one memory-using device and used by the other, or vice versa. The information in module 525 is used by the memory-using device 521, 522 and 523 more often than any other memory using device in the system and is, therefore, not shared.

In operation, it may be assumed that the memory-using devices 500, 501 and 502 are running a long program for user 564 via terminal 560. The program may be assumed to reside in module 504. User 563 at terminal 562 may request a measurement set be taken by the ADC 526 on Unit Under Test 570. This request is made via communications link 561 and I/O 503. The program which services this request is in module 516 so the request is made to module 540 which executes a bank switch, as previously described, thereby replacing module 515 with module 516. The program in module 516 outputs the appropriate information for I/O 524 to processor 521. Its job completed, the program in 540 returns the module 516 to a suspended status and reactivates module 515 by executing a BSJ instruction as previously described, thereby reactivating user 560, 564 program which thus continues from exactly where it left off. The second User's request for the measurement set on the ADC 526 is now handled in accordance with the program for processor 521 which resides in the nonswitchable module 525. The IDC 520 is given the appropriate control sequence via I/O 524 to initiate the measurement set requested.

Memory module 513 is not in use at this time and isn't scheduled to be used. Processor 512 is advised of this via the common link 532 between it and the memory-using devices 500, 501 and 502. The IDC 520 may thus be assigned the use of the memory module 513 and may begin to take the assigned measurement set. At the same time the program of User 564 may have a need for information stored in Disc 528. Processor 500 sets up the IDC 519 via I/O$_1$ 503 and control path 531 to transfer the required information into memory module 511. Since IDC 519 is the master of module 511 it takes control with the equivalent of a BKS instruction and transfers the requested information into the specified area of memory module 511. It should be noted that no interference is caused in the operations being performed by the ADC 526 IDC 520 and memory module 513, or by the memory-using devices 500, 501 and 502. One condition leading to interference occurs in response to both memory-using devices attempting to use the module 513, as later described herein. Thus, if memory-using devices 500, 501 and 502 are requested to perform some other program for some other user, say 571 on terminal 570, such other program could be performed while user 564 and user 563 programs are in process. All three of these programs are then operating simultaneously and without interfering with each other to any significant degree. This represents a substantial improvement in performance over a conventional three-user situation wherein the memory capability may have to be dedicated to one user at a time.

Assume that the second user's measurement set has been completed. The IDC 520 terminates operation and executes a BKS to release module 513 and notify the processor 521 and, in turn, (via communication link 532 and I/O$_1$ 503) also the processor 500 of the completion of the assigned task. Processor 500 then notifies the second user 563 via I/O$_1$ 503 and communication link 561 and terminal 562 that this task has been completed. User 563 then can have his measurement set stored on the Disc 528 or 527 and/or request additional processing on it by processor 500.

As more users or faster devices are added to the system thus far described the availability of memory resources diminishes and more resources are required. The present invention permits more processors, IDC's, DMA's, RAC's and, of course, memory modules to be added with almost total freedom in selecting the type and number of these elements and their interconnections. Where N is the number of memory modules in the address space, N-M (where M is the number of modules in the master user's space at one time) represents the number of independent non-interfering devices which can operate simultaneously in this shared address space. Thus a system which comprises 256 modules of 4K words of memory, where, say, 8 of these 4K-word modules are present in the master address space at all times, would allow sharing between 248 independent devices. Where the 8 modules present in the master address space do not have to remain in the address space at all times, even more sharing is possible. At some point in the expansion and sharing progression the management of the memory resource becomes too much of a burden for the programmer or user of the system and a special processor or controller may be assigned the task of managing the memory resources. This may be accomplished by making one processor the master of all memory modules and by giving this processor a controller over external memory (like more discs of the type shown in FIG. 9), and a two-way communication link over which all requests for the assignment of memory to particular users are transmitted. Suitable programming may then determine what memory modules are to be allocated to what at what time, for what uses, and for how long. The result of this is a virtual memory system as shown in FIG. 20.

Figure 20:
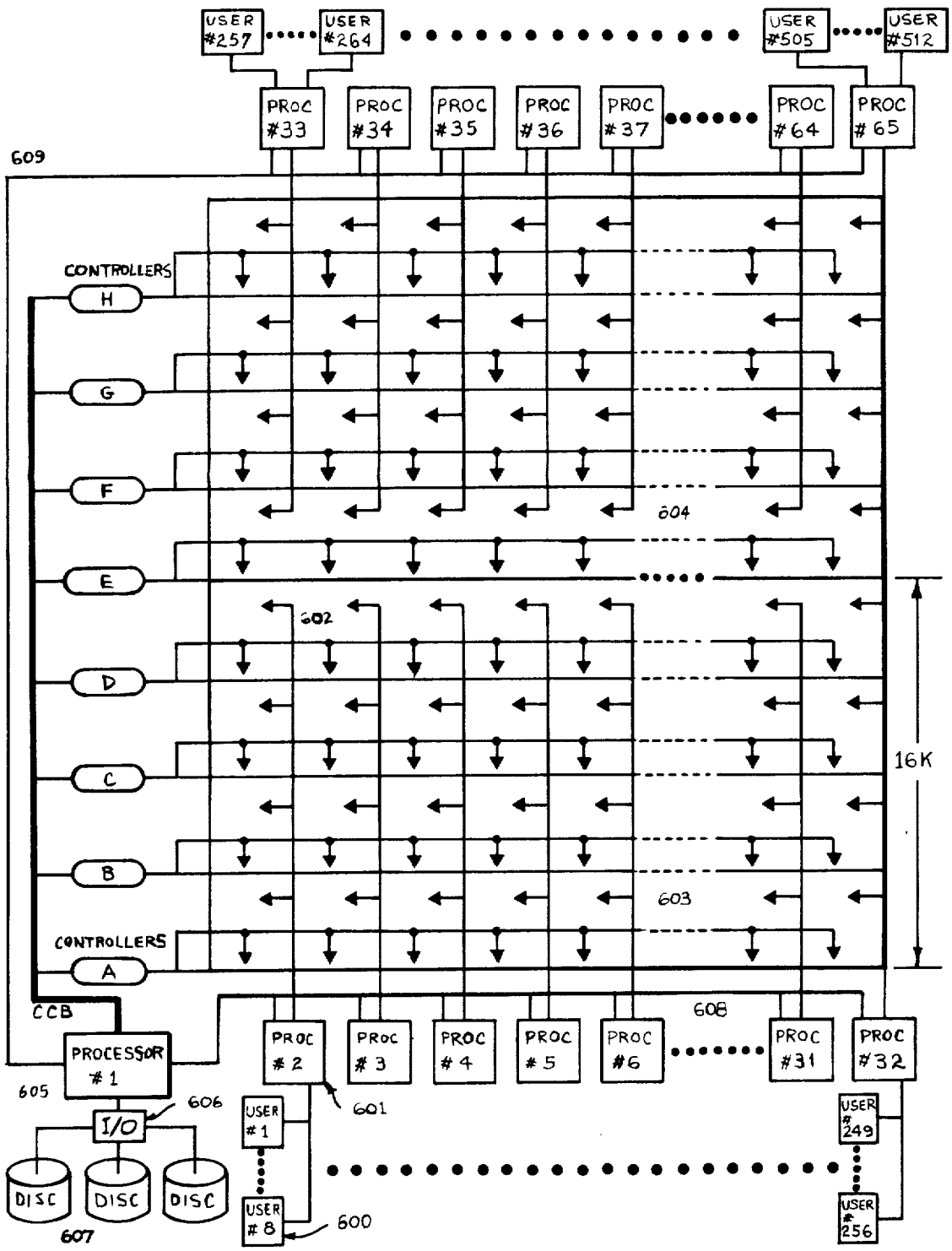
FIG. 20 is a schematic diagram of a virtual memory system according to the present invention.

Referring to the illustrated embodiment of a virtual memory system shown in FIG. 20, a user, say No. 1, becomes active and notifies processor 601 that it has a file designated XYZ, that it desires to use. Processor 601 translates the address to a universal format and accesses the information which is stored on disc 607. Processor 605 is notified via communication link 608 and through its I/O 606, extracts the required information from disc 607 and puts it into the memory modules which are available to processor 601 and then indicates where the program (or data) starts, as well as other appropriate parameters.

With respect to the master-slave relationship thus described, if a processor that is slave to a memory module to which another processor is master tries to access this module while the master has control over it, the controller of the slave receives the NMAV signal from the output of gates 405 and 406 (as shown in FIG. 19) which causes the memory request to go "pending". This means that the address of interest, the type of operation (i.e. R or W) and the data (if a Write) are held and such processor receives an indication via the Mem BSY signal 176 and Mem Soon Not Busy signal 179 that memory is busy. Memory remains busy until the master processor releases the memory module of interest to its slave processor which can then honor pending requests. The foregoing describes only one method, i.e. the preferred embodiment, that can be used to resolve master-slave processor conflicts and it should be understood that other methods relying on other priorities may be used to resolve such conflicts.

It should be noted, however, that by being able to have a slave processor "hang up", the master processor has the option of changing information and, upon releasing it, the slave processor may continue on a new program or may continue on the same program with different data. In other methods that may be used the controller may interrupt the processor at the slave port and thereby inform it that the requested operation will not be completed. Whereupon the slave processor has the option a) of keeping its request pending and waiting until the master processor releases the memory module or b) or withdrawing the request and going on to an alternate operation.

Figure 25:
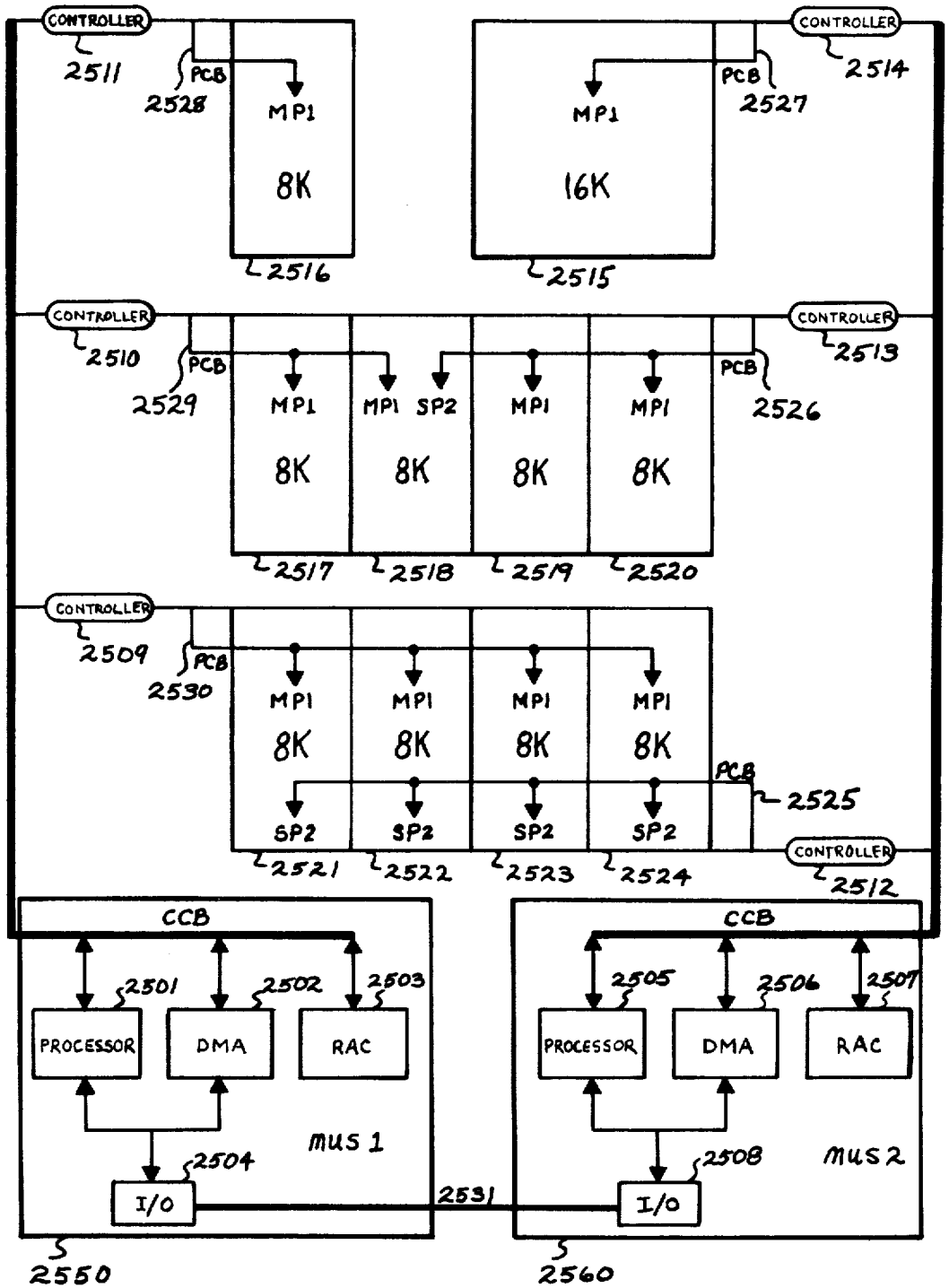
FIG. 25 is a schematic diagram illustrating the sharing of memory modules between two processors in accordance with the present invention.

Referring now to FIG. 25, there is shown a simple application of sharing memory between memory-using set (MUS 1) 2550 and memory-using set (MUS 2) 2560. Each of these memory-using sets comprises a processor 2501 and 2505, respectively, and a direct-memory access channel (DMA) 2502 and 2506, respectively, and a random-access channel (RAC) 2503 and 2507, respectively. The elements of memory-using set 2550, which may be other types of memory-using devices than the ones described, all communicate with controllers 2509, 2510 and 2511 via the CCB. Controller 2509 has access via Privilege Control Bus (PCB) 2530 to modules 2521, 2522, 2523, 2524, each of which contains 8K words of memory. Controller 2510 has access via PCB 2529 to module 2517 and module 2518 and controller 2511 has access via PCB 2528 to module 2516. The memory-using set 2560 communicates via the Common Communications Bus (CCB) with controller 2512, controller 2513 and controller 2514. Controller 2512 has access to the same modules 2524, 2523, 2522, and 2521 as controller 2509, except at another signal port. Controller 2513 communicates via Privilege Control Bus (PCB) 2526 with module 2520, 2519 and 2518 and controller 2514 communicates via PCB 2527 with the 16K memory module 2515. The S prefix and M prefixes on the module signal ports indicate slave and master status of the signal ports, respectively, as previously described. Thus, controller 2512 is slave to modules 2521–2524 and the controller 2513 is master to module 2519 and 2520 but slave to module 2518.

The memory-using set 2550 may have a general purpose processor 2501 and memory-using set (MUS) 2560 may have a special purpose processor 2505. Thus, if MUS 2560 is well suited to floating-point arithmetic operations and MUS 2550 is a general purpose processing set, then whenever lengthy floating-point arithmetic operations are required in a procedure, it can be transferred to MUS 2560 by transferring the requisite program to, say, module 2521 so that controller 2512 can control the operation. This, of course, requires some communication between the two I/O units 2504 and 2508 such that control information about the required procedure can be passed between the two units. Thus, the roles of MUS 2550 and MUS 2560 can be exchanged very easily using the present invention simply by changing whether MUS 2550 is connected to the master port or whether MUS 2560 is connected to the master port of a given module. Any portion of a memory-using set (MUS) may be slave to one MUS and master to another MUS. Also, some modules, say, module 2511 may provide unswitchable memory for MUS 2550 to assure that programs stored therein are proprietary to an accessable only by the one MUS 2550.

Figure 26:
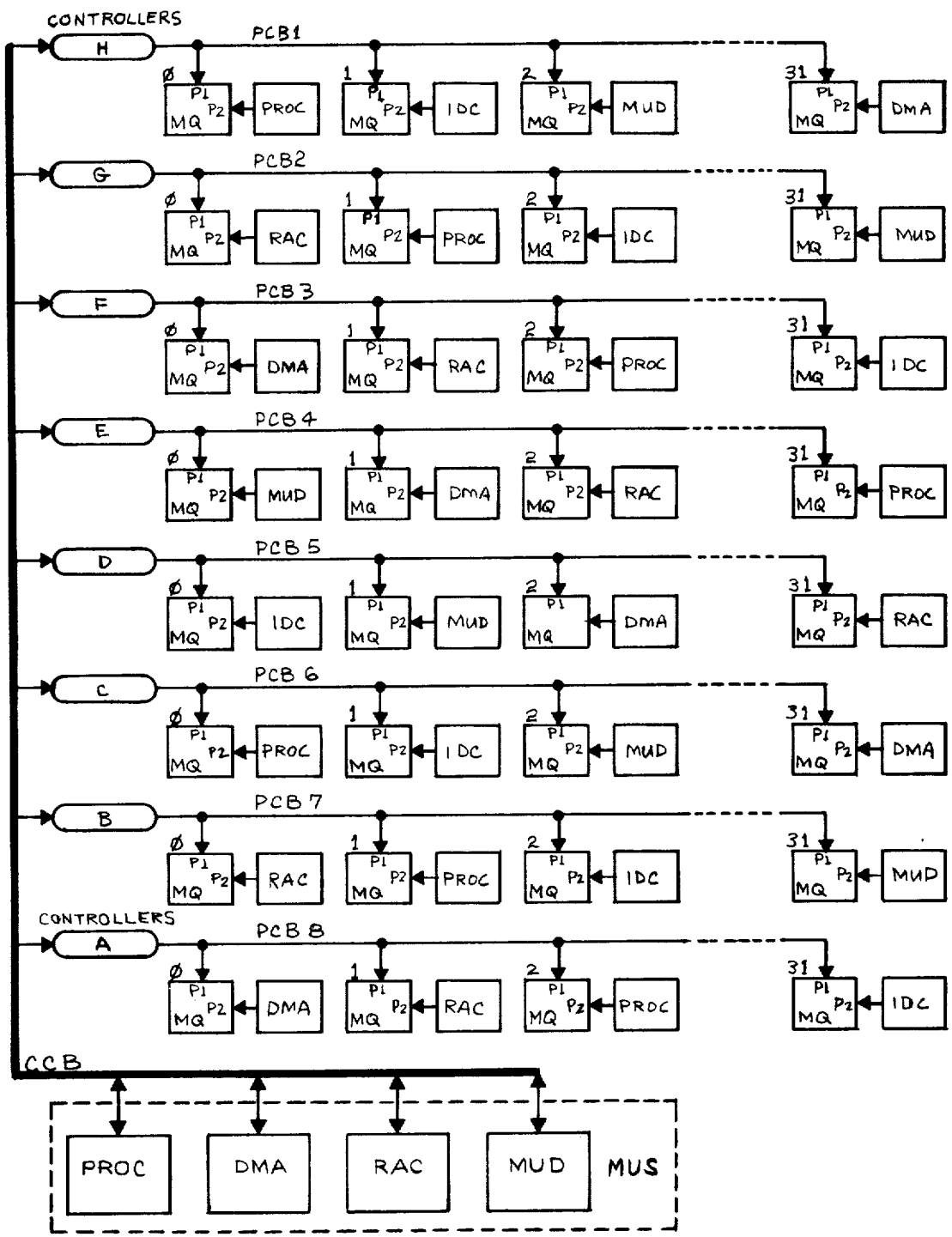
FIG. 26 is a schematic diagram illustrating the sharing of memory between n number of devices in accordance with the present invention.

With respect to FIG. 26, there is shown a simplified schematic diagram of a logical extension of the circuitry for sharing memory between devices. In this embodiment, the main memory-using set (MUS) controls all of the memory and controllers A through H. Each controller has associated with it thirty-two 4K modules. The alternate ports of each one of the modules are shown connected to other memory-using devices which may be associated with other memory-using sets. This diagram thus illustrates that a number of devices may independently use the common memory modules, which number of devices is equal to the number of modules available minus the number of modules shared by the main MUS. In the illustrated embodiment, this number is 32 × 8 = 256 modules - 1 (for the memory-using set [MUS] that is common to all), or 255 devices which can simultaneously share memory without interference with each other.

Figure 27:
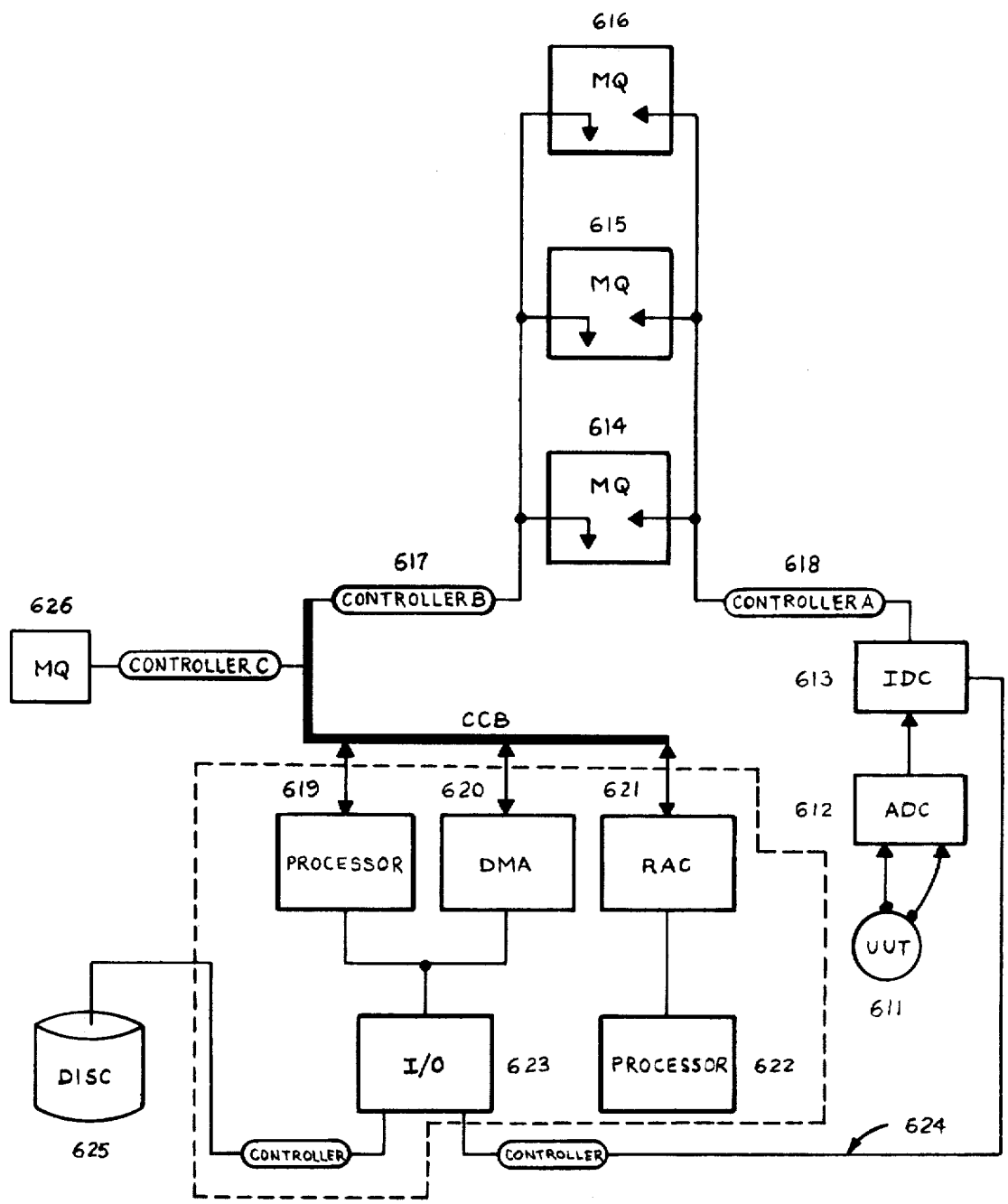
FIG. 27 is a schematic diagram illustrating the sharing of memory between a processor and some other device in accordance with the present invention.

Referring now to FIG. 27, there is shown a simplified schematic diagram for sharing memory modules between a processor and another memory-using device. A control MUS comprises a processor 619, the direct memory access channel (DMA) 620 and a random access channel (RAC) 621 which is coupled to another processor 622, and also comprises an I/O device 623 connected to the processor 619 and the DMA 620 and to a disc file 625 via its own controller. A communications bus 624 links the I/O device 623 to an intelligent device controller (IDC) 613. This intelligent device controller is connected to control the operation of an analog-to-digital converter (ADC) 612 which is monitoring a UUT (unit under test) 611. The UUT 611 has sensors placed on it which provide signals to the analog-to-digital converter 612 for converting the analog information to digital information and providing it to the intelligent device controller on demand. this MUS also communicates with controller C and controller B via the Common Communications Bus (CCB). Controller C has memory module 626 associated with it and controller B has memory modules 614, 615 and 616 associated with it. These latter modules 614–616 are shared with controller A, 618 which is, in turn, connected to the intelligent device controller (IDC) 613.

If a measurement operation on the unit under test is to be performed by the MUS, processor 619 and DMA 620 can fetch the control information and programs for the operation from disc 625 through its I/O device 623 and DMA 620 for storage in memory module 626 via its controller C. In operation the intelligent device controller (IDC) 613 is given requisite controls and information via the communication bus 624 and I/O device 623. These controls and information may determine the type and length of the measurements to be taken by the analog-to-digital converter 612, what type of information should be sorted out and what type of information should be passed on via controller A 618 to one of the three memory modules 614, 615 or 616. At any particular time, controller A 618 will be using one of the memory-modules 614–616 while controller B has access to the remaining two of the modules 614–616. In this manner, a measurement set can be taken and put into a memory module. then the intelligent device controller (IDC) 613 can notify the memory-using set (MUS) that it has completed taking the requisite portion of the measurements and can switch the control of the memory modules to controller B. The processor 619 of the MUS can then begin to process this information into a more usable form using the program which was originally loaded into memory module 626. Alternatively, RAC 621 can allow processor 622 to access via controller B 617, the data which is stored in the switched-over memory modules and that processor 622 can then remotely process this data. In this manner, then, information in memory is shared between an intelligent device controller (IDC) and a processor of a memory-using set.

Figure 28:
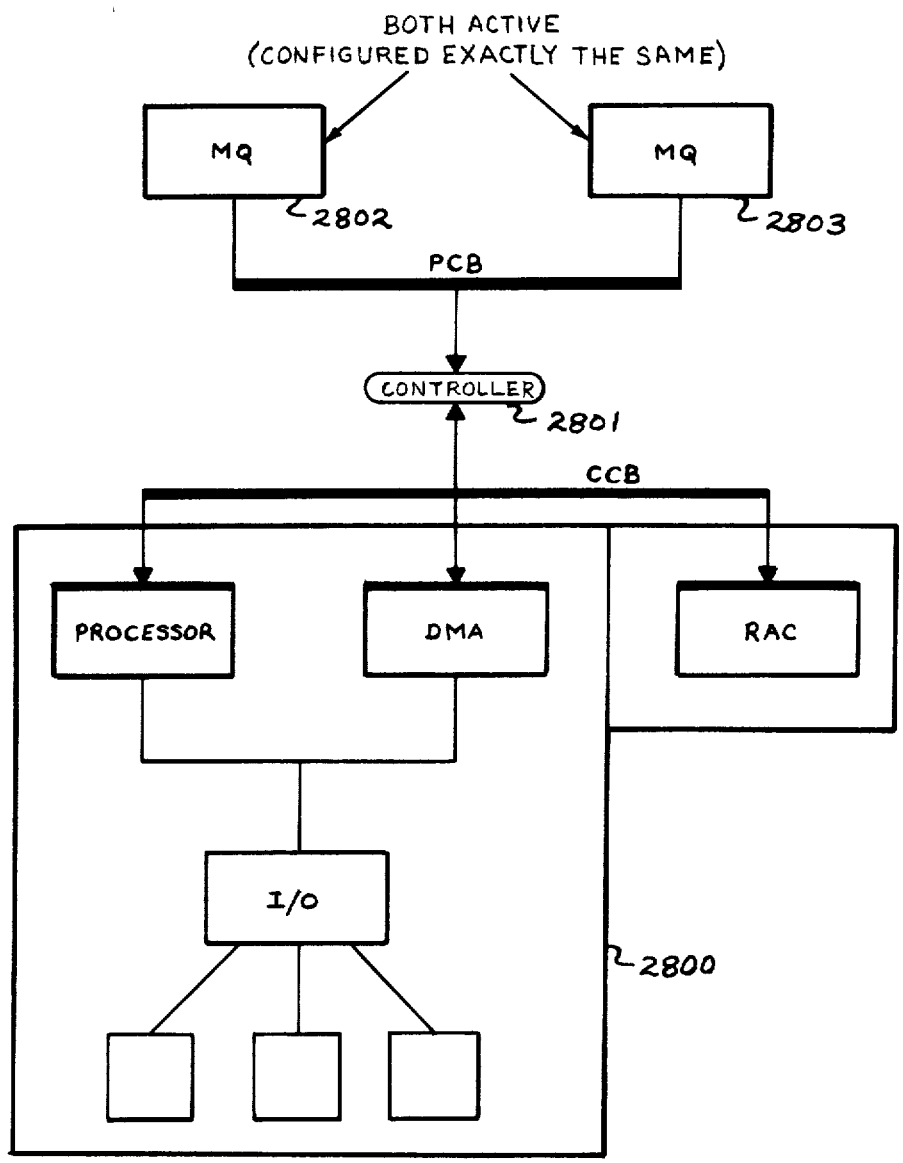
FIG. 28 is a schematic diagram illustrating operation of redundant memories in accordance with the present invention.

Referring now to FIG. 28 there is shown a simplified schematic diagram of one embodiment of this invention in which two memory modules 2802 and 2803 are connected to one controller 2801 and are both configured with the same column and row address. Controller 2801 communicates with the memory-using set (MUS) 2800, which comprises I/O devices, a processor, a direct-memory access channel and a random-access channel, to effect memory reads and writes into modules 2802 and 2803. These two memory modules both react to a given command from controller 2801. The output circuitry of each of these memory modules is configured in such a way that if a READ command occurs, both modules provide the same output, in other words, they are logic OR tied together to obviate output errors resulting from a failure in module 2802 or 2803. In this manner, the common failures in the memory modules can be compensated for by doubling the amount of memory. During Read and Write operations, the information is written into or read from the memory modules 2802 and 2803 simultaneously. In this manner the reliability of the system can be improved by a considerable amount since a few common failure mechanisms statistically account for more than 50% of the operational failures in a memory module.

Figure 29:
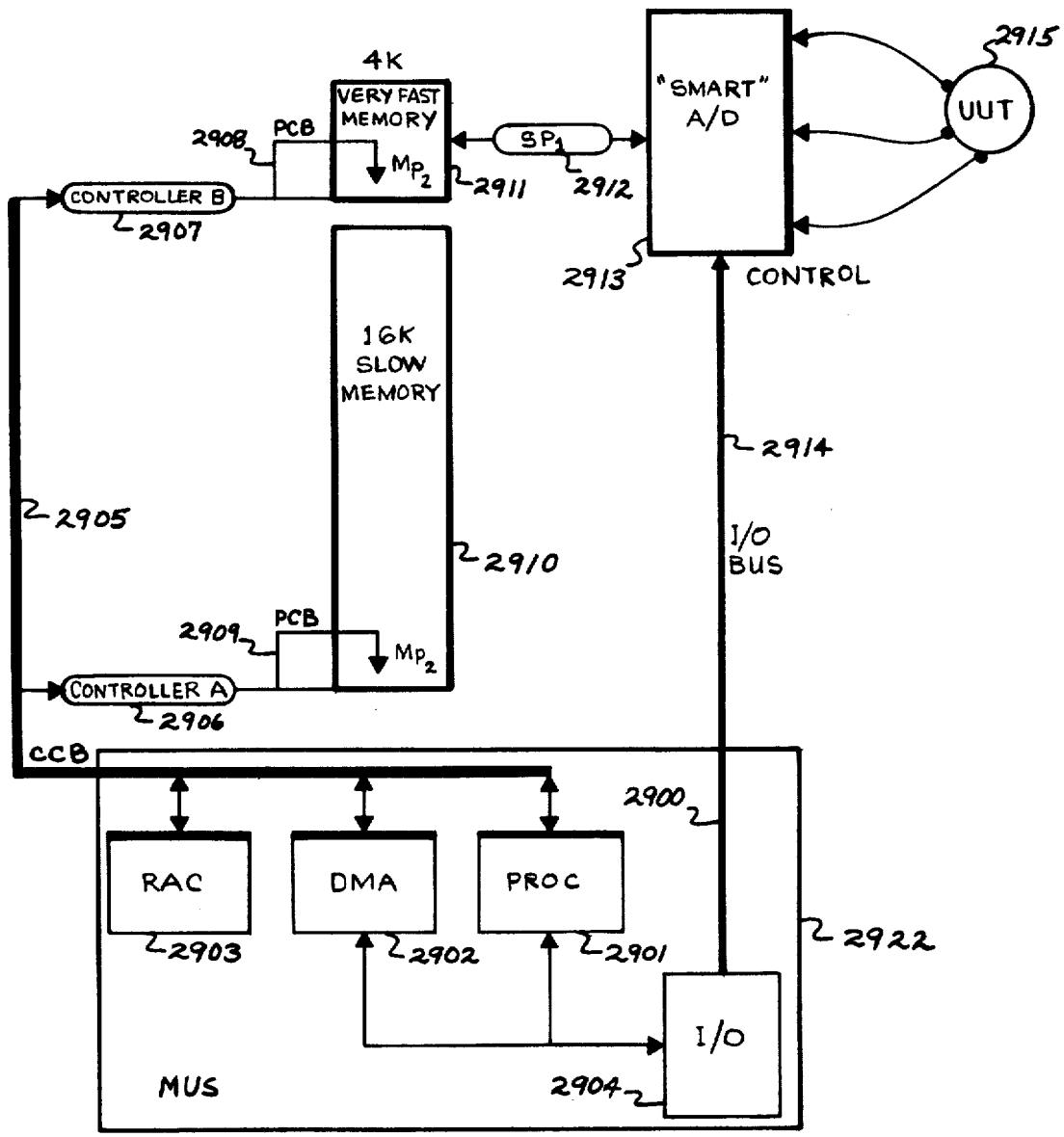
FIG. 29 is a schematic diagram illustrating a fast fourier analyzer operated in accordance with the present invention.

FIG. 29 is a simplified schematic diagram of a fast fourier-analyzer system which comprises a memory-using set (MUS) 2922 including a random access channel (RAC) 2903, a DMA 2902, a processor 2901 and an I/O device 2904. The MUS communicates with controllers 2906 and 2907 via the Common Communication Bus (CCB) 2905. Controller A 2906 communicates with a 16K module 2910 of slow memory via the PCB 2909. This module is not shared with anything and contains the operating system for the fourier analyzer. Since memory operating speed is not very critical in this application, the memory technology of module 2910 may be slow and, in general, low cost. Controller B 2907 communicates via PCB 2908 with a 4K module 2911 of very fast memory (e.g. bipolar memory). This memory module will accumulate data via the controller 2912 from the analog-to-digital converter (A/D) 2913 which receives analog information from the unit under test (UUT) 2915. Thus, analog electrical information is converted to digital information and is presented to the controller 2912 for storage in the very fast memory module 2911. The input-output device and (I/O) bus 2914 apply commands to the A/D converter 2913. In this manner, a program contained in the slow memory module 2910 can control the actions of the A/D converter 2913 which can then simultaneously provide data to the very fast memory module 2911 without interfering with the accessing operations of the slow memory module 2910. Once information is accumulated in the fast memory module it can be transferred via DMA 2902 and the I/O device 2904 to a slower memory device such as a disc. This system can thus accumulate up to 4,000 words of data at essentially the operating rate of the memory or at most at the conversion rate of the A/D converter. Thereafter, the 4000 data entries may be transferred into the slower memory device to free the fast memory to accumulate another 4000 data entries.

Figure 30:
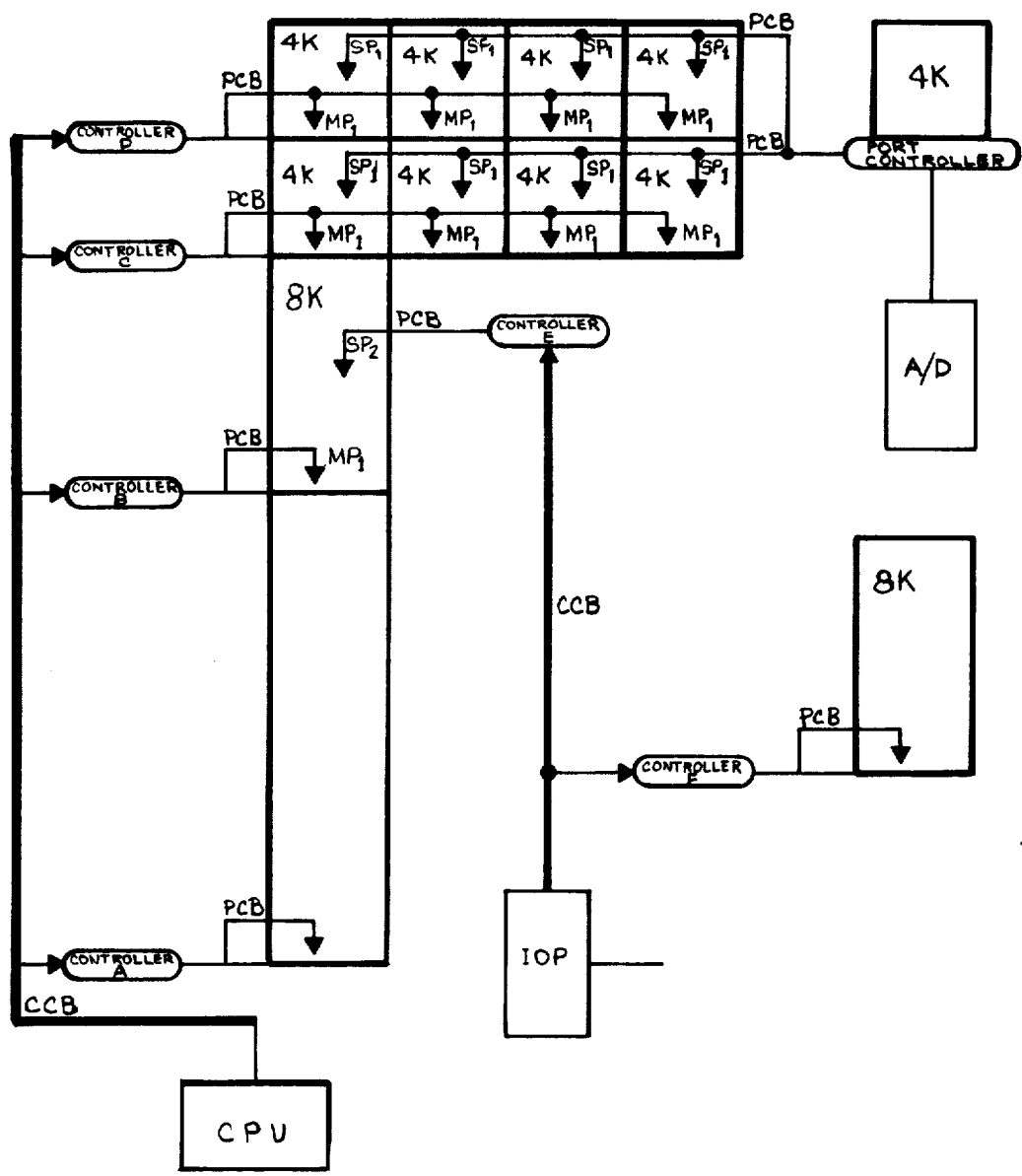
FIG. 30 is a schematic diagram of a slower-operating fourier analyzer in accordance with the present invention.

Referring now to FIG. 30, there is shown a simplified schematic diagram of another fourier analyzer according to the present invention. In this case, more 4K modules of very fast memory are used with a port controller than its own 4K memory module. Information from the analog-to-digital converter (A/D) is gathered via this port controller and is transferred into one of the fast 4K modules of memory. Then when the first of such modules is filled, the next module is selected out of the group of eight to be filled with the incoming information. In the meantime, the central processing unit (CPU) is free to process the data which was previously accumulated in the fast memory modules for subsequent storage of the answers in a slower memory.

Figure 31:
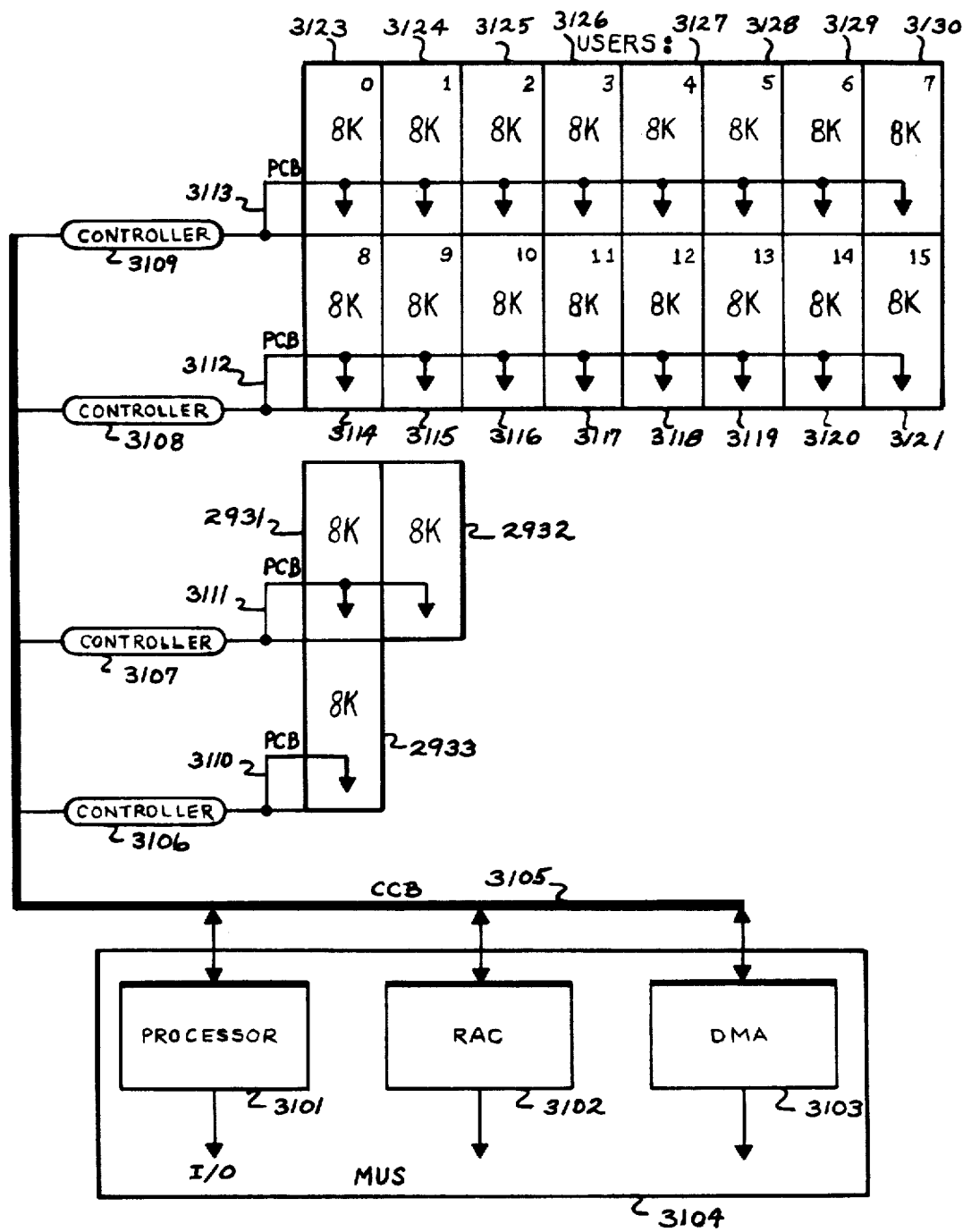
FIG. 31 is a schematic diagram of a memory circuit operated in a time share system according to the present invention.

In FIG. 31 there is shown the schematic diagram of an "IN MEMORY" time share system according to the present invention. This system comprises a memory-using set (MUS) 3104, the processor 3101, RAC 3102, and DMA 3103 which communicates with four controllers 3106 through 3109 via the CCB 3105. Controller 3106 controls a section of memory 2933 via PCB 3110 which is not switched. This memory module may contain the master control programs of the system for time share operation. Controller 3107 controls 8K modules 2931 and 2932 via PCB 3111. These memory modules may store the programs which are used quite often (e.g. library routines), but which are not used as frequently as the programs stored in module 2933. Controller 3108 and controller 3109 control the memory modules located in the user areas. User number 0 resides in module 3123 which is controlled via PCB 3113, and User number 1 resides in module 3124, and so on to User 15 which resides in module 3121. To activate the memory modules of a selected user, a bank switch (BKS), or a bank switch and jump (BSJ) routine is executed, as previously described, to switch the selected user module into the address space of the process for completion of operations. Upon completion, this selected user module is switched out and another user module is switched into the address space. In this manner a very fast response time can be obtained, at least in switching between users.

Figure 32:
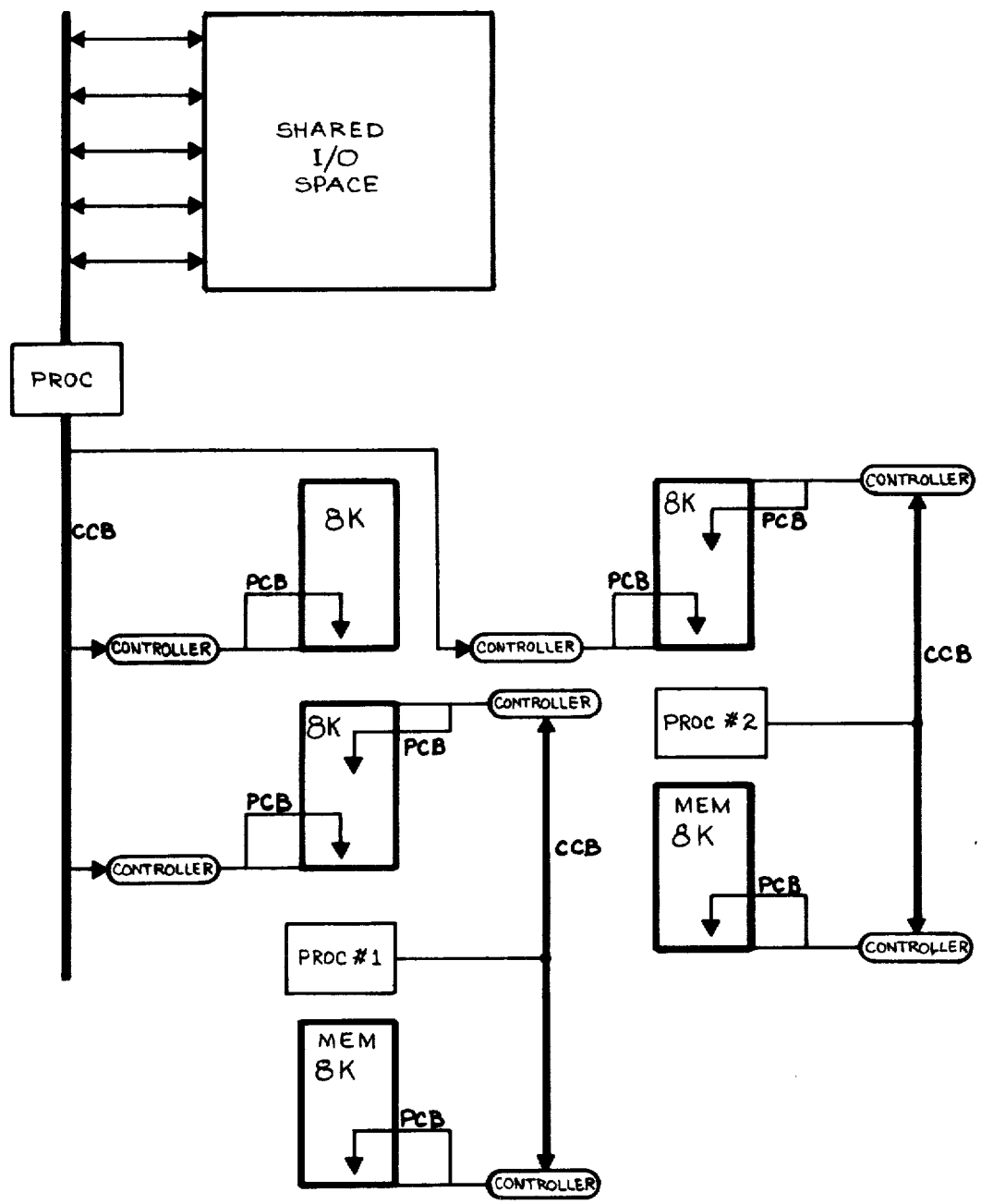
FIG. 32 is a schematic diagram of a multiple processor system according to the present invention.

With reference to the schematic diagram of FIG. 32, there is shown one possible connection of three processors for sharing a common I/O space, where one of the processors operates as an I/O processor.

Figure 33:
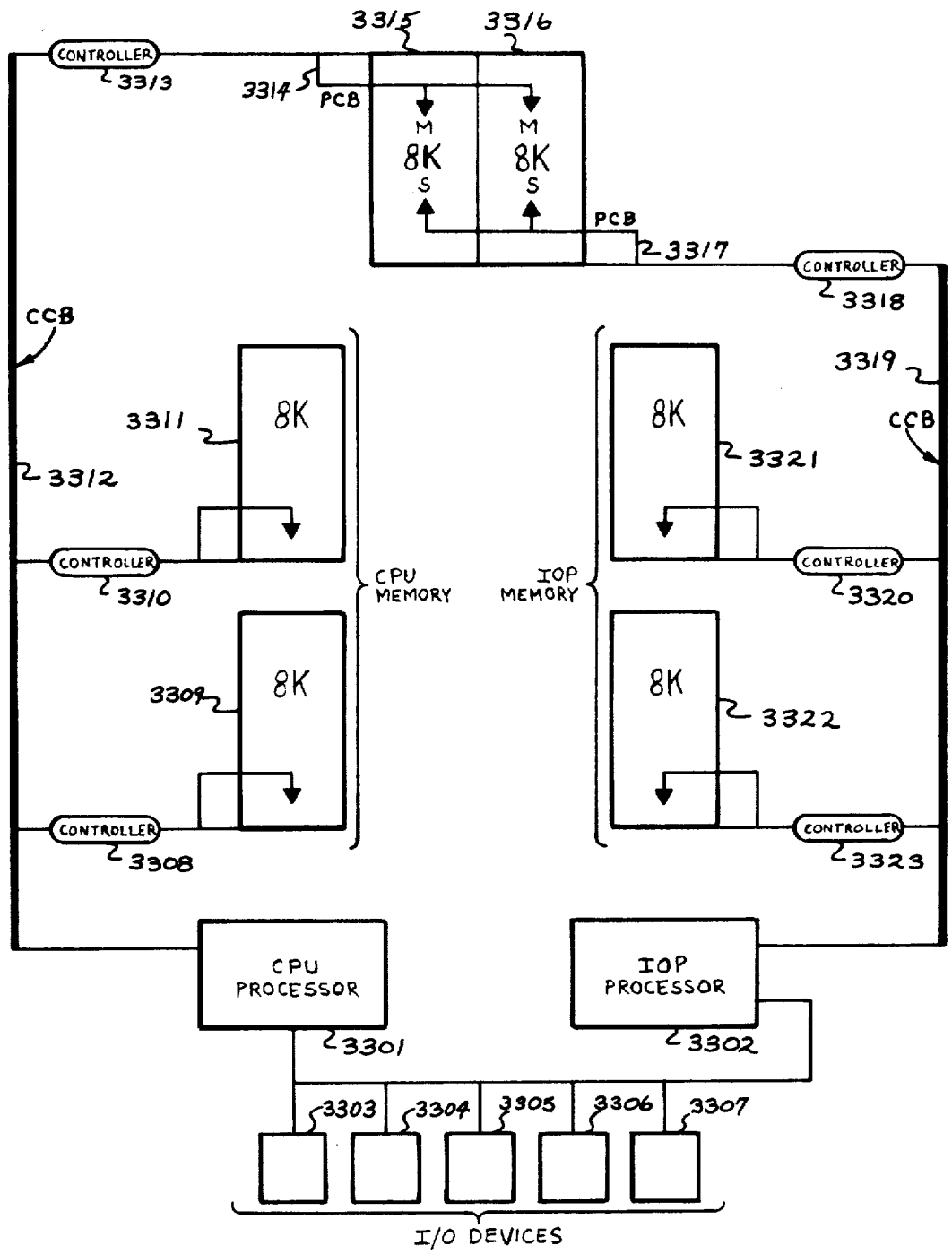
FIG. 33 is a schematic diagram which illustrates a central process unit (CPU) and input/output processor (IOP) configuration according to the present invention.

In the schematic diagram of FIG. 33, there is shown a typical interconnection of CPU and input-output processor (IOP) according to the present invention. The central processing unit 3301 has two modules of memory exclusively available to it (i.e. module 3309 via controller 3308 and module 3311 via controller 3310) for storing, say, arithmetic operations programs and perhaps control operations for the remainder of the system. This CPU 3301 also has access, as master processor, to memory modules 3315 and 3316 via controller 3313 over PCB 3314. The I/O processor 3302 also has access, as slave processor, to these modules via PCB 3317 and controller 3318 which, in turn, is connected via the Common Communication Bus (CCB) 3319 to the I/O processor 3302. Note that the memory 3321 and 3322 connected to this CCB 3319 via controllers 3320 and 3323 are exclusively accessable by the I/O processor for storage of, say, I/O routines, drivers for I/O devices 3303 through 3307, checking programs, control programs and diagnostics for these devices.

In operation, when CPU processor 3301 comes upon a program section which requires an I/O device, CPU 3301 can pass the I/O job via controller 3313 to either module 3315 or 3316 and notify the I/O processor 3302 that such information is in module 3315 and that a program section is to be performed. The I/O processor 3302 may then take over the program section involving an I/O device, thus freeing CPU processor 3301 to perform another routine selected for it by its own operating system. The I/O processor 3302 may then notify the CPU 3301 when the I/O routine is completed and, either a routine which was suspended earlier may now be picked up and operated upon, or there may be a notification that the routine was completed and can be deleted or dropped from the queue of routines of CPU processor 3301. This increases the utilization of system resources by allowing the CPU processor 3301 to be tailored for arithmetic operations, data analysis, and the like, whereas the I/O processor 3302 may be tailored to I/O operations.

Figure 34:
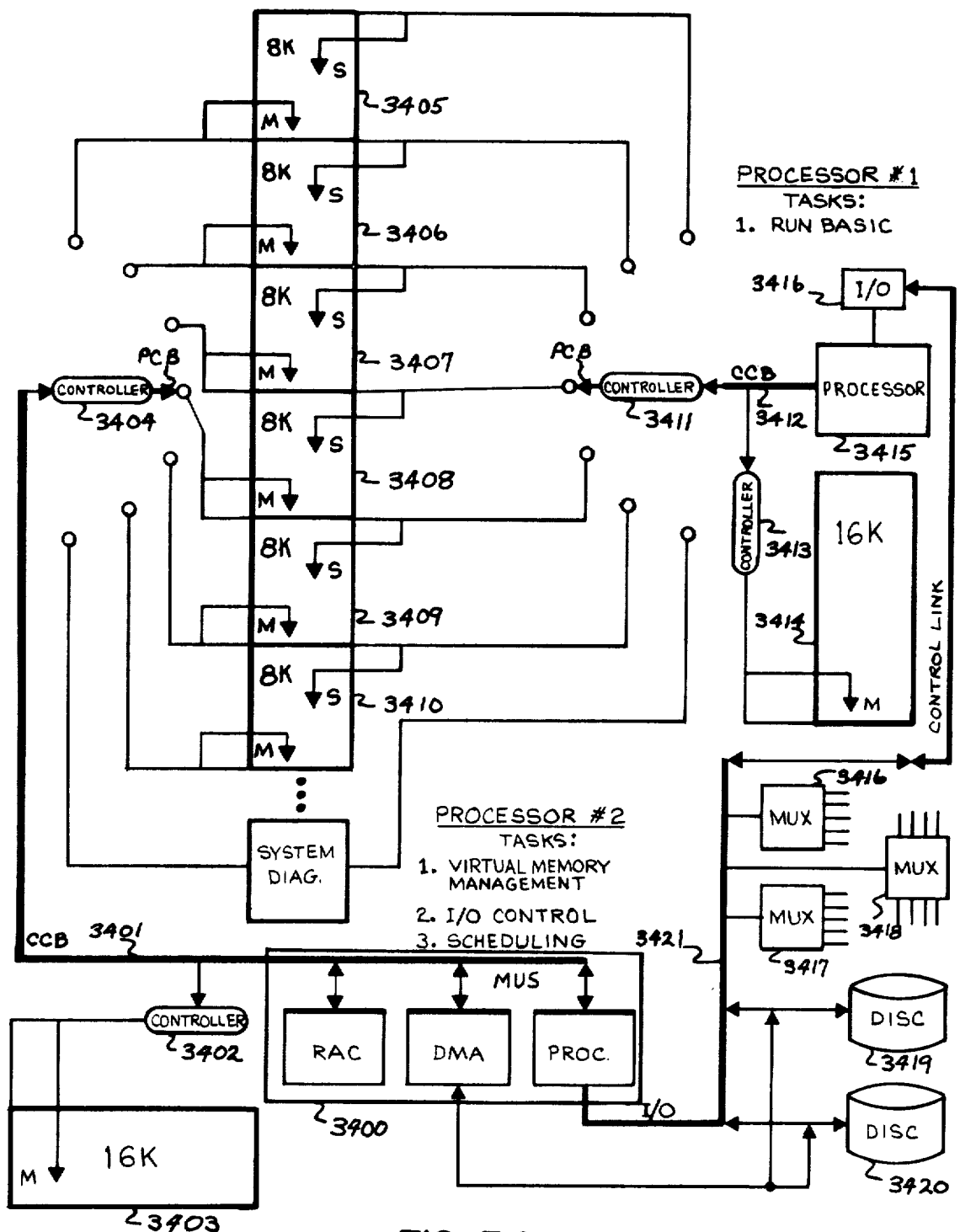
FIG. 34 is a schematic diagram of a time share virtual memory system according to the present invention.

Referring now to FIG. 34, there is shown a simplified schematic diagram of a basic time share system with virtual memory in accordance with the present invention. This time share system includes a processor in the MUS 3400 and another processor 3415. The principal task of processor 3415 is to run the BASIC languages and to interpret its signals in accordance with programs contained in its memory in conjunction with the user's programs which are loaded into memory modules 3405 through 3410. Notification of a user being active is sent via I/O bus 3421 through the control link to I/O device 3490 (such as a terminal multiplexer) and finally to processor 3415. In this manner, processor 3415 is notified of the routine it is to perform. Thus, the user whose connection to the system may be through any one of the multiplexers (MUX's) 3416, 3417 or 3418 notifies the MUS 3400 via I/O bus 3421 that it has a job to be done (e.g. that the user has a line of data or instructions that it would like to type in). This input line is analyzed in accordance with the program contained in memory module 3403 and, if the information is significant enough that it requires the attention of the language processor 3415, then the job is transferred from a disc memory 3419 or 3420 through the I/O bus and processor of the MUS 3400 to one of the unused user spaces 3405 through 3410 via controller 3404. The language processor 3415 is notified via its I/O channel and the control link which is connected to the I/O bus of the processor in MUS 3400 that it should start this job at the appropriate time. Processor 3415 may complete its operations of analyzing the language, the syntax, etc. and, then upon completion of its operations, notify the master processor in MUS 3400 that it has completed its operations. The Processor of MUS 3400, in turn, sends the results to the user via one of the MUX's 3416–3418. Used in this manner as a virtual memory system, the processor of MUS 3400 can regard information sent to it by a user via one of the MUX's as addresses or as a set of addresses which can then be interpreted and translated from virtual addresses into real addresses. In such a manner, users via the MUX 3416–3418 would think that they had access to a very large amount of memory. Actually, the user has access to all virtual memory in the address space.

Figure 37:
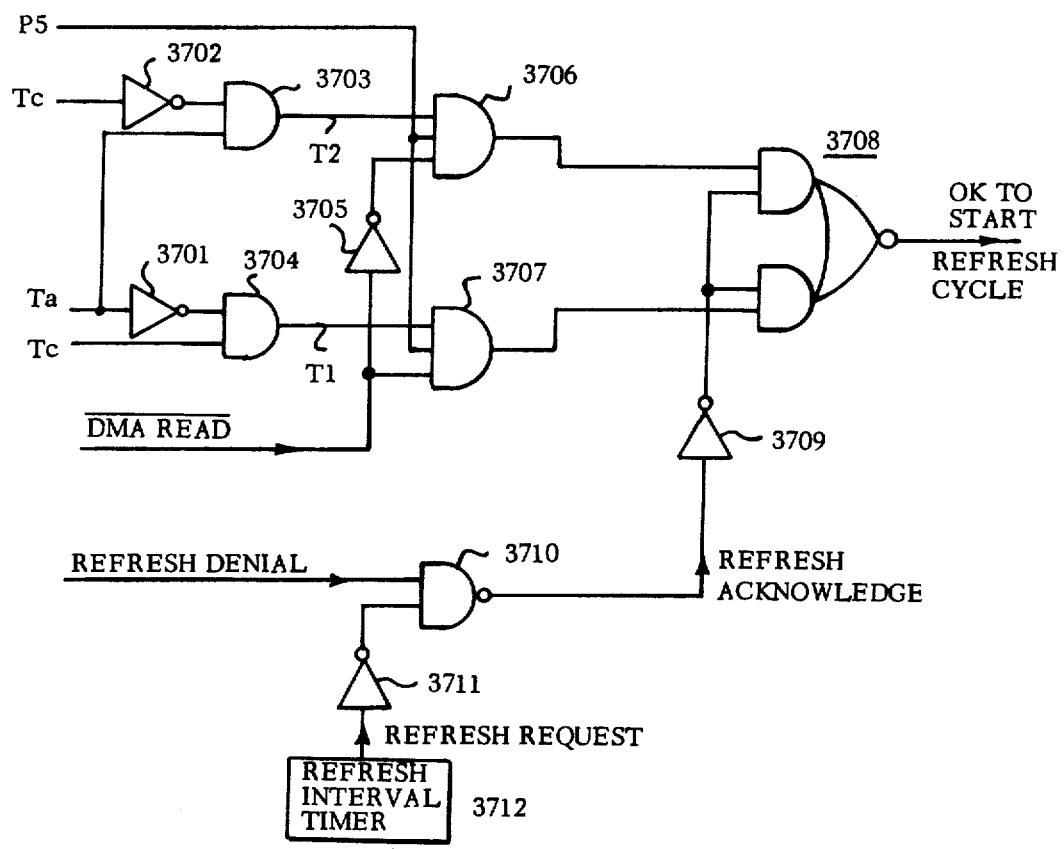
FIG. 37 is a schematic diagram illustrating logic circuitry for performing memory refresh operations according to the present invention.
Figure 38:
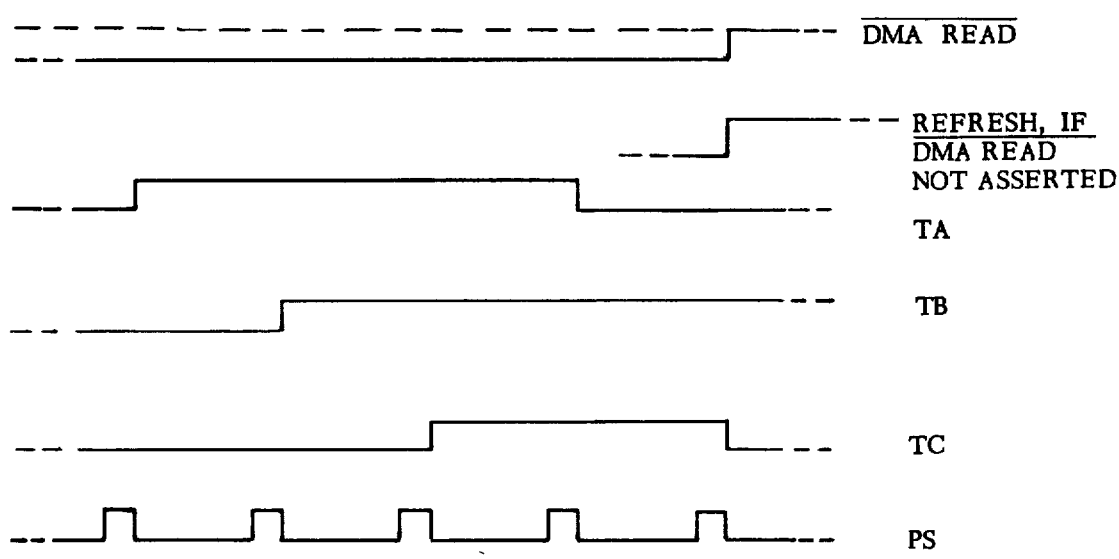
FIG. 38 is a timing diagram illustrating on operating sequence of timing signals in the circuit of FIG. 37.

With reference now to the schematic diagram of FIG. 37 and to the timing diagram of FIG. 38, it should be noted that one problem encountered in the refreshing of MOS-type memories is the possibility of interference of the refresh operation with a real-time operation on the I/O channel (i.e. the direct memory access). Interference with refresh or with data transfer operations could cause a loss of data during transfer either to or from real-time devices with concomitant disastrous operating consequences. This problem is solved in accordance with the present invention by moving the refresh operation out of the way of pending DMA (I/O channel) operation.

Consider that the DMA is going to do a READ operation and to search the DMA Read signal for a period of time prior to when the actual operation is to occur. The time when DMA does a WRITE or a READ operation is established by the timing signals, $T_A$, $T_B$, $T_C$ and $P_5$ (derived from the clock signals) as decoded by gates 3701 through 3704. The signal $T_A$ is inverted by gate 3701 whose output is applied to an input of gate 3704. The other input of gate 3704 is supplied only when $T_C$ is asserted (high). The output of gate 3704 is asserted when $T_C$ is asserted and $T_A$ is not asserted. This output is applied to one input of gate 3707 and $P_5$ is supplied to another input of gate 3707 along with the DMA READ signal. If the DMA channel is not doing a READ operation, the other inputs to gate 3707 are asserted and an output pulse is produced which has the width of $P_5$ and is applied to one of the AND gate inputs of AND/OR-INVERT gate 3708. If the refresh interval timer 3712 timed out in the intervening period since the last pulse issued by gate 3707, the output of this timer 3712 will be asserted and will be inverted by gate 3711 for application to the input of gate 3710. If any of the other elements of the system object to a refresh operation being performed at this particular time, the refresh operation may be inhibited by asserting the Refresh Denial input to gate 3710. If Refresh Denial is not asserted, the output from gate 3710 is asserted and is applied to an inverter 3709, the output of which is applied to the other input to the lower AND gate of AND/OR-INVERT gate 3708. Since both of the inputs of the lower AND gate of the AND/OR-INVERT gate 3708 are asserted, the output of gate 3708 is asserted, thus indicating that a refresh cycle may be started at this time.

Consider now the DMA READ input signal to gates 3707 and 3705. If a DMA READ were pending at the time represented by $T_C$ and $T_A$ (i.e. $T_1$ output of gate 3704), then the output of gate 3707 would not be asserted at $T_1$. A refresh cycle would not occur then until $T_2$ as decoded by $T_B$ and $T_A$ (the output of gate 3703). This output and the inversion of DMA READ by gate 3705 are applied to gate 3706, the output of which is asserted at $P_5$, and this asserts one input of the upper AND gate of AOI gate 3708. The other input of this upper AND gate is asserted whenever an approved refresh request is pending. If this condition exists, a refresh cycle will start. In this manner, the refresh operation is moved out of the way of the DMA memory operations to avoid interference between these operating cycles.

Therefore, the polymorphic module control system (e.g. for control of memory modules) according to the present invention substantially improves the performance of a computing network. Any transmittal of information to or from an address can be performed by altering the state of the bank switching line to convert the address bus to a control bus for expanding the capability of memory modules within the address space of a memory-using processor. In addition, a network of computers may be assembled according to the present invention wherein computer or processor is actually passing commands to an I/O device, a processor, an access channel, or any other unit which can presently be controlled by binary information. Thus, flexible accessing and virtual restructuring and addressing of the contents of memory are made possible by controlled conversion of the address bus in any system to a control bus wherein control information can be passed to a single device or set of devices. This permits "chaining" of processors such that one processor can change its memory address bus into a control bus and then pass a command therealong which changes the address bus of the next processor or memory-using device into a control bus which, in turn, can then again pass on a command to change the address bus of the next processor into a control bus, and so on. In this manner, communication between a substantial number of devices can be effected. And such a chain of communications between processors or memory-using devices can be wrapped back around such that a processor can access itself in a different area of its memory space, or such that one memory-using device can control another memory-using device with the same system either directly or indirectly through any level of processing. It should also be noted that in such a chain of communications between processes arithmetic operations can occur at any point along the line which can redefine the end result as control is passed on to the next level of processors. Thus, this present invention allows the interconnection of processors, the sharing of memory between processors having overlapping memory space, the redefinition of address and control busses, and the like, in a network which is compatible with, or which originates from the very simple designs of inexpensive small computers.

I claim:

1. Method of operating a module of memory circuits with at least two data processors which may be selectively gated thereto through separate signal ports of the module, said memory circuits requiring periodic refreshing of stored logic manifestations in accordance with a sequence of refresh clock signals applied thereto, the method comprising the steps of:

providing sequences of refresh clock signals for each signal port of the module;

selectively gating a sequence of refresh clock signals present at one signal port of the module to the memory circuits for producing a refresh operation thereof; and preserving an indication of the occurrences of the refresh operations performed on the memory circuits of the module independently of the signal port thereof through which the sequence of refresh clock signals for each such refresh operation is selectively gated for preserving an indication of the status of memory refresh operations as the signal ports are selectively gated.

2. Method of operating a module of memory circuits as in claim 1 wherein the step of selectively gating includes applying to the memory circuits of the module the sequence of refresh clock signals present at the one signal port through which one of said separate data processors is gated to the memory circuits of the module at the time of a required refresh operation.

3. Method of operating a module of memory circuits as in claim 1 wherein the step of selectively gating includes applying to the memory circuits of the module the sequence of refresh clock signals present at the one signal port through which the one of said separate data processors was last gated to the memory circuits of the module prior to the time of a required refresh operation.

4. Method of operating a module of memory circuits as in claim 1 wherein the step of selectively gating includes applying to the memory circuits of the module the sequence of refresh clock signals present at a predetermined one of the signal ports of the module under conditions of no data processor being gated to the memory circuits of the module at the time of a required refresh operation.

5. Method of operating a module of memory circuits as in claim 1 in which operation of data processors with the memory circuits is performed within an operating interval that is shorter than the periodicity of the required refresh operations, and the method comprises:
 detecting the presence of any pending priority requirements for access to the memory circuits of the module by a data processor at the time of a required refresh operation;
 deferring the application of the sequence of refresh clock signals to the memory circuits and selectively gating such data processors to the memory circuits of the module during the next succeeding operating interval following the required refresh operation; and
 applying a sequence of refresh clock signals to the memory means of the module in the succeeding operating interval which next follows selectively gating the data processor to the memory circuits.

6. Modular memory apparatus comprising:
 a circuit module having a pair of signal ports and including memory circuits for operation with at least two separate memory-using data processors that may be selectively gated thereto through the pair of signal ports of the module, and which require periodic refreshing of stored logic manifestations in accordance with a sequence of refresh clock signals applied thereto;
 a circuit module controller means connecting a memory-using data processor to a corresponding one of the signal ports of the circuit module, each of said circuit module controller means including timing means for recurringly applying to the corresponding signal port the sequence of refresh clock signals required for said refresh operations;
 said circuit module includes gating means connected to said memory circuits for selective connection thereof to one of the pair of signal ports for operatively coupling the corresponding data processor thereto;
 said circuit module also includes accumulator means connected to the memory circuits for preserving an indication of the status of the refreshing thereof; and
 detector means coupled to the accumulator means of the circuit module for causing the accumulator means to preserve an indication of the status of the refreshing operation of the memory circuits of such circuit module, independently of which of the signal ports is gated to the memory circuits in response to the detection of a refresh operation.

7. Modular memory apparatus as in claim 6 wherein said gating means of the circuit module includes means coupled to the memory circuits for providing the sequence of refresh clock signals present at the one signal port of the circuit module through which a memory-using data processor is coupled to the memory circuits at the time for a required refresh operation of the memory circuits.

8. Modular memory apparatus as in claim 6 wherein said gating means of the circuit module includes means coupled to the memory circuits for providing the sequence of refresh clock signals present at the one signal port of the circuit module through which a memory-using data processor was last gated to the memory circuits of the circuit module prior to the time of a required refresh operation of the memory circuits.

9. Modular memory apparatus as in claim 6 wherein said gating means of the circuit module includes means coupled to the memory circuits for providing the sequence of refresh clock signals present at a preselected one of the signal ports of the circuit module for a required refresh operation of said memory circuits in response to the condition that neither signal port is gated to the memory circuits at the time of the required refresh operation.

* * * * *

UNITED STATES PATENT AND TRADEMARK OFFICE
CERTIFICATE OF CORRECTION

PATENT NO. : 4,028,675

DATED : June 7, 1977

INVENTOR(S) : Robert J. Frankenberg

It is certified that error appears in the above-identified patent and that said Letters Patent are hereby corrected as shown below:

In the title, delete "SYSTEM" and insert -- SYSTEMS --

Column 2, line 50, between "sets" and "devices", delete "or" and insert -- of --;

Column 5, line 14, delete "or" (second occurrence) and insert -- of --;

Column 7, line 18, delete "is" and insert -- to --;

Column 9, line 15, delete "thuse" and insert -- thus --;

Column 10, line 33, delete "registor" and insert -- register --;

Column 10, line 51, delete "assets" and insert -- asserts --;

Column 12, line 50, delete "(bits A0    A12)" and insert -- (bits A0→A12) --;

Column 14, line 6, delete "173" and insert -- 1420 --;

Column 15, line 15, delete "CEb" and insert -- CEL --;

UNITED STATES PATENT AND TRADEMARK OFFICE
CERTIFICATE OF CORRECTION

PATENT NO. : 4,028,675
DATED : June 7, 1977
INVENTOR(S) : Robert J. Frankenberg

It is certified that error appears in the above-identified patent and that said Letters Patent are hereby corrected as shown below:

Column 15, line 27, delete "Wrtie" and insert -- Write --;

Column 19, line 6, delete "bus" and insert -- Bus --;

Column 19, line 28, delete "asepct" and insert -- aspect --;

Column 24, line 44, delete "540" and insert -- 910 --;

Column 25, line 24, delete "910" and insert -- 510 --;

Column 26, line 29, delete "512" and insert -- 521 --;

Column 28, line 12, delete "or" (second occurrence) and insert -- of --;

Column 29, line 63, delete "then" and insert -- Then --;

Column 33, line 15, "DMA Read" should read -- $\overline{\text{DMA Read}}$ --;

Column 33, line 26, "DMA" should read -- $\overline{\text{DMA}}$ --;

Column 33, line 27, "READ" should read -- $\overline{\text{READ}}$ --;

Column 33, line 39, "Refresh Denial" (both occurrences)

UNITED STATES PATENT AND TRADEMARK OFFICE
CERTIFICATE OF CORRECTION

PATENT NO. : 4,028,675

DATED : June 7, 1977

INVENTOR(S) : Robert J. Frankenberg

It is certified that error appears in the above–identified patent and that said Letters Patent are hereby corrected as shown below:

should read -- $\overline{\text{Refresh Denial}}$ -- (both occurrences);

Column 33, line 48, "DMA READ" should read -- $\overline{\text{DMA READ}}$ --;

Column 33, line 49, "DMA READ" should read -- $\overline{\text{DMA READ}}$ --;

Column 33, line 50, "$T_A$" should read -- $\overline{T_A}$ --;

Column 33, line 53, "$T_B$" should read -- $\overline{T_B}$ --;

Column 33, line 54, "DMA READ" should read -- $\overline{\text{DMA READ}}$ --;.

Signed and Sealed this

Twelfth Day of February 1980

[SEAL]

Attest:

SIDNEY A. DIAMOND

Attesting Officer        Commissioner of Patents and Trademarks